US009969041B2

(12) United States Patent
Endo et al.

(10) Patent No.: US 9,969,041 B2
(45) Date of Patent: May 15, 2018

(54) DEFORMABLE THIN OBJECT SPREADING DEVICE AND METHOD

(75) Inventors: Yoshimasa Endo, Shiga (JP); Hiroshi Kitagawa, Shiga (JP); Hiroshi Kimura, Shiga (JP)

(73) Assignees: Seven Dreamers Laboratories, Inc., Tokyo (JP); Panasonic Corporation, Osaka (JP)

( * ) Notice: Subject to any disclaimer, the term of this patent is extended or adjusted under 35 U.S.C. 154(b) by 827 days.

(21) Appl. No.: 13/991,066

(22) PCT Filed: Nov. 30, 2011

(86) PCT No.: PCT/JP2011/006689
§ 371 (c)(1),
(2), (4) Date: May 31, 2013

(87) PCT Pub. No.: WO2012/073500
PCT Pub. Date: Jun. 7, 2012

(65) Prior Publication Data
US 2013/0249157 A1    Sep. 26, 2013

(30) Foreign Application Priority Data
Dec. 1, 2010 (JP) ................................. 2010-268659

(51) Int. Cl.
*D06F 73/00* (2006.01)
*B25J 13/00* (2006.01)
(Continued)

(52) U.S. Cl.
CPC ................ *B23Q 3/18* (2013.01); *B25J 9/026* (2013.01); *B25J 9/1679* (2013.01);
(Continued)

(58) Field of Classification Search
CPC ...... B25J 9/026; B25J 15/0253; B25J 9/1679; G05B 2219/39485; G05B 2219/39571;
(Continued)

(56) References Cited

U.S. PATENT DOCUMENTS 5,169,282 A * 12/1992 Ueda et al. ................... 414/800
5,300,007 A *  4/1994 Kober ............................ 493/23
(Continued)

FOREIGN PATENT DOCUMENTS

EP        1690976      8/2006
JP        02-131888    5/1990
(Continued)

OTHER PUBLICATIONS

Cosumano-Towner, M.; Singh, A; Miller, S.; O'Brien, J.F.; Abbeel, P. "Bringing Clothing into Desired Configurations with Limited Perception." IEEE International Conference on Robotics and Automation (ICRA), 2011. May 13, 2011. <http://www.cs.berkeley.edu/~pabbeel/papers/Cusumano-TownerSinghMillerOBrienAbbeel_ICRA2011.pdf>.*
(Continued)

*Primary Examiner* — Christopher M Koehler
*Assistant Examiner* — Joel Crandall
(74) *Attorney, Agent, or Firm* — Hamre, Shumann, Mueller & Larson, P.C.

(57) ABSTRACT

A deformable thin object spreading device and method are disclosed. The device includes a control part configured to: control a clamping unit and a moving mechanism to cause the clamping unit to clamp a first point of a deformable thin object; cause an endpoint detecting part to detect a first endpoint; control the clamping unit and the moving mechanism to cause the clamping unit to clamp the first endpoint; cause the endpoint detecting part to detect a second endpoint; control the clamping unit and the moving mechanism
(Continued)

to cause the clamping unit to clamp both of the first endpoint and the second endpoint; cause the endpoint detecting part to detect a third endpoint; and control the clamping unit and the moving mechanism to cause the clamping unit to clamp both of the first endpoint or the second endpoint and the third endpoint of the deformable thin object.

15 Claims, 35 Drawing Sheets

(51) Int. Cl.
  *B23Q 3/18*   (2006.01)
  *D06F 67/04*   (2006.01)
  *B25J 9/02*   (2006.01)
  *B25J 15/02*   (2006.01)
  *B25J 9/16*   (2006.01)

(52) U.S. Cl.
  CPC .......... *B25J 15/0253* (2013.01); *D06F 67/04* (2013.01); *G05B 2219/39469* (2013.01); *G05B 2219/39571* (2013.01); *G05B 2219/40011* (2013.01); *G05B 2219/40044* (2013.01); *Y10T 29/49998* (2015.01)

(58) Field of Classification Search
  CPC .......... G05B 2219/39469; G05B 2219/40011; G05B 2219/40044; B65H 15/00; B23Q 3/18; D06F 67/04; Y10T 29/49998
  USPC ......................................... 38/7, 12, 143, 144
  See application file for complete search history.

(56) References Cited

U.S. PATENT DOCUMENTS

| | | | | |
|---|---|---|---|---|
| 6,477,797 | B1* | 11/2002 | Takahashi et al. | 38/143 |
| 6,584,711 | B1* | 7/2003 | Nakamura | 38/143 |
| 6,826,856 | B1* | 12/2004 | McCabe | 38/143 |
| 2008/0092415 | A1* | 4/2008 | McCabe | 38/143 |

FOREIGN PATENT DOCUMENTS

| | | |
|---|---|---|
| JP | 2002-321869 | 11/2002 |
| JP | 2004-089473 | 3/2004 |
| JP | 2010-000561 | 1/2010 |
| WO | 1993-021373 | 10/1993 |

OTHER PUBLICATIONS

Jur van den Berg, Stephen Miller, Ken Goldberg, Pieter Abbeel. "Gravity-Based Robotic Cloth Folding." The 9th International Workshop on the Algorithmic Foundations of Robotics (WAFR). 2010. <http://www.cs.berkeley.edu/~pabbeel/papers/vandenBergMillerGoldbergAbbeel_WAFR2010.pdf>.*

Perlman, Claire. "Researchers Create Robot That Can Pair, Fold Socks." The Daily Californian. Aug. 31, 2010. <http://archive.dailycal.org/article.php?id=110166>.*

Maitin-Shepard, Jeremy; Marco Cusumano-Towner; Jinna Lei; Pieter Abbeel. "Cloth Grasp Point Detection based on Multiple-View Geometric Cues with Application to Robotic Towel Folding." Apr. 8, 2010. <http://www.cs.berkeley.edu/~pabbeel/papers/Maitin-ShepardCusumano-TownerLeiAbbeel_ICRA2010.pdf>.*

Wang, Ping Chuan; Stephen Miller; Mario Fritz; Trevor Darrell; Pieter Abbeel. "Sockification." Aug. 10, 2010. YouTube. <https://www.youtube.com/watch?v=KKUaVzf3Oqw>.*

* cited by examiner

FIG. 12
(a) UNTIDY STATE
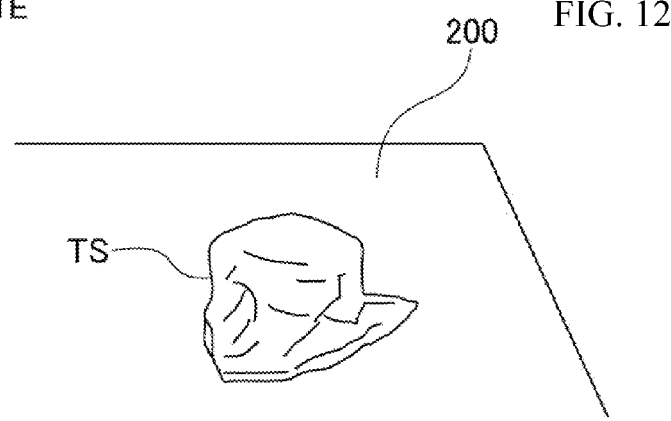
(b) CLAMPING OF CENTER OF CLOTHING
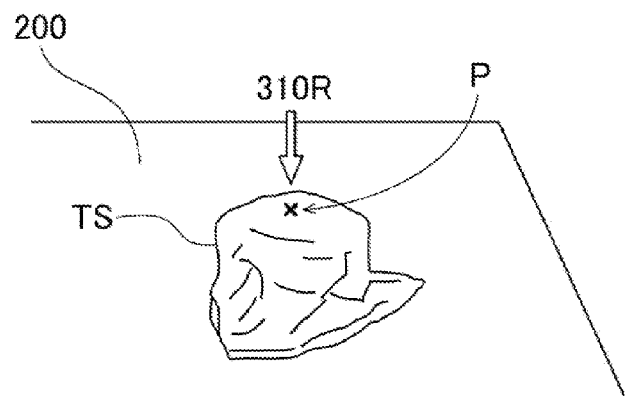
(c) HANGING (ELEVATION OF CHUCK)
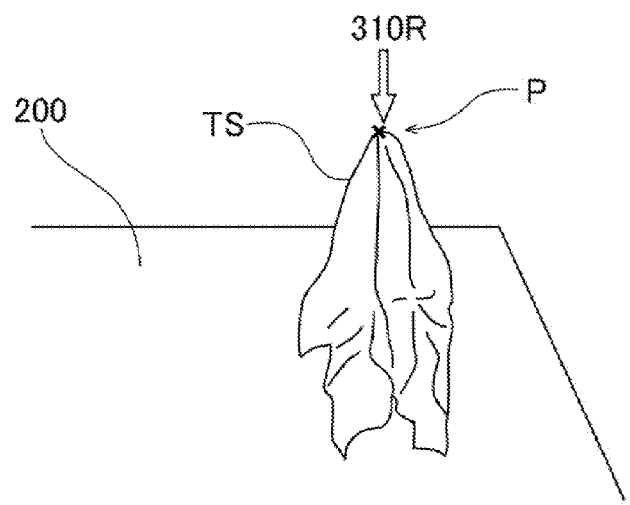

FIG. 13
(d) MOVING IN CONTACT WITH PLATEN
(HORIZONTAL MOVING OF CHUCK)
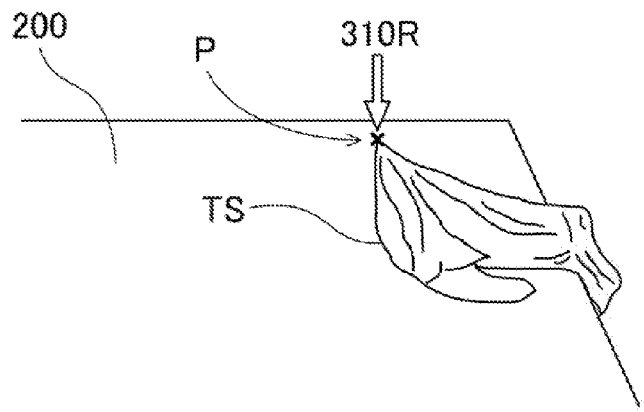
(e) PUTTING OF CLOTHING (FIRST END POINT DETECTION)
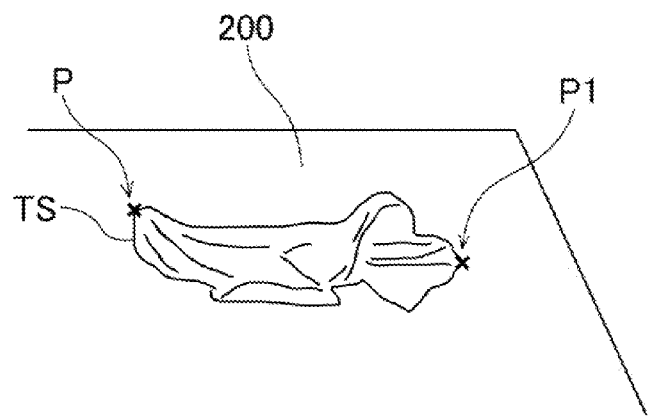
(f) CLAMPING OF FIRST END POINT
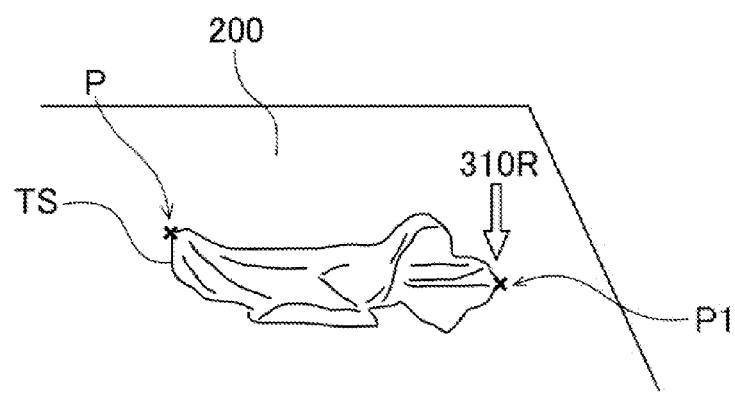

FIG. 14
(g) HANGING (ELEVATION OF CHUCK)
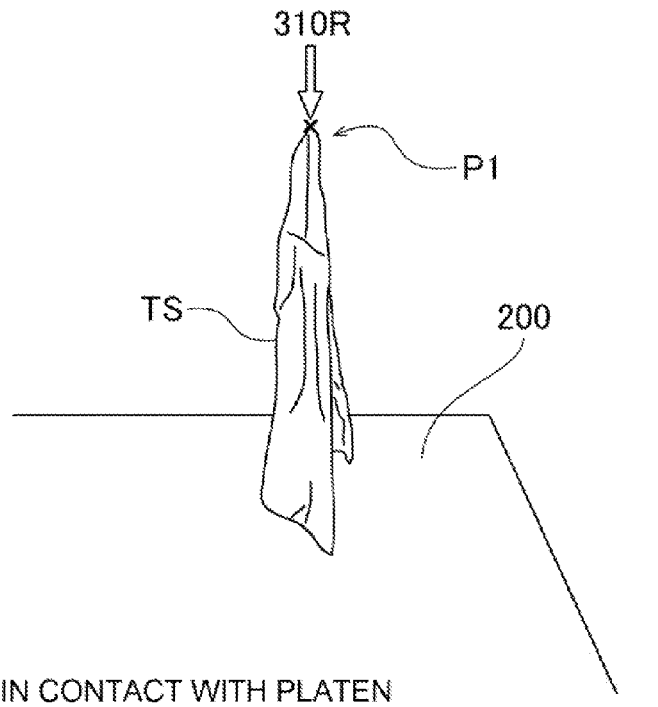
(h) MOVING IN CONTACT WITH PLATEN
(HORIZONTAL MOGING OF CHUCK)
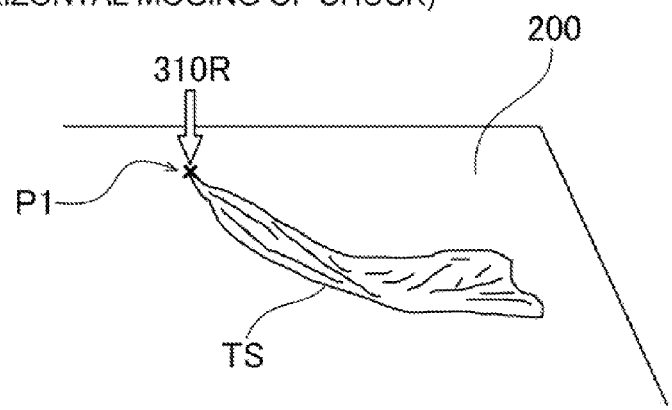
(i) PUTTING OF CLOTHING
(SECOND END POINT DETECTION)
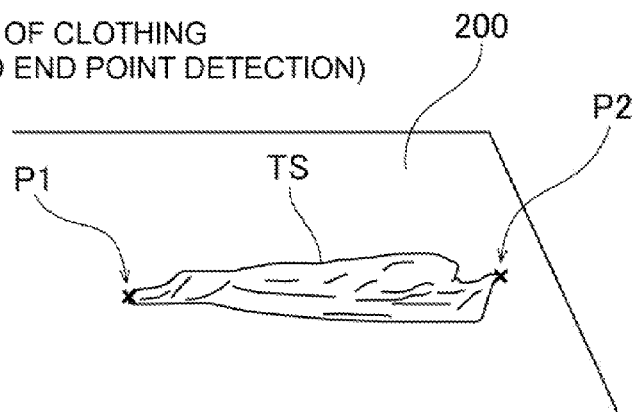

FIG. 15
(j) CLAMPING OF FIRST END POINT AND SECOND END POINT
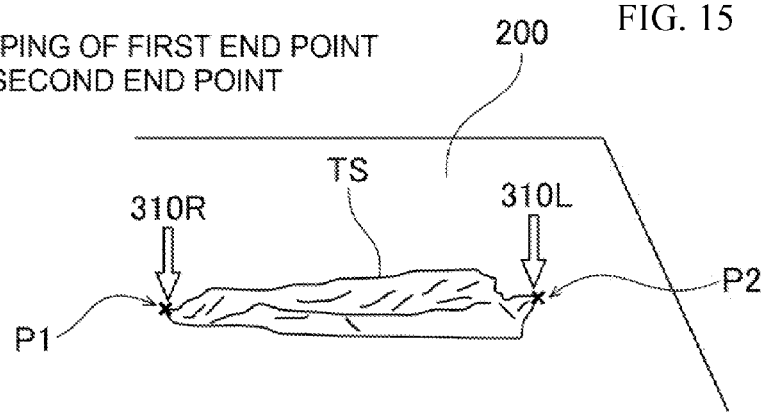
(k) HANGING (ELEVATION OF CHUCKS)
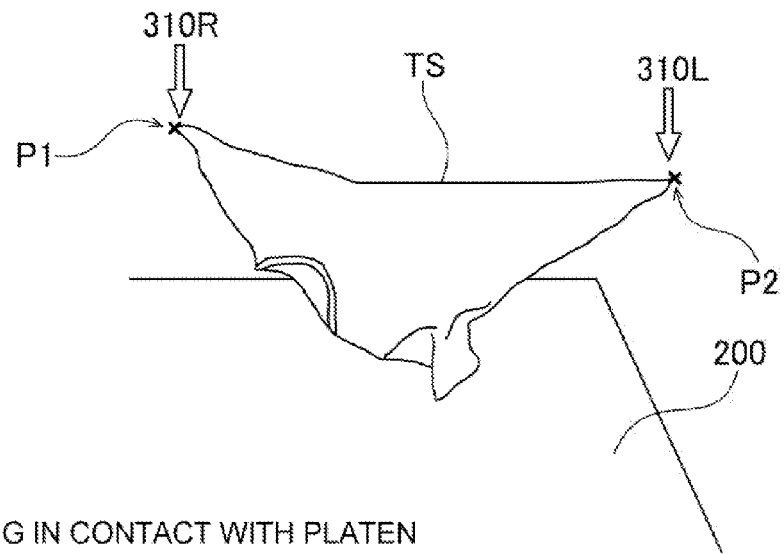
(l) MOVING IN CONTACT WITH PLATEN (HORIZONTAL MOVING OF CHUCKS)
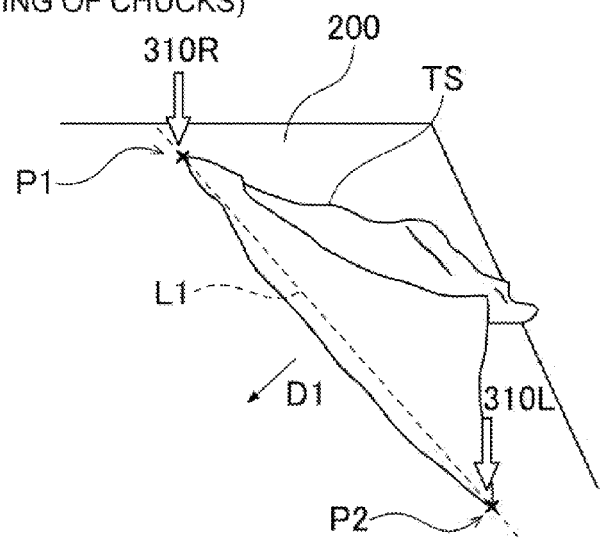

FIG. 16
(m) PUTTING OF CLOTHING
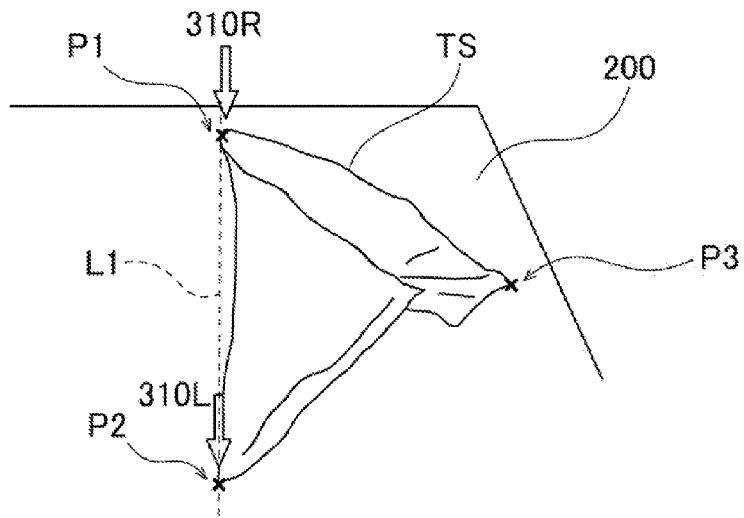
(n) CLAMPING OF FIRST END POINT AND THIRD END POINT
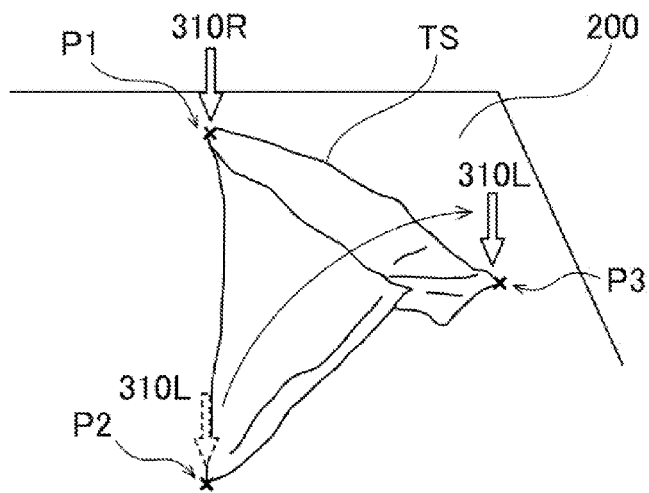
(o) HANGING (ELEVATION OF CHUCKS)
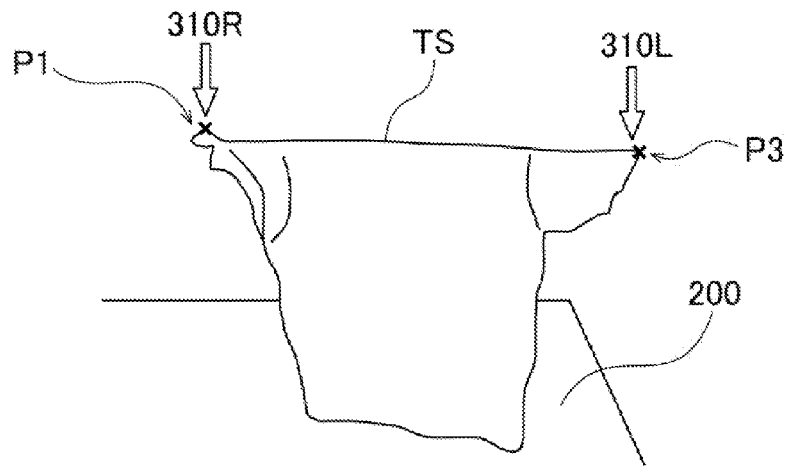

FIG. 17
(p) MOVING IN CONTACT WITH PLATEN
(HORIZONTAL MOVING OF CHUCKS)
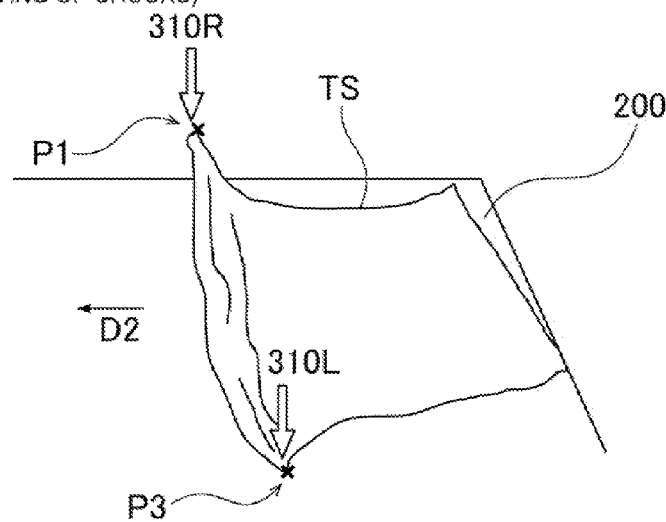
(q) PUTTING OF CLOTHING
(RECTANGULAR RECOGNITION)
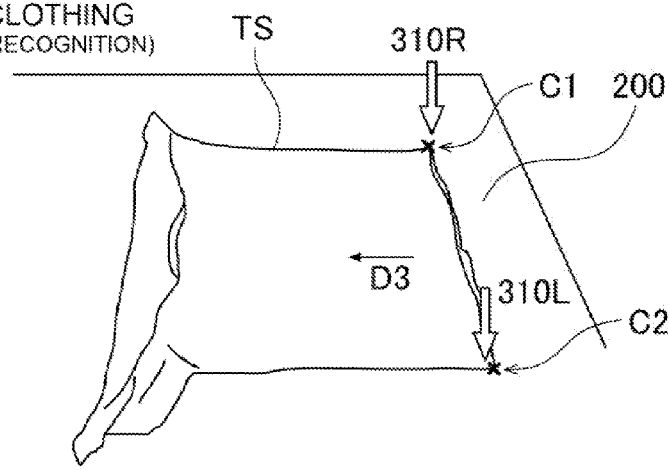
(r) TURNING OVER OF CLOTHING
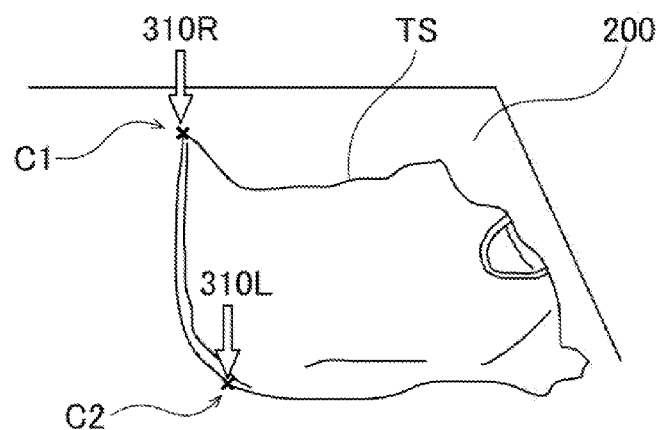

FIG. 18
(s) COLLAR RECOGNITION
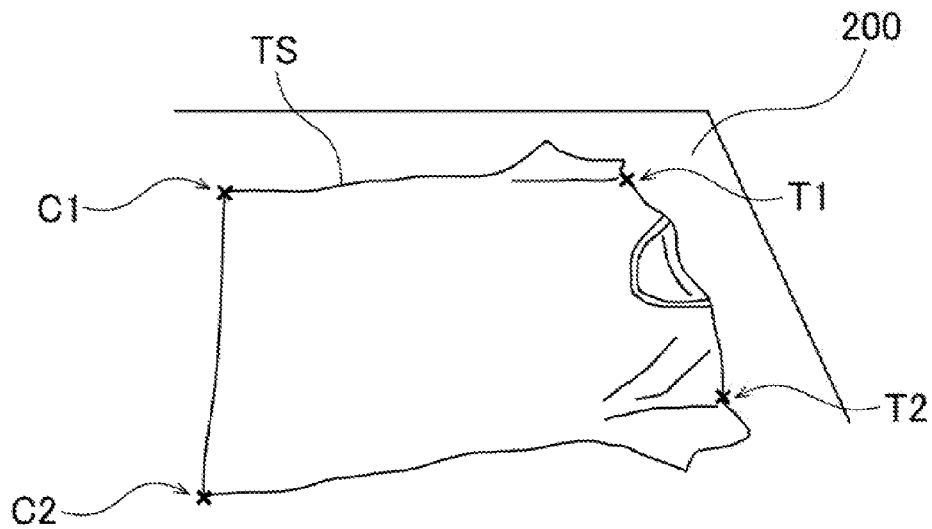
(t) CLAMPING OF BOTH SHOULDERS
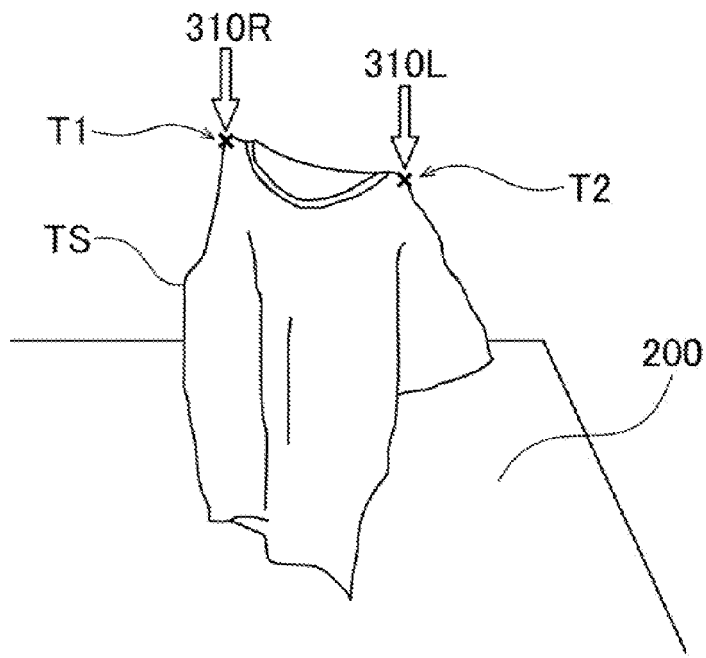

FIG. 20
(a) UNTIDY STATE
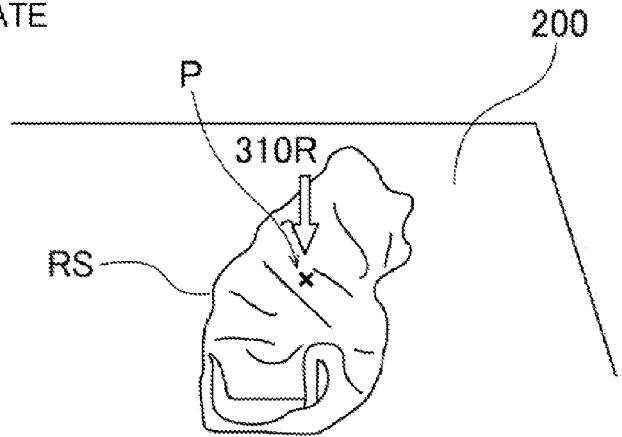
(b) HANGING (ELEVATION OF CHUCK)
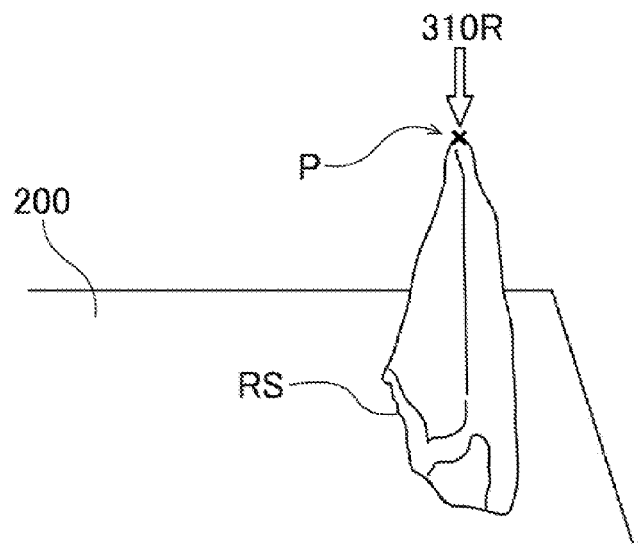
(c) MOVING IN CONTACT WITH PLATEN (HORIZONTAL MOVING OF CHUCK)
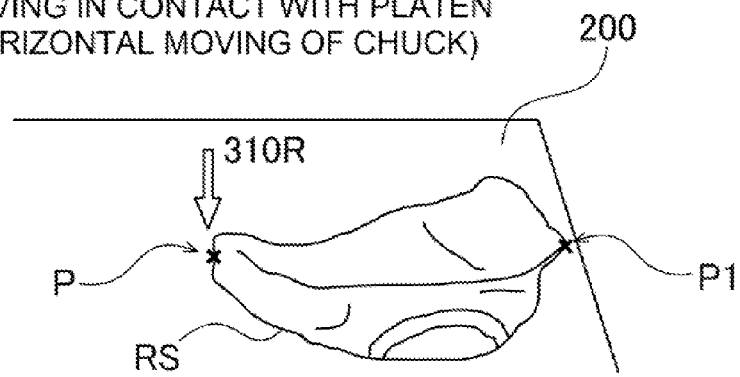

FIG. 21
(d) CLAMPING OF FIRST END POINT
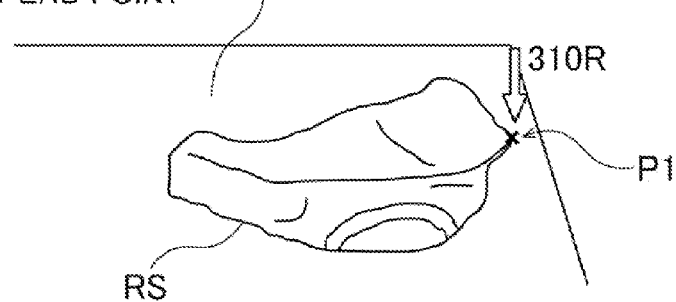
(e) MOVING IN CONTACT WITH PLATEN
(HORIZONTAL MOVING OF CHUCK)
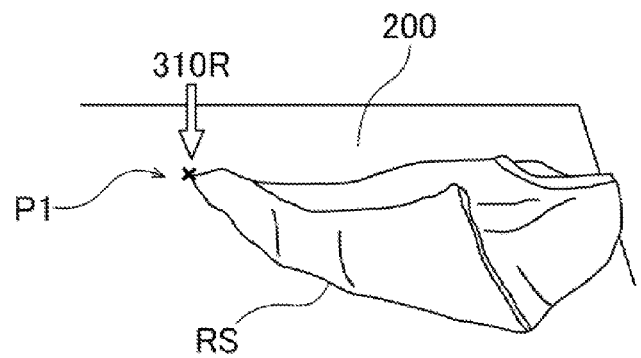
(f) CLAMPING OF FIRST END POINT AND SECOND END POINT
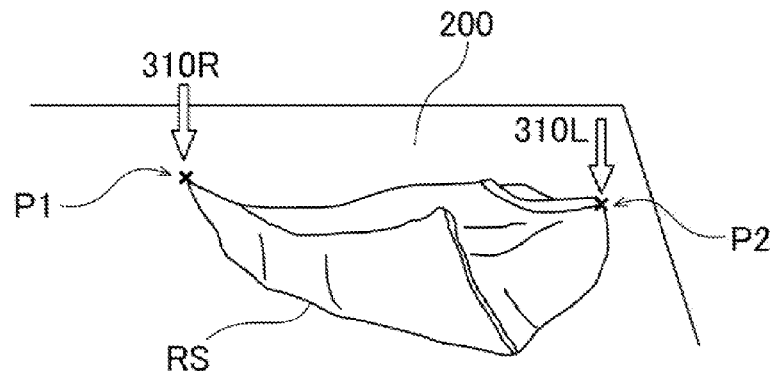

FIG. 22
(g) MOVING IN CONTACT WITH PLATEN
(HORIZONTAL MOVING OF CHUCKS)
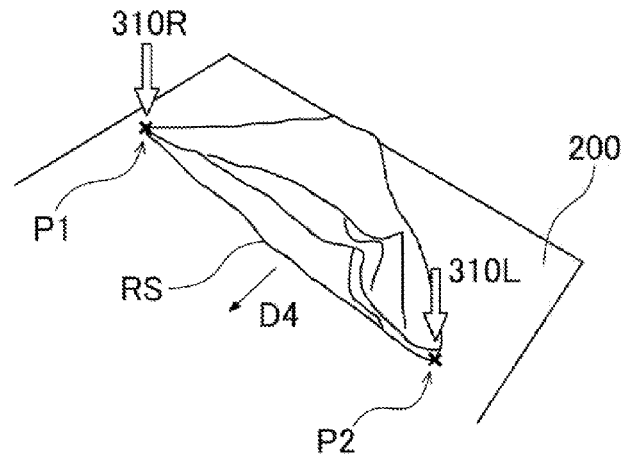
(h) CLAMPING OF FIRST END POINT AND THIRD END POINT
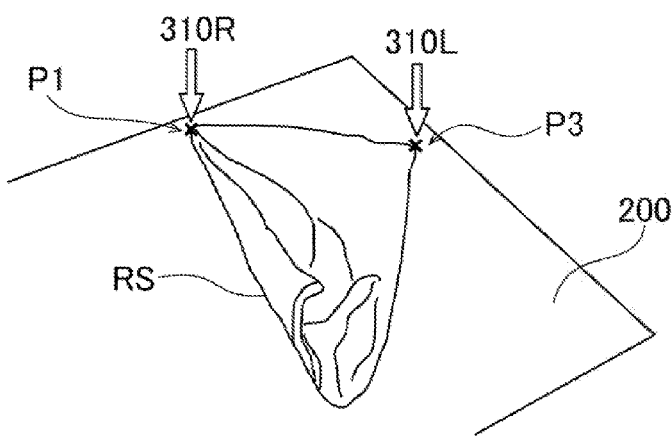
(i) HANGING (ELEVATION OF CHUCKS)
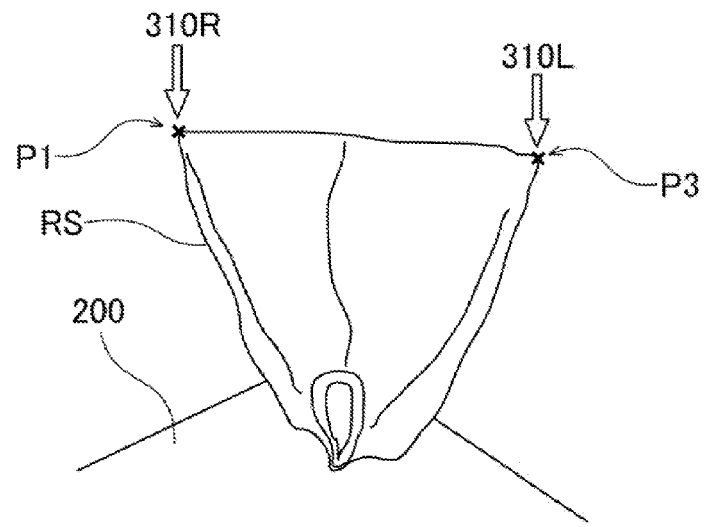

(j) MOVING IN CONTACT WITH PLATEN
(HORIZONTAL MOVING OF CHUCKS)
FIG. 23
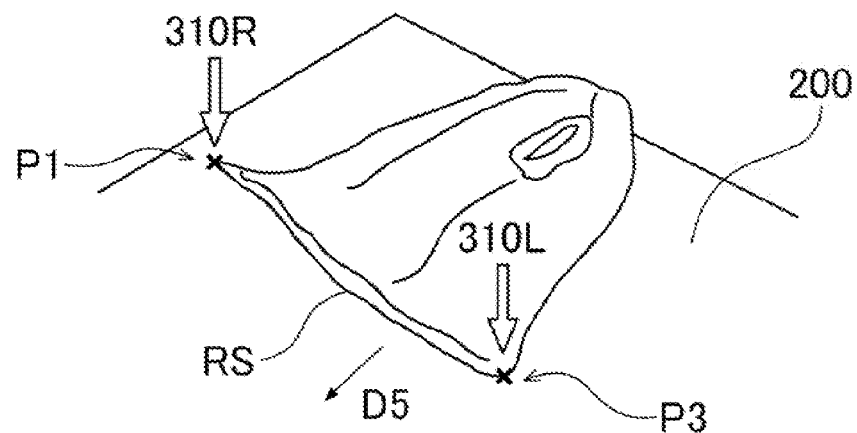
(k) RECTANGULAR DETECTION AND COLLAR DETECTION
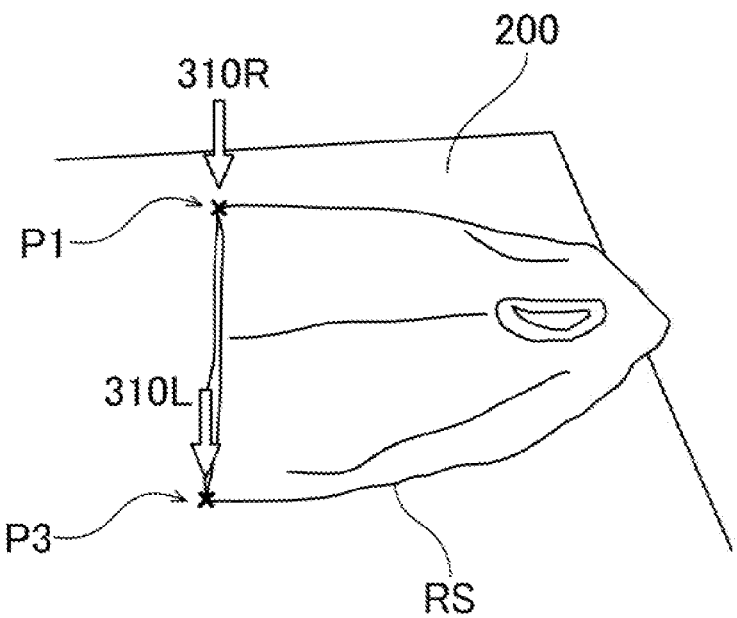

FIG. 24
(l) HANGING (ELEVATION OF CHUCKS)
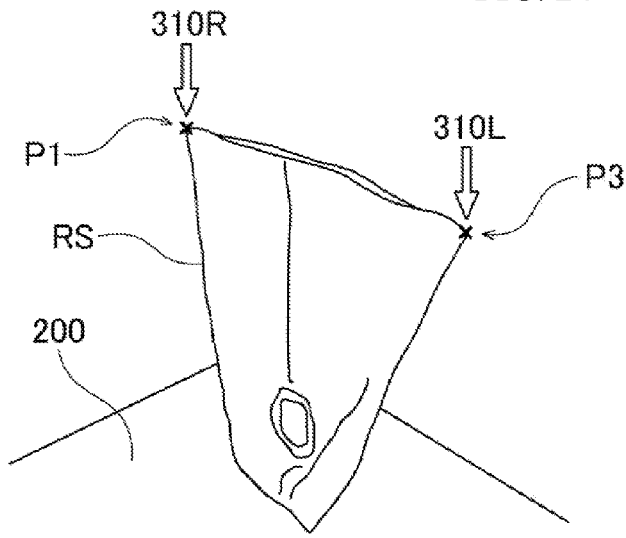
(m) CONTACT WITH PLATEN AT BOTTOM END
(LOWERING OF CHUCKS)
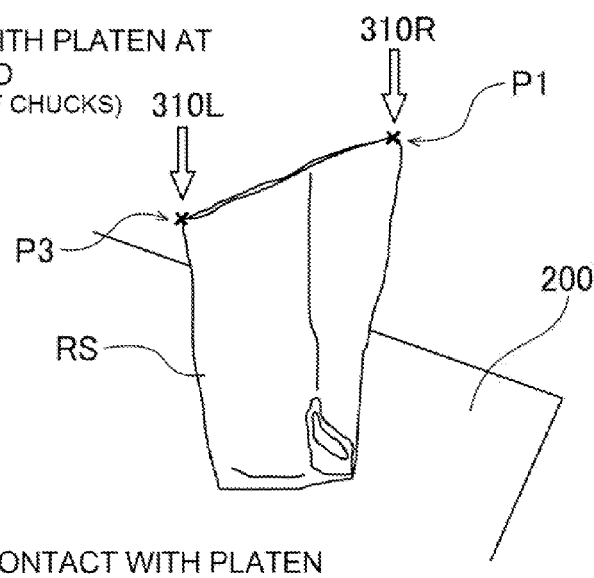
(n) MOVING IN CONTACT WITH PLATEN
(HORIZONTAL MOVING OF CHUCKS)
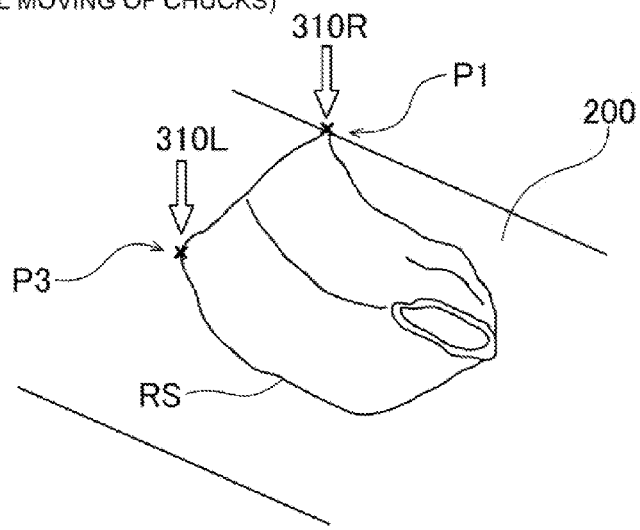

FIG. 25
(o) CLAMPING OF FOURTH END POINT
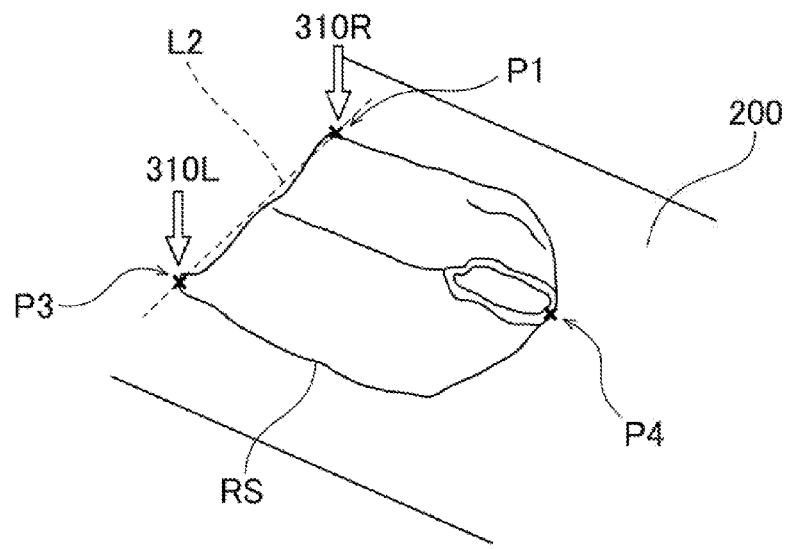
(p) HANGING (ELEVATION OF CHUCK)
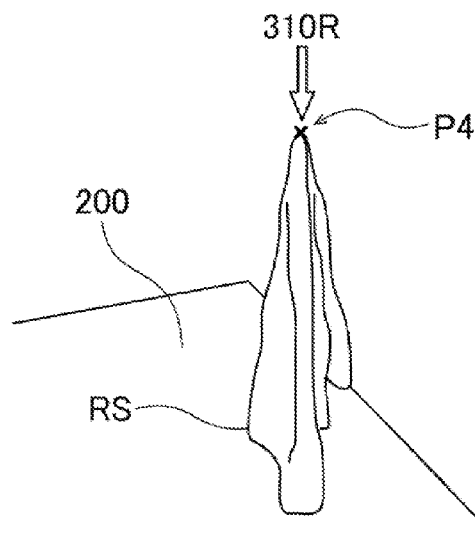
(q) MOVING IN CONTACT WITH PLATEN (HORIZONTAL MOVING OF CHUCK)
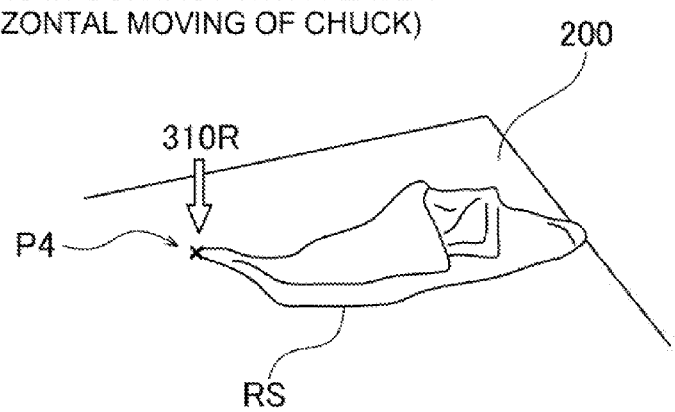

FIG. 26
(r) CLAMPING OF FOURTH END POINT AND FIFTH END POINT
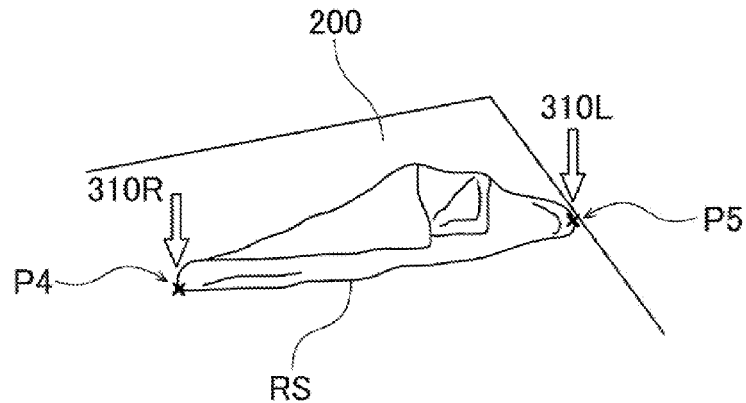
(s) HANGING (ELEVATION OF CHUCKS)
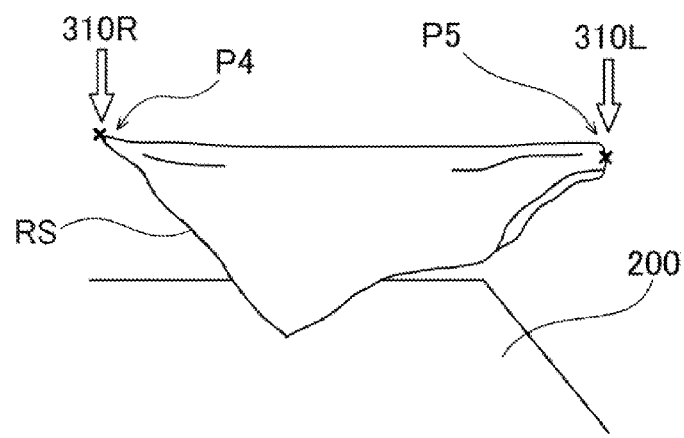
(t) MOVING IN CONTACT WITH PLATEN
(HORIZONTAL MOVING OF CHUCKS)
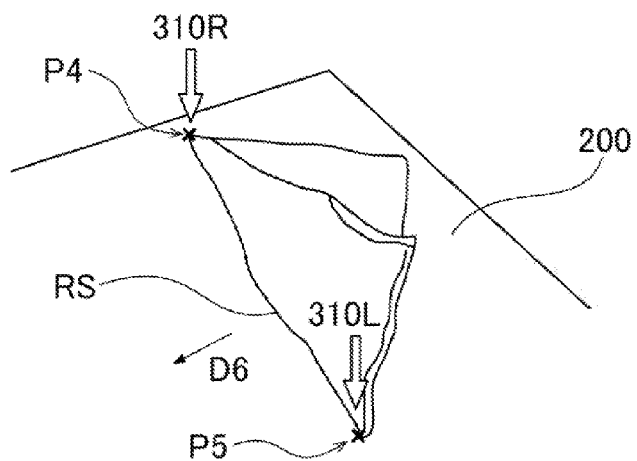

(u) CLAMPING OF FOURTH END POINT AND SIXTH END POINT
FIG. 27
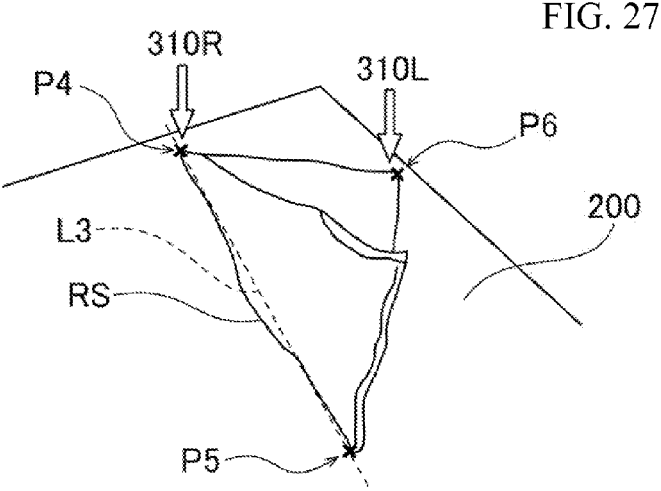
(v) HANGING (ELEVATION OF CHUCKS)
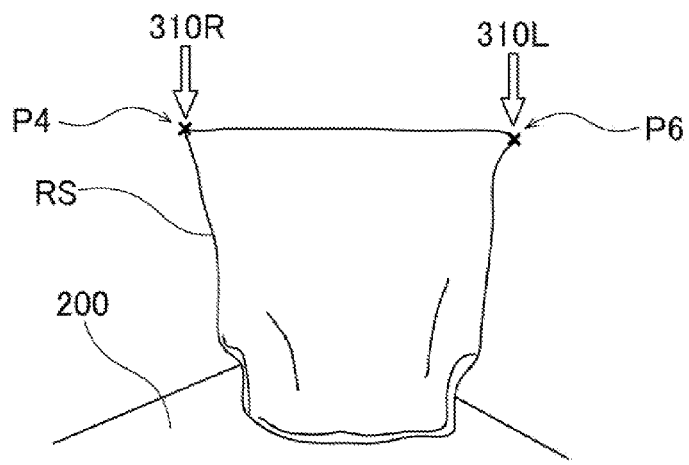
(w) HEM RECOGNITION (QUADRANGLE RECOGNITION)
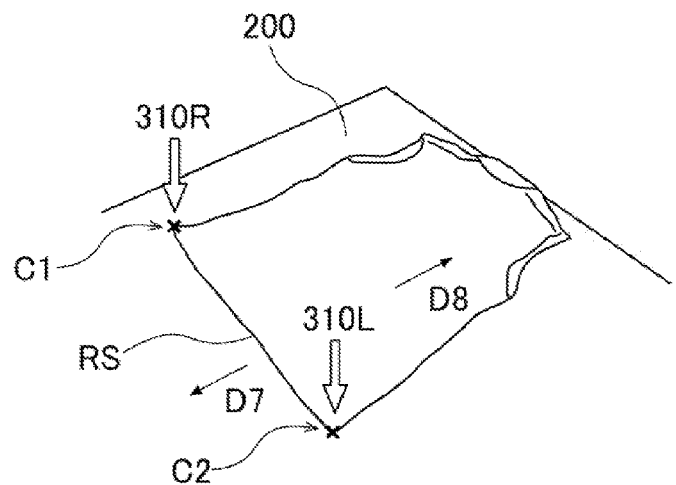

FIG. 28
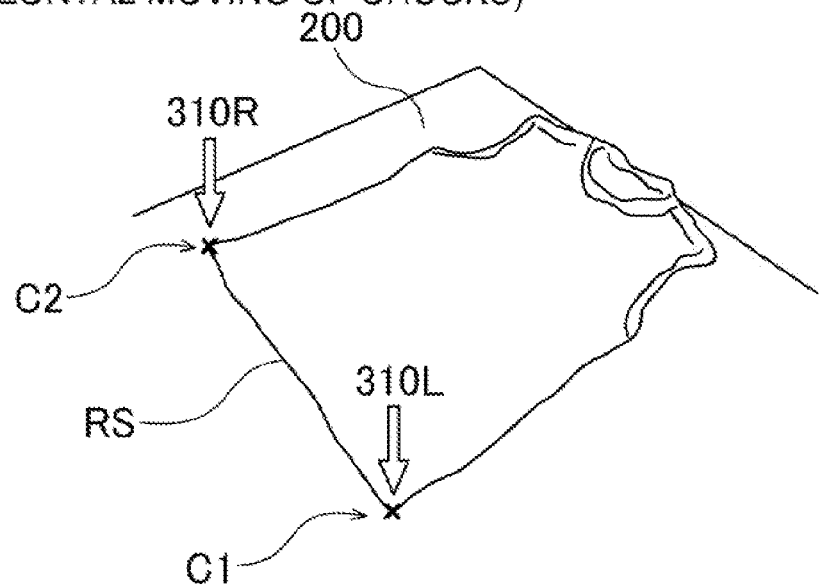
(x) MOVING IN CONTACT WITH PLATEN
(HORIZONTAL MOVING OF CHUCKS)
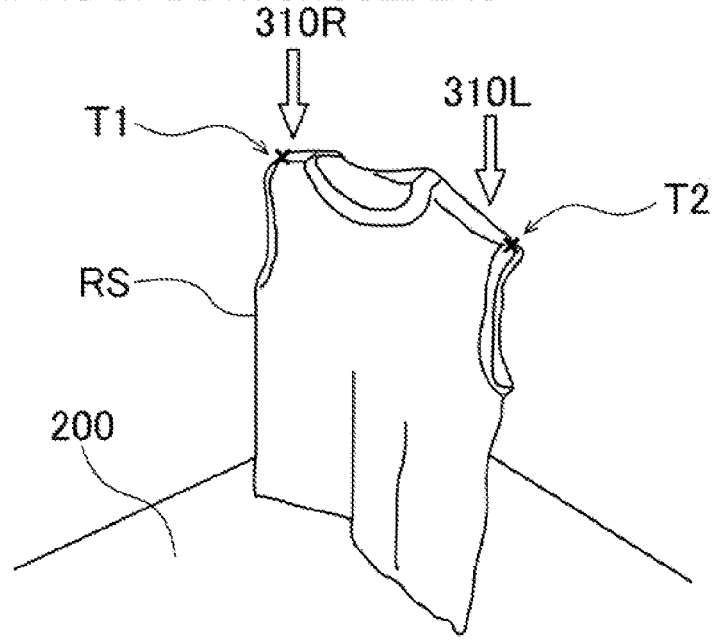
(y) CLAMPING OF BOTH SHOULDERS FIG. 29
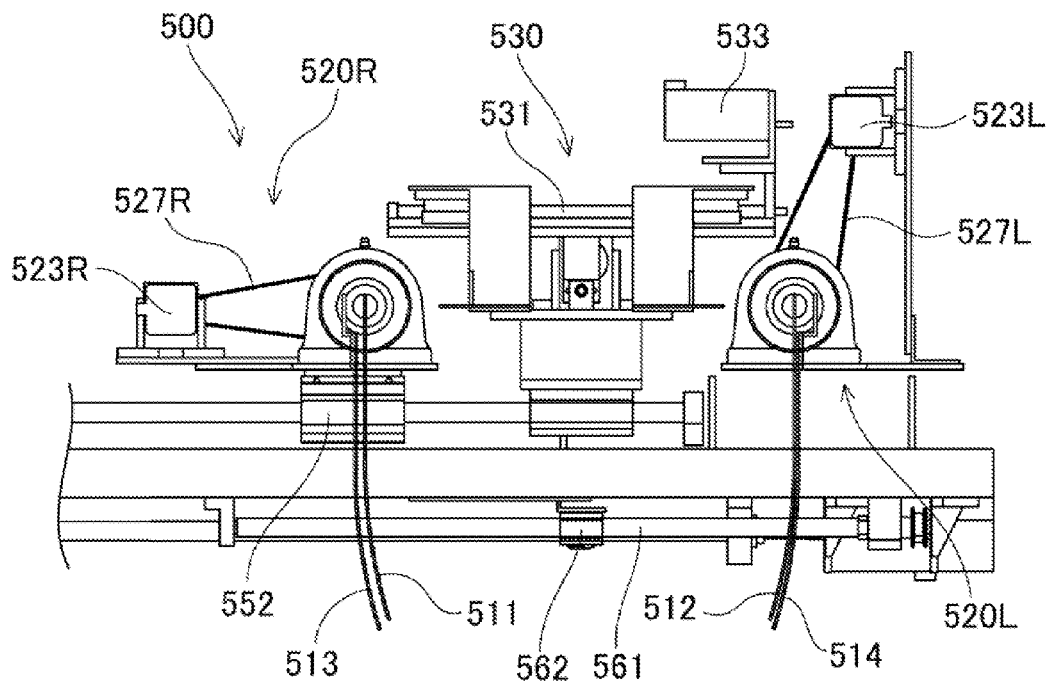
(a)
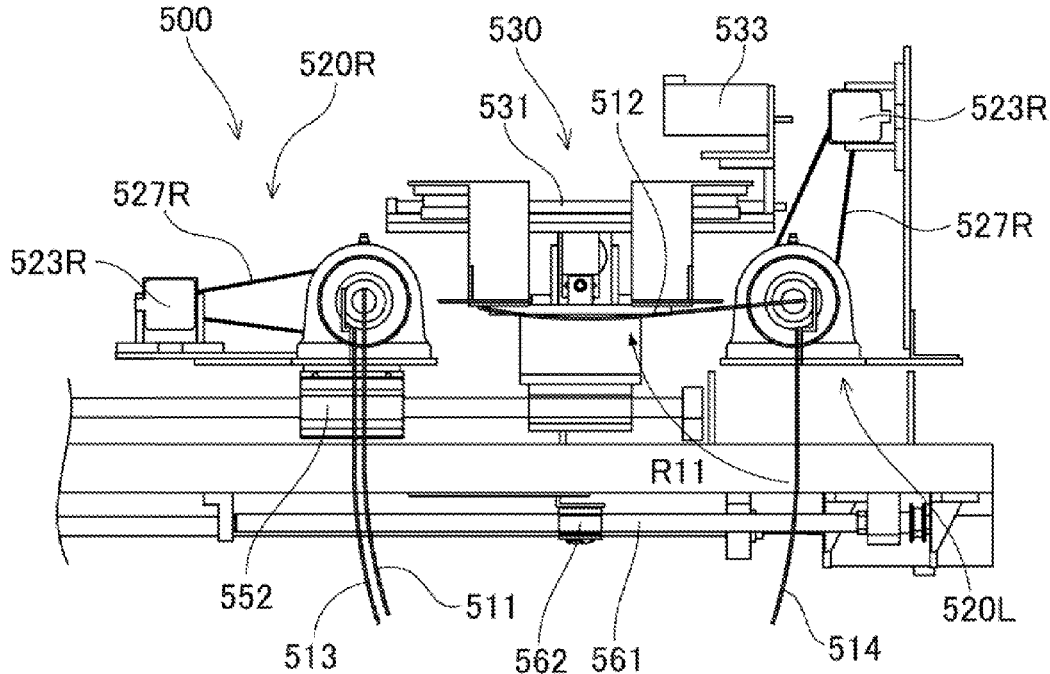
(b)

FIG. 30
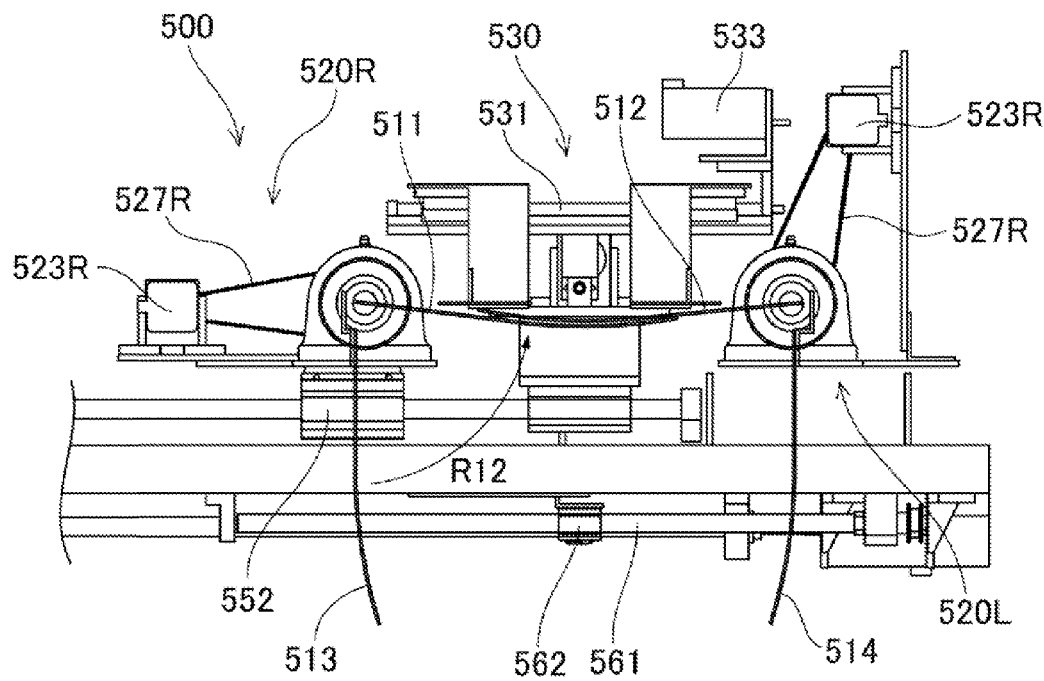
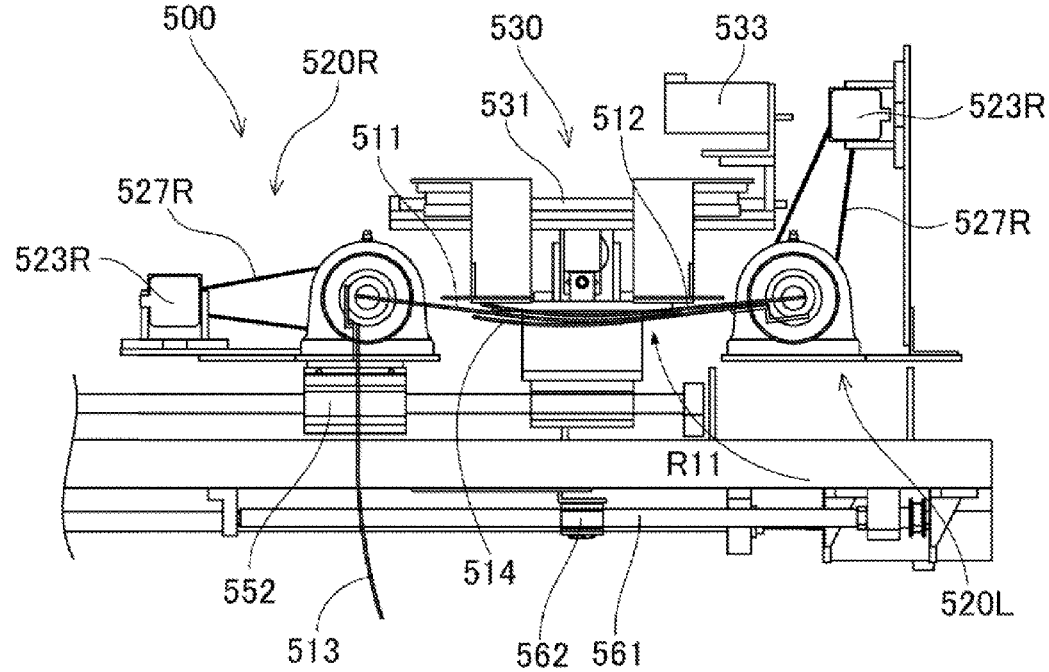

FIG. 31
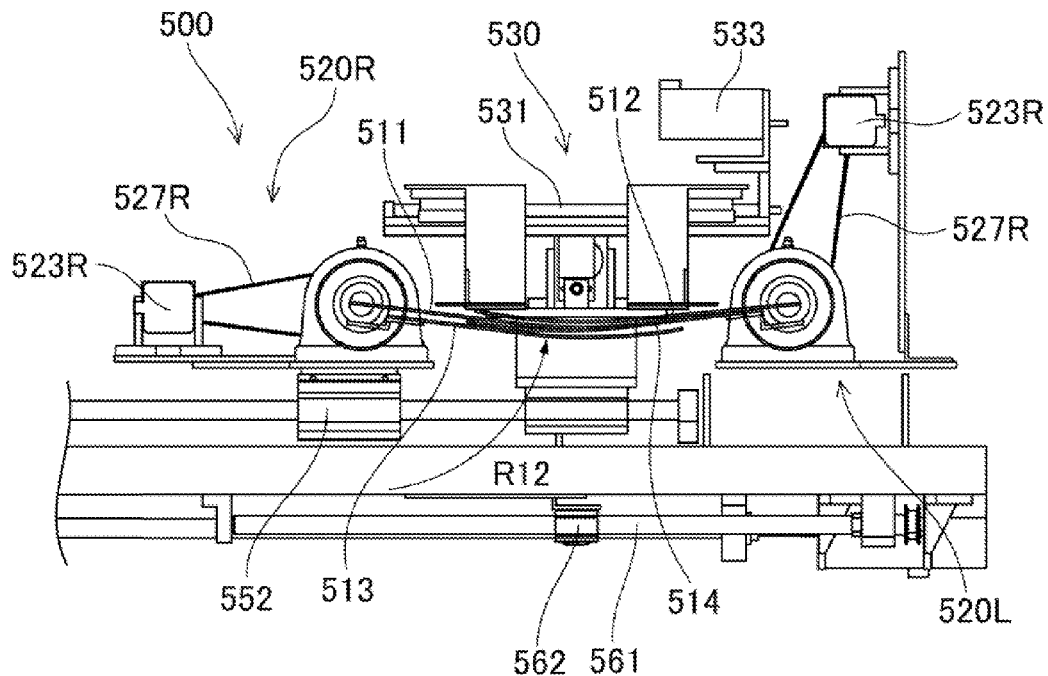
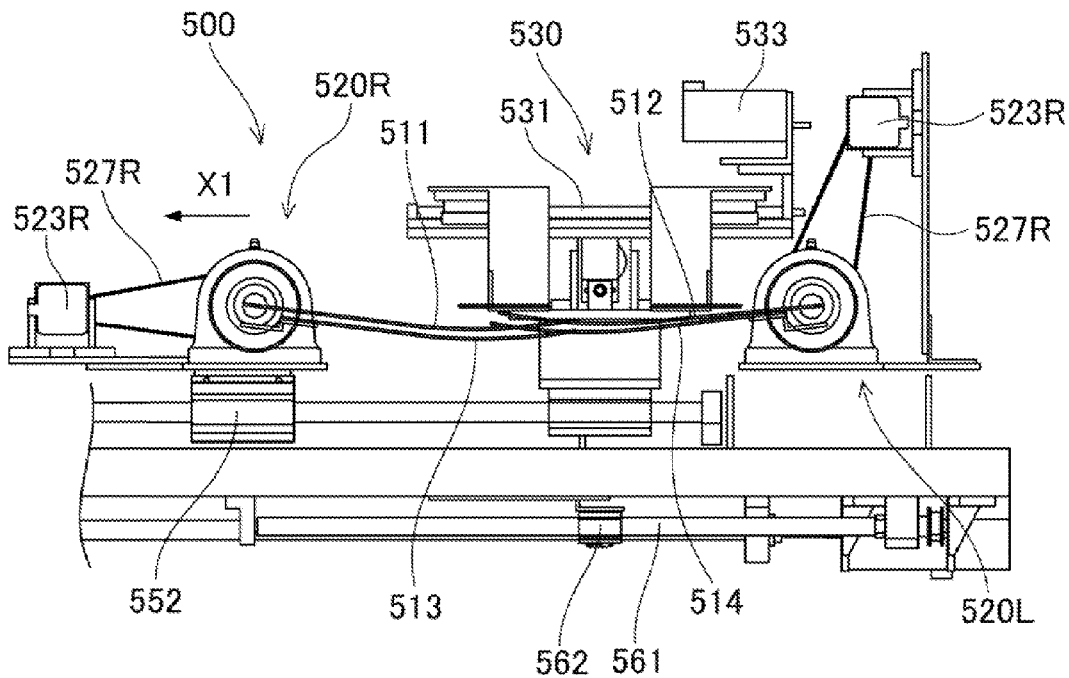

FIG. 34
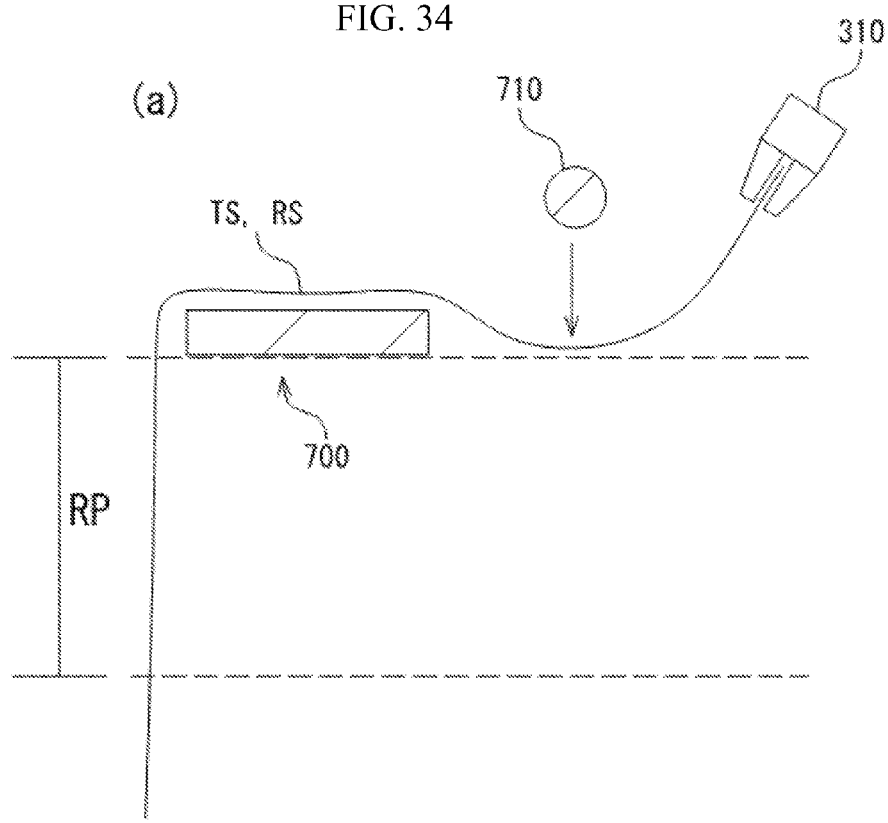
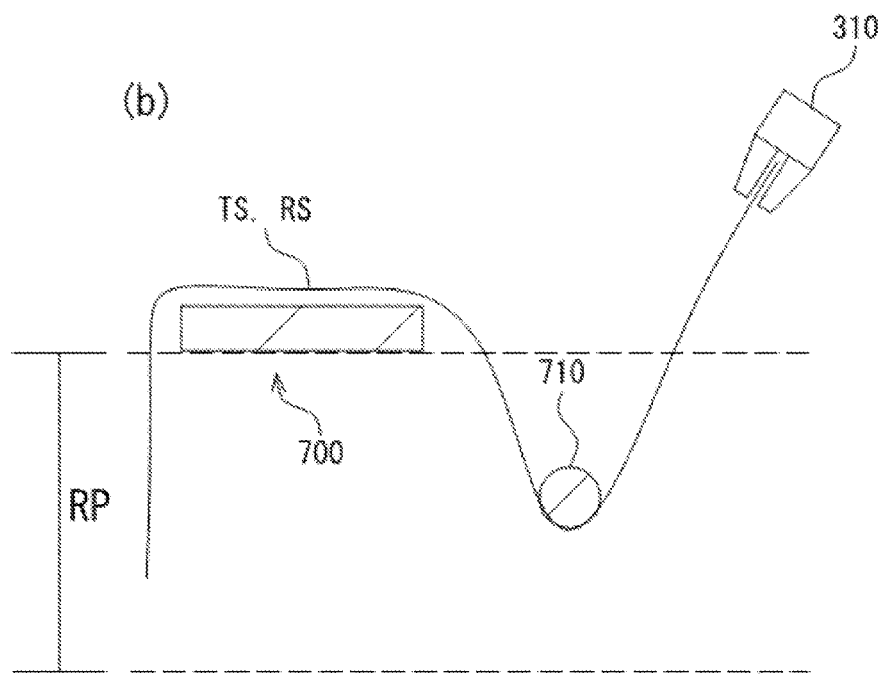

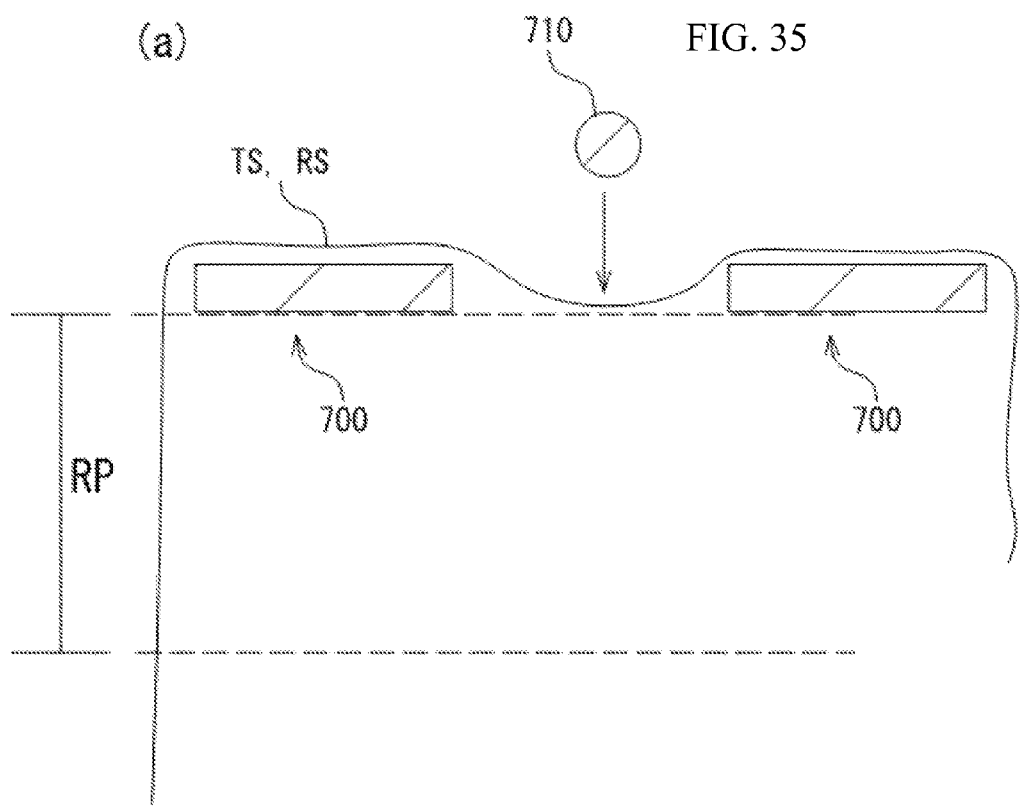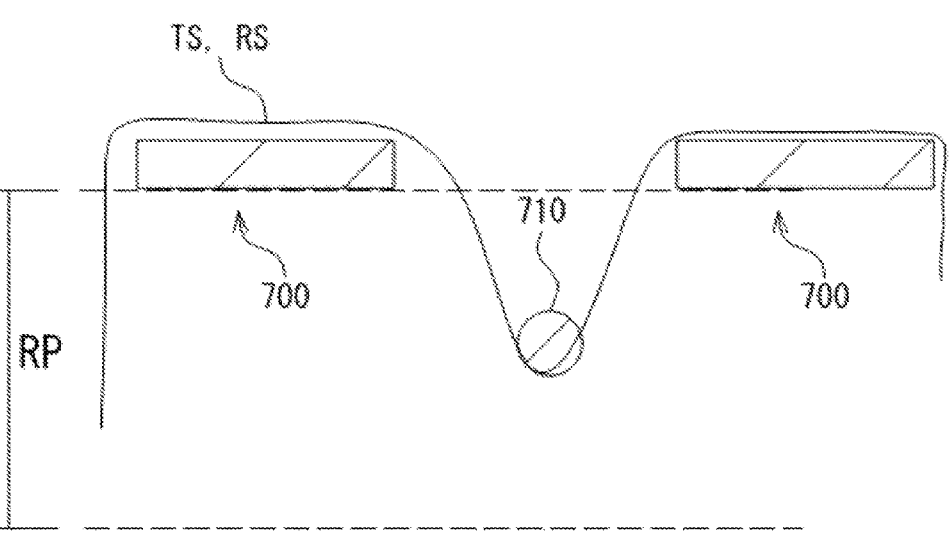
FIG. 35

DEFORMABLE THIN OBJECT SPREADING DEVICE AND METHOD

TECHNICAL FIELD

The present disclosure relates to a deformable thin object spreading device and a method for spreading a deformable thin object such as clothing.

BACKGROUND ART

In recent years, demands have been heard for development of robots capable of automating the handling of fabric. This may, for example, include transporting fabric, piling fabric, and folding fabric in the apparel industry, the cleaning industry, the linen supply industry, the welfare industry, and the medical industry.

Incidentally, it is necessary to establish a technology for spreading fabric in order to implement an automated handling of fabric. A variety of proposals have been made for the technology of spreading fabric (e.g., see PTL 1).

PTL 1 discloses a spreading device including: a first clamp for clamping a first corner of fabric; a fabric spreading clamp for spreading the fabric clamped by the first clamp; and a second clamp for clamping a second corner of the fabric spread by the fabric spreading clamp.

CITATION LIST

Patent Literature

PTL 1: Japan Laid-open Patent Application Publication No. 2002-321869.

SUMMARY OF THE INVENTION

Technical Problem

The spreading device disclosed in PTL 1 is configured to spread fabric by moving the fabric spreading clamp closer to the fabric such that a first corner thereof is clamped by the first clamp and by setting the fabric spreading clamp in a suction state. Further, the second clamp clamps the second corner which is exposed by spreading the fabric. The first clamp and the second clamp respectively clamp the first corner and the second corner, which are longitudinally adjacent, thereby spreading the fabric. As described above, the spreading device disclosed in PTL 1 requires the fabric spreading clamp to have a suction function in order to spread the fabric, and thus, the structure of the spreading device is complicated.

It is an object of the present disclosure to provide a deformable thin object spreading device capable of spreading a deformable thin object with a simplified structure.

Solution to Problem (1)

A deformable thin object spreading device according to an aspect of the present disclosure is a device for spreading a deformable thin object that includes a clamping unit, a moving mechanism, an endpoint detecting part, and a control part. The clamping unit is configured to clamp the deformable thin object. The moving mechanism is configured to move the clamping unit. The endpoint detecting part is configured to detect either an endpoint of the deformable thin object, which is disposed farthest away from either a first reference line or a first reference point, or an endpoint of the deformable thin object, which is disposed closest to either a second reference line or a second reference point. The first reference line, the first reference point, the second reference line, and the second reference point may be fixed, or alternatively, may be changed on an every endpoint detection basis.

The control part is configured to execute a first control, a second control, a third control, a fourth control, a fifth control, a sixth control, and a seventh control. In some embodiments, the controls are configured to execute sequentially. In the first control, the control part is configured to control the clamping unit and the moving mechanism to cause the clamping unit to clamp a first point of the deformable thin object. In the second control, the control part is configured to cause the endpoint detecting part to detect an endpoint. In the third control, the control part is configured to control the clamping unit and the moving mechanism to cause the clamping unit to clamp the endpoint of the deformable thin object detected in the second control (hereinafter referred to as "a first endpoint"). In the fourth control, the control part is configured to cause the endpoint detecting part to detect an endpoint. In the fifth control, the control part is configured to control the clamping unit and the moving mechanism to cause the clamping unit to clamp both of the first endpoint and the endpoint of the deformable thin object detected in the fourth control (hereinafter referred to as "a second endpoint"). In the sixth control, the control part is configured to cause the endpoint detecting part to detect an endpoint. In the seventh control, the control part is configured to control the clamping unit and the moving mechanism to cause the clamping unit to clamp both of the first endpoint or the second endpoint and the endpoint of the deformable thin object detected in the sixth control (hereinafter referred to as "a third endpoint").

The deformable thin object is one selected from the group of fabric (e.g., clothing, towels), film, paper, sheets, and other similar fabrics. Further, in the present disclosure, the shape of the deformable thin object is not limited to a particular shape, but may be rectangular, e.g., towels, or alternatively, may be roughly rectangular, e.g., T-shirts or sleeveless shirts.

The clamping unit may be a variety of structures, so long as it can clamp the deformable thin object. For example, the clamping unit includes a pair of fingers, and the pair of fingers is configured to be proximal to or away from each other.

The moving mechanism can be selected from the group including a belt slider mechanism, a ball screw mechanism, an air cylinder mechanism, a motor cylinder mechanism, an electronic slider mechanism, a linear slider mechanism, a rack and pinion mechanism, and other similar mechanisms. Each of the mechanisms is mainly formed by a driving source, a feeding member, and a guide member.

The belt slider mechanism is a slide moving mechanism including: a motor as the driving source; either a belt or a wire as the feeding member; and an LM guide member or the like as the guide member. The belt slider mechanism is configured to slide a moving object along the guide member by transferring motor rotation to either the belt or the wire. The ball screw mechanism is a slide moving mechanism including: a motor as the driving source; a ball screw or a trapezoidal screw as the feeding member; and an LM guide member or the like as the guide member. The ball screw mechanism is configured to slide a moving object along the guide member by transferring motor rotation to either the ball screw or the trapezoidal screw. The air cylinder mechanism is a slide moving mechanism including: an air compressor as the driving source; and a piston rod as a member serving as both of the feeding member and the guide member. The air cylinder mechanism is configured to slide a moving object attached to the piston rod by means of the linear motion of the piston rod. The motor cylinder mechanism is a slide moving mechanism including: a motor as the driving source; and a piston rod as a member serving as the feeding member and the guide member. The motor cylinder mechanism is configured to slide a moving object attached to the piston rod by transferring motor rotation to the ball screw. The electronic slider mechanism is a slide moving mechanism including: a motor as the driving source; a ball screw or the like as the feeding member; and an LM guide member or the like as the guide member. The electronic slider mechanism is configured to slide a moving object along the guide member by transferring motor rotation to the ball screw. The linear slider mechanism is a slide moving mechanism including: a magnet as the driving source; a magnet as the feeding member (similar to the driving source); and an LM guide member or the like as the guide member. The liner slider mechanism is configured to slide a moving object by means of the principles of a linear motor. The rack and pinion mechanism is a slide moving mechanism including: a motor as the driving source; a rack and a pinion as the feeding member; and an LM guide member or the like as the guide member. The rack and pinion mechanism is configured to slide a moving object attached to the rack along the guide member by rotating the pinion by means of motor rotation.

The endpoint detecting part may be configured to detect an endpoint of the deformable thin object by analyzing an image of the deformable thin object captured by imaging means such as a camera. Alternatively, the endpoint detecting part may be configured to detect the rear end of the deformable thin object in the moving direction by means of a sensor (e.g., a photo sensor), and may set the detected rear end as an end of the deformable thin object. The endpoint detecting part may be formed by a plurality of devices, or alternatively, may be formed by a single device.

When the control part is actuated, the clamping unit clamps the first point of the deformable thin object. Accordingly, it becomes possible to detect the first endpoint of the deformable thin object, which is disposed farthest away from the first point. Then, the clamping unit clamps the first endpoint of the deformable thin object. Thus, a corner portion of the deformable thin object is configured to be clamped by the clamping unit. With the first endpoint of the deformable thin object clamped, the second endpoint of the deformable thin object, which is disposed farthest away from the first endpoint, may be detected. Then, the clamping unit clamps both of the first endpoint and the second endpoint of the deformable thin object. Thus, in addition to the aforementioned corner portion of the deformable thin object, another corner portion disposed diagonally to the aforementioned corner portion is configured to be clamped by the clamping unit. With both of the first endpoint and the second endpoint of the deformable thin object clamped, the third endpoint of the deformable thin object, which is disposed farthest away from the straight line connecting the first endpoint and the second endpoint, may be detected. Then, the clamping unit clamps the first endpoint or the second endpoint and the third endpoint of the deformable thin object. Thus, two adjacent corner portions of the deformable thin object are configured to be clamped by the clamping unit, and the deformable thin object of an untidy state is spread.

As described above, in the present deformable thin object spreading device, when both of the first endpoint and the second endpoint of the deformable thin object are clamped, the third endpoint may be detected and clamped. As a result, the third endpoint may be detected and clamped without using a suction device for spreading the deformable thin object. Therefore, the deformable thin object spreading device can spread the deformable thin object with a simple structure.

(2)

In the deformable thin object spreading device according to the aforementioned (1), the control part is further configured to execute an eighth control after the fifth control and before the sixth control. In the eighth control, the control part is configured to control the moving mechanism so that a straight line connecting the first endpoint and the second endpoint is arranged in a roughly horizontal direction. In the eighth control, the first endpoint and the second endpoint are being clamped by the clamping unit.

As a result, it may be easier to detect the third endpoint by the endpoint detecting part in the sixth control.

(3)

In the deformable thin object spreading device according to the aforementioned (1) or (2), the control part is configured to: cause the endpoint detecting part to detect the first endpoint disposed farthest away from the first point in the second control; cause the endpoint detecting part to detect the second endpoint disposed farthest away from the first endpoint in the fourth control; and cause the endpoint detecting part to detect the third endpoint disposed farthest away from a straight line connecting the first endpoint and the second endpoint in the sixth control.

When the control part is actuated, the endpoint detecting part is configured to: detect the first endpoint disposed farthest away from the first point in the second control; detect the second endpoint disposed farthest away from the first endpoint in the fourth control; and detect the third endpoint disposed farthest away from the straight line connecting the first endpoint and the second endpoint in the sixth control.

(4)

In the deformable thin object spreading device according to the aforementioned (1) or (2), the first reference line is fixed. When endpoint detection is executed while the deformable thin object is put on a mounting region, the first reference line is arranged on the away side of an endpoint appearing region. Conversely, when endpoint detection is executed while the deformable thin object is hung on a hanging member, the first reference line is arranged on the upper side of the endpoint appearing region. Further, the first reference line may be physically disposed on the mounting region or the hanging member, or alternatively, may be provided as a part of image data in an image device forming the endpoint detecting part. The control part is configured to: cause the endpoint detecting part to detect the first endpoint disposed farthest away from the first reference line in the second control; cause the endpoint detecting part to detect the second endpoint disposed farthest away from the first reference line in the fourth control; and cause the endpoint detecting part to detect the third endpoint disposed farthest away from the first reference line in the sixth control.

When the control part is actuated, the endpoint detecting part detects the first endpoint disposed farthest away from the first reference line in the second control, detects the second endpoint disposed farthest away from the first reference line in the fourth control, and detects the third endpoint disposed farthest away from the first reference line in the sixth control.

(5)

In the deformable thin object spreading device according to the aforementioned (1) or (2), the second reference line is fixed. When endpoint detection is executed while the deformable thin object is on a mounting region, the second reference line is arranged on the near side of an endpoint appearing region. On the other hand, when endpoint detection is executed while the deformable thin object is hung on a hanging member, the first reference line is arranged on the lower side of the endpoint appearing region. Further, the second reference line may be physically disposed on the mounting region or the hanging member, or alternatively, may be provided as a part of image data in an image capturing device forming the endpoint detecting part. Further, in the present deformable thin object spreading device, the control part is configured to: cause the endpoint detecting part to detect the first endpoint disposed closest to the second reference line in the second control; cause the endpoint detecting part to detect the second endpoint disposed closest to the second reference line in the fourth control; and cause the endpoint detecting part to detect the third endpoint disposed closest to the second reference line in the sixth control.

When the control part is actuated, the endpoint detecting part detects the first endpoint disposed closest to the second reference line in the second control, detects the second endpoint disposed closest to the second reference line in the fourth control, and detects the third endpoint disposed closest to the second reference line in the sixth control.

(6)

In the deformable thin object spreading device according to any of the aforementioned (1) to (5), the control part is further configured to execute a ninth control after the seventh control. In the ninth control, the control part is configured to control the clamping unit and the moving mechanism to cause the clamping unit to clamp both of (1) either the first endpoint or the second endpoint, which was not clamped in the seventh control and (2) the third endpoint of the deformable thin object.

When the spreading of the deformable thin object has not been completed even though the control part executed the first through seventh controls, the deformable thin object is clamped by the clamping unit at a combination of endpoints different from those clamped by the clamping unit in the seventh control. In other words, the deformable thin object can be spread by changing endpoints to be clamped by the clamping unit from those clamped in the seventh control to the others.

Further, in the present deformable thin object spreading device, the deformable thin object is clamped by the clamping unit at a combination of endpoints different from those clamped in the seventh control. Therefore, it is possible to prevent the deformable thin object from being repeatedly clamped at the same endpoints. Accordingly, it is possible to delay an increase in the frequency of clamping by the clamping unit until spreading of the deformable thin object is completed. Accordingly, the spreading time of the deformable thin object may be reduced.

(7)

In the deformable thin object spreading device according to any of the aforementioned (1) to (6), the control part is configured to control the clamping unit and the moving mechanism to cause the clamping unit to clamp both of (1) either of the first endpoint and the second endpoint, which is disposed farthest away from the third endpoint and (2) the third endpoint of the deformable thin object in the seventh control.

In the present deformable thin object spreading device, when either clamping unit clamps the third endpoint, one clamping unit clamps the closer of the first and second endpoints to the third endpoint, and is moved to clamp the third endpoint without moving another clamping unit to clamp the farther of the first and second endpoints from the third endpoint. In other words, it is possible to reduce the moving distance of the clamping unit to clamp the third endpoint. Accordingly, the spreading time of the deformable thin object may be reduced.

(8)

The deformable thin object spreading device according to any of the aforementioned (1) to (7) further includes a mounting region on which the deformable thin object is placed. Further, the control part is configured to control the clamping unit and the moving mechanism so that the deformable thin object clamped by the clamping unit is moved in contact with the mounting region between the first control and the second control, between the third control and the fourth control, and between the fifth control and the sixth control.

Specifically, the control part is configured to execute: a first control of moving the clamping unit and the moving mechanism so that the folding object clamped at its first point is in contact with the mounting region after the first control; a second control moving the clamping unit and the moving mechanism so that the folding object clamped at its first endpoint is in contact with the mounting region after the second control; and a third control moving the clamping unit and the moving mechanism so that the folding object clamped at both of its first and second endpoints is in contact with the mounting region after the third control.

In the present deformable thin object spreading device, frictional force is produced in the deformable thin object in a direction opposite to the moving direction of the deformable thin object when the deformable thin object is moved in contact with the mounting region. Accordingly, the deformable thin object spreading device may resolve twisting and tangling of the deformable thin object. As a result, the endpoint detecting part can detect the rear end of the deformable thin object in the moving direction of the clamping unit as one of the endpoints (the first endpoint, the second endpoint, and the third endpoint) of the deformable thin object.

Work can be executed while the deformable thin object is placed on the mounting region. Accordingly, when either of the clamping units clamps the third endpoint in the seventh control (after the fifth control causes the clamping units to clamp both of the first endpoint and the second endpoint), it is possible to use, as the clamping unit for clamping the third endpoint, either of: one clamping unit clamping the first endpoint; and another clamping unit clamping the second endpoint. In other words, the clamping units are only required to be able to simultaneously clamp two of the three points, i.e., the first endpoint, the second endpoint and the third endpoint, not to simultaneously clamp all of the three endpoints. Thus, the number of clamping units may not need to be increased. Accordingly, the clamping units are simply structured.

(9)

The deformable thin object spreading device according to any of the aforementioned (1) to (8) further includes a first characteristic portion detecting part and a second characteristic portion detecting part. The first characteristic portion detecting part is configured to detect a first characteristic portion of the deformable thin object. The second characteristic portion detecting part is configured to detect a second characteristic portion of the deformable thin object. Further, the control part is further configured to execute a tenth control after the seventh control in response to detecting the first characteristic portion of the deformable thin object by the first characteristic portion detecting part while the second characteristic portion of the deformable thin object is detected by the second characteristic portion detecting part. In the tenth control, the control part is configured to control the clamping unit and the moving mechanism to cause the clamping unit to clamp a position of the deformable thin object set with reference to the second characteristic portion.

In the case of a T-shirt or a sleeveless shirt, the first characteristic portion is, for example, the roughly rectangular shape of the contour, the corner shape of the hem portion, or other similar portions.

Conversely, in the case of a T-shirt or a sleeveless shirt, the second characteristic portion is, for instance, the collar portion, or other similar portions.

In the present deformable thin object spreading device, a plurality of deformable thin objects are aligned in a position set with reference to the second characteristic portion through clamping of a position set with reference to the second characteristic portion by the clamping unit. Accordingly, folding can be smoothly executed in the folding device disposed downstream of the present deformable thin object spreading device.

The first characteristic portion and the second characteristic portion can be detected while the deformable thin object is placed on the mounting region. As a result, the deformable thin object is set in a stable state when placed on a platen, in comparison with the configuration of hanging the deformable thin object. As a result, the rate of recognizing the first characteristic portion and the second characteristic portion is enhanced in comparison with the rate of recognizing the first characteristic portion and the second characteristic portion while the deformable thin object is hung.

(10)

In the deformable thin object spreading device according to the aforementioned (9), the control part is further configured to execute an eleventh control after the seventh control when the first characteristic portion of the deformable thin object is detected by the first characteristic portion detecting part and the second characteristic portion of the deformable thin object is not detected by the second characteristic portion detecting part. In the eleventh control, the control part is configured to control the clamping unit and the moving mechanism to turn over the deformable thin object.

In the present deformable thin object spreading device, the second characteristic portion can be exposed by turning over the deformable thin object. Due to this, in the present deformable thin object spreading device, the position set with reference to the second characteristic portion can be clamped, and a plurality of deformable thin objects are aligned in the position set with reference to the second characteristic portion.

(11)

In the deformable thin object spreading device according to the aforementioned (9), the second characteristic portion detecting part includes an infrared camera capable of specifying a position of the second characteristic portion of the deformable thin object.

In the present deformable thin object spreading device, it is possible to specify the position of the second characteristic portion of the deformable thin object by means of the infrared camera even when the deformable thin object is faced down. As a result, the clamping unit can clamp the position set with reference to the second characteristic portion of the deformable thin object even when the control part does not execute a control of causing the clamping unit and the moving mechanism to turn over the deformable thin object in order to expose the second characteristic portion of the deformable thin object.

(12)

In the deformable thin object spreading device according to the aforementioned (10) or (11), the control part is further configured to execute a twelfth control, a thirteenth control, a fourteenth control, a fifteenth control, a sixteenth control, a seventeenth control, and an eighteenth control. The twelfth control is configured to be executed after the eleventh control when the second characteristic portion is not detected by the second characteristic portion detecting part. The thirteenth to the eighteenth control may be configured to sequentially execute after the twelfth control, according to some embodiments.

In the twelfth control, the control part is configured to control the clamping unit and the moving mechanism to cause the deformable thin object, clamped at both of the first endpoint or the second endpoint thereof and the third endpoint thereof by the clamping unit, to make contact at a bottom end thereof with the mounting region. In the thirteenth control, the control part is configured to cause the endpoint detecting part to detect an endpoint. In the fourteenth control, the control part is configured to control the clamping unit and the moving mechanism to cause the clamping unit to clamp the endpoint of the deformable thin object detected in the thirteenth control (hereinafter referred to as "a fourth endpoint"). In the fifteenth control, the control part is configured to cause the endpoint detecting part to detect an endpoint. In the sixteenth control, the control part is configured to control the clamping unit and the moving mechanism to cause the clamping unit to clamp both of the fourth endpoint and the endpoint of the deformable thin object detected in the fifteenth control (hereinafter referred to as "a fifth endpoint"). In the seventeenth control, the control part is configured to cause the endpoint detecting part to detect an endpoint. In the eighteenth control, the control part is configured to control the clamping unit and the moving mechanism to cause the clamping unit to clamp both of the fourth endpoint or the fifth endpoint and the endpoint of the deformable thin object detected in the seventeenth control (hereinafter referred to as "a sixth endpoint").

The present deformable thin object spreading device is configured to spread the deformable thin object by causing the control part to execute the aforementioned twelfth to eighteenth controls when the second characteristic portion detecting part cannot detect the second characteristic portion of the deformable thin object even though the control part has executed the eleventh control of causing the clamping unit and the moving mechanism to turn over the deformable thin object. Specifically, when the second characteristic portion detecting part cannot detect the second characteristic portion of the deformable thin object after the eleventh control, the clamping unit is lowered until the deformable thin object, clamped by the clamping unit at both of the first endpoint or the second endpoint and the third endpoint, makes contact at the bottom end thereof with the mounting region. Accordingly, a portion of the deformable thin object, which less easily loses its shape (e.g., a portion on which a seam exists, such as a shoulder tip of a sleeveless shirt), may be detected as the fourth endpoint. Then, the clamping unit clamps the fourth endpoint of the deformable thin object. As a result, a corner portion of the deformable thin object (a portion less easily losing its shape) is configured to be clamped by the clamping unit. At this time, with the clamping of the fourth endpoint of the deformable thin object, the fifth endpoint of the deformable thin object may be detected. The fifth endpoint is disposed farthest away from the fourth endpoint. The clamping unit then clamps both of the fourth endpoint and the fifth endpoint of the deformable thin object. Accordingly, in addition to the aforementioned corner portion (the portion less easily losing its shape) of the deformable thin object, another corner portion, disposed diagonally to the aforementioned corner portion, is configured to be clamped by the clamping unit. At this time, with clamping of both of the fourth endpoint and the fifth endpoint of the deformable thin object, the sixth endpoint, disposed farthest away from a straight line connecting the fourth endpoint and the fifth endpoint, may be detected. Further, the clamping unit clamps the fourth endpoint or the fifth endpoint and the sixth endpoint of the deformable thin object. Accordingly, two adjacent corner portions (the portions less easily losing their shape) of the deformable thin object are configured to be clamped by the clamping unit, and the untidily disposed deformable thin object is spread.

(13)

The deformable thin object spreading device according to any of the aforementioned (1) to (7) further includes a hanging member. It should be noted that the hanging member may be a single or plurality of plate-shaped members extended in the horizontal direction, or alternatively, a single or plurality of pole-like members extended in the horizontal direction. The deformable thin object is hung on the hanging member. Further, the control part is configured to control the clamping unit and the moving mechanism to hang the deformable thin object, clamped by the clamping unit, on the hanging member in between the first control and the second control, between the third control and the fourth control, and between the fifth control and the sixth control.

Hence, in the present deformable thin object spreading device, an endpoint of the deformable thin object is detected by the endpoint detecting part while the deformable thin object is hung on the hanging member. As a result, wrinkles in the deformable thin object can be removed by means of gravity during endpoint detection. It is possible to reduce occurrence of such trouble that the deformable thin object is partially rolled into its inside and thereby balled up. Therefore, the present deformable thin object spreading device can enhance detection accuracy in endpoint detection by the endpoint detecting part. Further, the present deformable thin object spreading device can be reduced in size in at least the width direction and the depth direction in comparison with the aforementioned deformable thin object spreading device configured to execute endpoint detection while a deformable thin object is put on a mounting region.

(14)

The deformable thin object spreading device according to the aforementioned (13) further includes a first member and a lowering mechanism. The lowering mechanism is configured to lower the first member. Further, the control part is configured to cause the lowering mechanism to lower the first member from above the deformable thin object to a space produced between the clamping unit and the hanging member under a condition that the deformable thin object is hung on the hanging member while being clamped by the clamping unit.

In the present deformable thin object spreading device, when the control part causes the lowering mechanism to lower the first member from above the deformable thin object to the space produced between the clamping unit and the hanging member (under the condition that the deformable thin object is hung on the hanging member while being clamped by the clamping unit), a part of the deformable thin object, positioned between the clamping unit and the hanging member, is pressed down. As a result, an endpoint of the deformable thin object, positioned outside the hanging member, is lifted up. Accordingly, the endpoint of the deformable thin object can be located within a detection range of the endpoint detecting part even when the deformable thin object is relatively large. Therefore, the endpoint of the deformable thin object can be detected in a relatively compact space even when the deformable thin object is relatively large. In other words, reduction in size of the deformable thin object spreading device can be achieved.

(15)

In the deformable thin object spreading device according to the aforementioned (13), the hanging member has a first hanging part and a second hanging part. The second hanging part is disposed away from the first hanging part. Moreover, the deformable thin object spreading device further includes a lowering device. The lowering device includes a first member and a lowering mechanism. The lowering mechanism is configured to lower the first member from above the first hanging part and the second hanging part to a space produced between the first hanging part and the second hanging part.

In the present deformable thin object spreading device, when the first member is lowered by the lowering mechanism while the deformable thin object is hung on and placed across the first hanging part and the second hanging part by the clamping unit and the moving mechanism, a part of the deformable thin object, positioned between the first hanging part and the second hanging part, is pressed down. As a result, an endpoint of the deformable thin object, positioned outside the first hanging part and the second hanging part, is lifted up. Due to this, in the present deformable thin object spreading device, the endpoint of the deformable thin object can be located within a detection range of the endpoint detecting part, even when the deformable thin object is relatively large. Therefore, in the present deformable thin object spreading device, the endpoint of the deformable thin object can be detected in a relatively compact space, even when the deformable thin object is relatively large. In other words, reduction in size of the deformable thin object spreading device can be achieved.

(16)

The deformable thin object spreading device according to any of the aforementioned (13) to (15) further includes a first characteristic portion detecting part and a second characteristic portion detecting part. It is preferable to prepare two sets of the first characteristic portion detecting parts and two sets of the second characteristic portion detecting parts. When two sets of the first characteristic portion detecting parts and two sets of the second characteristic portion detecting parts are prepared, the first characteristic portion detecting parts as well as the second characteristic portion detecting parts are preferably disposed in opposition to each other through the hanging member. The first characteristic portion detecting part is configured to detect a first characteristic portion of the deformable thin object. The second characteristic portion detecting part is configured to detect a second characteristic portion of the deformable thin object. Further, the control part is further configured to execute a nineteenth control after the seventh control when the first characteristic portion of the deformable thin object is detected by the first characteristic portion detecting part while the second characteristic portion of the deformable thin object is detected by the second characteristic portion detecting part. In the nineteenth control, the control part is configured to control the clamping unit and the moving mechanism to cause the clamping unit to clamp a position of the deformable thin object set with reference to the second characteristic portion.

In the case of a T-shirt or a sleeveless shirt, the first characteristic portion includes, for example, the roughly rectangular shape of the contour, the corner shape of the hem portion, or similar portions. Conversely, in the case of a T-shirt or a sleeveless shirt, the second characteristic portion is, for example, the collar portion or other similar portions.

In the present deformable thin object spreading device, a plurality of deformable thin objects are aligned in the position set with reference to the second characteristic portion through clamping of the position set with reference to the second characteristic portion by the clamping unit. Accordingly, folding can be smoothly executed in the folding device disposed downstream of the present deformable thin object spreading device.

Further, the first characteristic portion and the second characteristic portion can be detected while the deformable thin object is hung on the hanging member. As a result, wrinkles of the deformable thin object are removed by means of gravity during detection of the first characteristic portion and the second characteristic portion. Therefore, the present deformable thin object spreading device can enhance detection accuracy when detecting the first characteristic portion by the first characteristic portion detecting part and when detecting the second characteristic portion by the second characteristic portion detecting part.

Further, in the present deformable thin object spreading device, the deformable thin object is hung on the hanging member. Therefore, when the first characteristic portion detecting part and the second characteristic portion detecting part are disposed in opposition to each other through the hanging member, the first characteristic portion and the second characteristic portion can be simultaneously detected from the both sides. As a result, the first characteristic portion and the second characteristic portion can be detected in a short amount of time compared to a configuration in which the first characteristic portion and the second characteristic portion are detected while the deformable thin object is placed on the mounting region.

Alternatively, images of the both sides of the deformable thin object can be simultaneously supplied to the first characteristic portion detecting part and the second characteristic portion detecting part by: disposing the first characteristic portion detecting part and the second characteristic portion detecting part on one side of the hanging member; disposing a mirror in a predetermined position on the opposite side of them; and supplying the opposite-side image of the deformable thin object to the first characteristic portion detecting part and the second characteristic portion detecting part. In such a configuration, the first characteristic portion and the second characteristic portion can be simultaneously detected on both sides of the deformable thin object. As a result, the first and second characteristic portions can be detected in a short time compared to a configuration in which the first and second characteristic portions are detected while the deformable thin object is placed on the mounting region.

(17)

A deformable thin object spreading method according to another aspect of the present disclosure is a method of spreading a deformable thin object, and includes an eleventh clamping step, an eleventh endpoint detecting step, a twelfth clamping step, a twelfth endpoint detecting step, a thirteenth clamping step, a thirteenth endpoint detecting step, and a fourteenth clamping step. In the eleventh clamping step, the deformable thin object is clamped at an eleventh point. In the eleventh endpoint detecting step, either an endpoint of the deformable thin object, which is disposed farthest away from either an eleventh reference line or an eleventh reference point or an endpoint of the deformable thin object, which is disposed closest to either a twelfth reference line or a twelfth reference point is detected after the first clamping step. In the twelfth clamping step, the deformable thin object is clamped at the endpoint detected in the eleventh endpoint detecting step (hereinafter referred to as "an eleventh endpoint") after the eleventh endpoint detecting step. In the twelfth endpoint detecting step, either an endpoint of the deformable thin object, which is disposed farthest away from either a thirteenth reference line or a thirteenth reference point or an endpoint of the deformable thin object, which is disposed closest to either a fourteenth reference line or a fourteenth reference point is detected after the twelfth clamping step. In the thirteenth clamping step, the deformable thin object is clamped at both of the eleventh endpoint and the endpoint detected in the twelfth endpoint detecting step (hereinafter referred to as "a twelfth endpoint") after the twelfth endpoint detecting step. In the thirteenth endpoint detecting step, either an endpoint of the deformable thin object, which is disposed farthest away from either a fifteenth reference line or a fifteenth reference point or an endpoint of the deformable thin object, which is disposed closest to either a sixteenth reference line or a sixteenth reference point is detected after the thirteenth clamping step. In the fourteenth clamping step, the deformable thin object is clamped at both of the eleventh endpoint or the twelfth endpoint and the endpoint detected in the thirteenth endpoint detecting step (hereinafter referred to as "a thirteenth endpoint") after the thirteenth endpoint detecting step. The eleventh reference line, the thirteenth reference line, and the fifteenth reference line may be identical to or different from each other. Further, the eleventh reference point, the thirteenth reference point, and the fifteenth reference point may be identical to or different from each other. Further, the twelfth reference line, the fourteenth reference line, and the sixteenth reference line may be identical to or different from each other. Further, the twelfth reference point, the fourteenth reference point, and the sixteenth reference point may be identical to or different from each other.

In the present deformable thin object spreading method, the eleventh point of the deformable thin object is clamped in the eleventh clamping step. Accordingly, in the eleventh endpoint detecting step, the eleventh endpoint of the deformable thin object, which is disposed farthest away from the eleventh point, may be detected. In the twelfth clamping step, the eleventh endpoint of the deformable thin object is clamped. Accordingly, a corner portion of the deformable thin object is configured to be clamped. With the eleventh endpoint of the deformable thin object clamped, the twelfth endpoint of the deformable thin object, which is disposed farthest away from the eleventh endpoint, may be detected in the twelfth endpoint detecting step. In the thirteenth clamping step, both of the eleventh endpoint and the twelfth endpoint of the deformable thin object are clamped. Here, not only the aforementioned corner portion of the deformable thin object but also another corner portion of the deformable thin object, which is disposed diagonally to the aforementioned corner portion, is configured to be clamped. With the both of the eleventh endpoint and the twelfth endpoint of the deformable thin object may be clamped, the thirteenth endpoint disposed farthest away from a straight line connecting the eleventh endpoint and the twelfth endpoint in the thirteenth endpoint detecting step. In the fourteenth clamping step, the eleventh endpoint or the twelfth endpoint and the thirteenth endpoint of the deformable thin object are clamped. Accordingly, two adjacent corner portions of the deformable thin object are configured to be clamped, and the untidily disposed deformable thin object is spread. The present deformable thin object spreading method is preferably executed by the aforementioned deformable thin object spreading device.

The deformable thin object is one selected from the group of fabric (e.g., clothing, towels), film, paper, sheets, and other similar fabrics. Further, in the present disclosure, the deformable thin object is not limited to a particular shape, but may be rectangular as with towels, or alternatively, may be roughly rectangular as with T-shirts or sleeveless shirts.

As described above, in the present deformable thin object spreading method, the thirteenth endpoint may be detected and clamped when both of the eleventh endpoint and the twelfth endpoint of the deformable thin object are clamped. Accordingly, the thirteenth endpoint may be detected and clamped without using, for example, a suction device for spreading the deformable thin object. Therefore, the deformable thin object can be spread with a simple structure.

BRIEF DESCRIPTION OF THE DRAWINGS

FIG. 12 is a diagram for explaining the motion of spreading the T-shirt by the spreading device of the folding object processing apparatus represented in FIG. 1, according to an embodiment.

FIG. 13 is a diagram for explaining the motion of spreading the T-shirt by the spreading device of the folding object processing apparatus represented in FIG. 1, according to an embodiment.

FIG. 14 is a diagram for explaining the motion of spreading the T-shirt by the spreading device of the folding object processing apparatus represented in FIG. 1, according to an embodiment.

FIG. 15 is a diagram for explaining the motion of spreading the T-shirt by the spreading device of the folding object processing apparatus represented in FIG. 1, according to an embodiment.

FIG. 16 is a diagram for explaining the motion of spreading the T-shirt by the spreading device of the folding object processing apparatus represented in FIG. 1, according to an embodiment.

FIG. 17 is a diagram for explaining the motion of spreading the T-shirt by the spreading device of the folding object processing apparatus represented in FIG. 1, according to an embodiment.

FIG. 18 is a diagram for explaining the motion of spreading the T-shirt by the spreading device of the folding object processing apparatus represented in FIG. 1, according to an embodiment.

FIG. 20 is a diagram for explaining the motion of spreading a sleeveless shirt by the spreading device of the folding object processing apparatus represented in FIG. 1, according to an embodiment.

FIG. 21 is a diagram for explaining the motion of spreading the sleeveless shirt by the spreading device of the folding object processing apparatus represented in FIG. 1, according to an embodiment.

FIG. 22 is a diagram for explaining the motion of spreading the sleeveless shirt by the spreading device of the folding object processing apparatus represented in FIG. 1, according to an embodiment.

FIG. 23 is a diagram for explaining the motion of spreading the sleeveless shirt by the spreading device of the folding object processing apparatus represented in FIG. 1, according to an embodiment.

FIG. 24 is a diagram for explaining the motion of spreading the sleeveless shirt by the spreading device of the folding object processing apparatus represented in FIG. 1, according to an embodiment.

FIG. 25 is a diagram for explaining the motion of spreading the sleeveless shirt by the spreading device of the folding object processing apparatus represented in FIG. 1, according to an embodiment.

FIG. 26 is a diagram for explaining the motion of spreading the sleeveless shirt by the spreading device of the folding object processing apparatus represented in FIG. 1, according to an embodiment.

FIG. 27 is a diagram for explaining the motion of spreading the sleeveless shirt by the spreading device of the folding object processing apparatus represented in FIG. 1, according to an embodiment.

FIG. 28 is a diagram for explaining the motion of spreading the sleeveless shirt by the spreading device of the folding object processing apparatus represented in FIG. 1, according to an embodiment.

FIG. 29 is a diagram for explaining a motion of folding a folding object by the folding device of the folding object processing apparatus represented in FIG. 1, according to an embodiment.

FIG. 30 is a diagram for explaining the motion of folding the folding object by the folding device of the folding object processing apparatus represented in FIG. 1, according to an embodiment.

FIG. 31 is a diagram for explaining the motion of folding the folding object by the folding device of the folding object processing apparatus represented in FIG. 1, according to an embodiment.

FIG. 34 is a diagram illustrating another example of the hanging member according to the modification (H), according to an embodiment.

FIG. 35 is a diagram illustrating yet another example of the hanging member according to the modification (H), according to an embodiment.

REFERENCE SIGNS LIST

Figure 1:
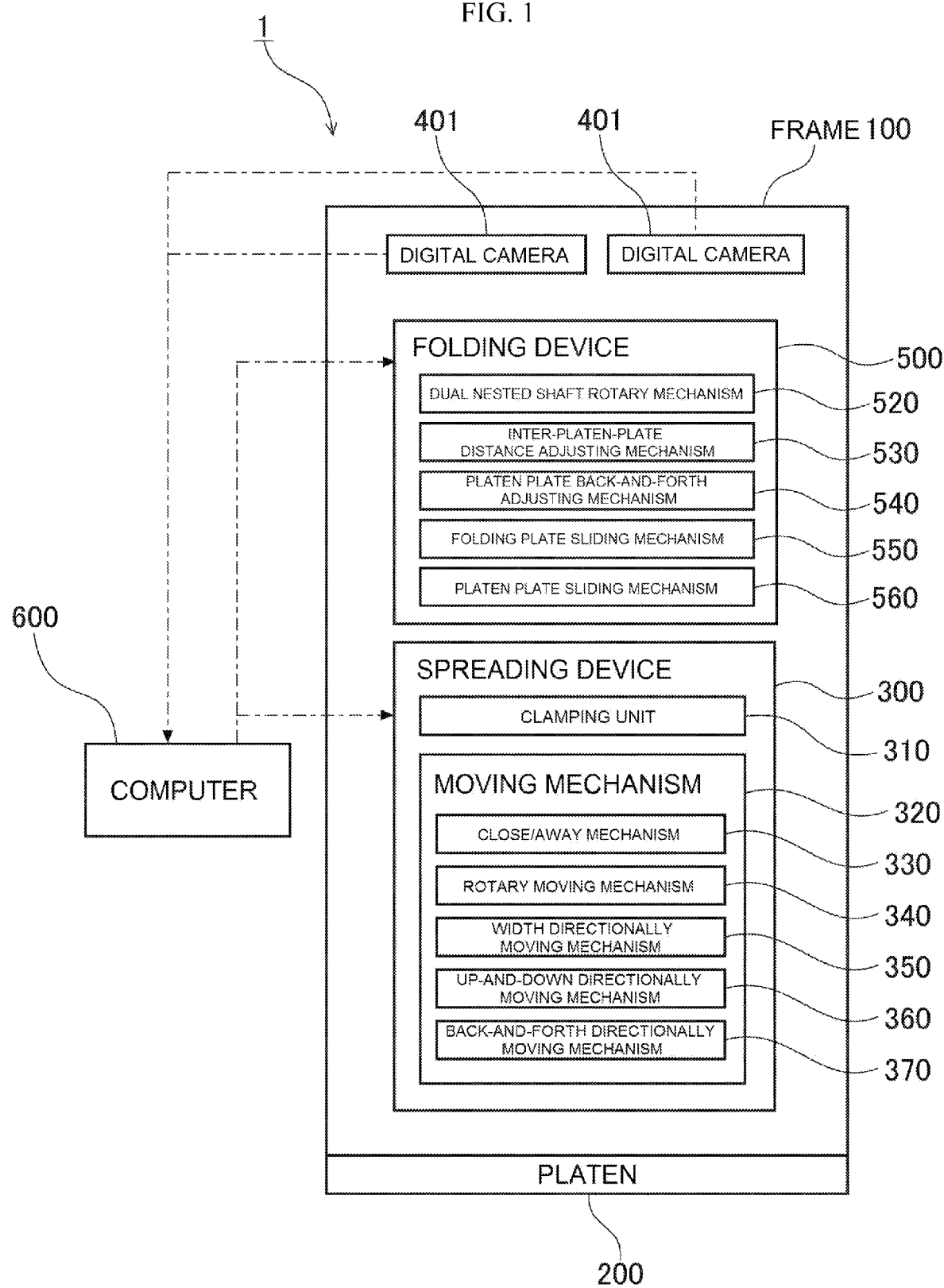
FIG. 1 is a block diagram representing a configuration of a folding object processing apparatus, according to an embodiment.

1 Folding object processing apparatus
200 Platen (mounting region)
300 Spreading device
310 Clamping unit
320 Moving mechanism
401 Digital still camera
600 Control part
601 First endpoint detecting part
602 Second endpoint detecting part
603 Third endpoint detecting part
604 Fourth endpoint detecting part
605 Fifth endpoint detecting part
606 Sixth endpoint detecting part
607 Rectangular detecting part (first characteristic portion detecting part)
608 Collar detecting part (second characteristic portion detecting part)
609 Moving mechanism controlling part (control part)
610 Clamping unit control part (control part)
700 Hanging member
710 Elevating bar
TS T-shirt (deformable thin object)
RS Sleeveless running shirt (deformable thin object)
S1 First clamping step
S3 First endpoint detecting step
S4 Second clamping step
S6 Second endpoint detecting step
S7 Third clamping step
S9 Third endpoint detecting step
S10 Fourth clamping step

DESCRIPTION OF EMBODIMENTS

With reference to the drawings, explanation will be hereinafter made for a folding object processing apparatus 1 according to an embodiment of the present disclosure.

<Entire Structure of Spreading Device>

Figure 2:
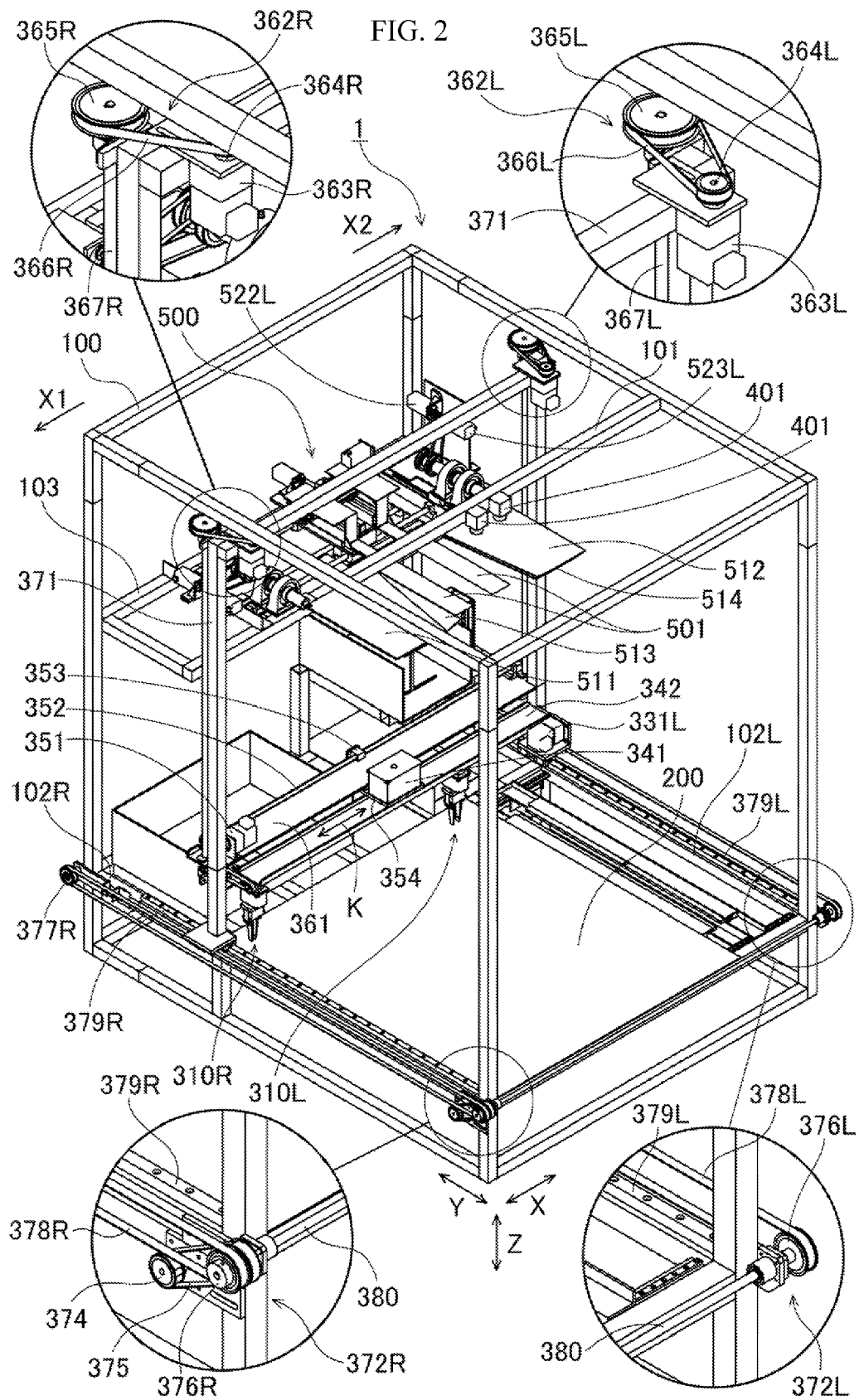
FIG. 2 is a perspective view of the folding object processing apparatus represented in FIG. 1, according to an embodiment.

As shown in FIGS. 1 and 2, the folding object processing apparatus 1 according to the present embodiment is an apparatus for spreading a folding object untidily placed on a platen 200 and folding the spread folding object, and mainly includes a frame 100, the platen 200, a spreading device 300, two digital still cameras 401, a folding device 500, the spreading device 300, and a computer 600. The spreading device 300 is configured to spread the folding object untidily placed on the platen 200. The digital still cameras 401 are disposed on the upper part of the frame 100. The folding device 500 is configured to fold the folding object spread by the spreading device 300. The computer 600 is communicably connected to the spreading device 300, the digital still cameras 401, and the folding device 500.

The folding object is one selected from the group of fabric (e.g., clothing, towels), film, paper, sheets, and other similar fabrics. The shape of the folding object may be rectangular as with towels, or alternatively, may be roughly rectangular as with T-shirts or sleeveless shirts.

<Frame>

As shown in FIG. 2, the frame 100 is formed in a roughly cuboid frame shape. Further, the platen 200 is disposed on the lower part of the frame 100. A beam 101 is disposed on the upper part of the frame 100 along a width direction (X direction). In addition, two digital still cameras 401, setting the platen 200 as an imaging range, are attached to the beam 101. Further, a beam 102R is disposed in the vicinity of one side (X1 direction side) of the platen 200 along a back-and-forth direction (Y direction), whereas a beam 102L is disposed in the vicinity of the other end side (X2 direction side) of the platen 200 along the back-and-forth direction. Yet further, LM guide members 379R and 379L (described further below) are respectively attached to the top surfaces of the beams. A folding device fixing frame 103 is disposed on the rear part of the frame 100 in order to fix the folding device 500 at a predetermined height position.

<Platen>

The platen 200 is configured to receive a folding object. As shown in FIG. 2, the platen 200 has a horizontal surface extended on an X-Y plane (a horizontal plane). The folding object is placed in an untidy state on the platen 200. The folding object on the platen 200 is spread while being moved in contact with the top surface of the platen 200 by means of the spreading device 300 (described further below). The platen 200 is preferably made of material with less friction resistance so that the folding object is less easily damaged even when dragged on the top surface. A method of spreading a folding object by the spreading device 300 will be described in further detail below.

<Spreading Device>

As shown in FIG. 1, the spreading device 300 is configured to spread a folding object that is untidily placed on the platen 200. The spreading device 300 includes a clamping unit 310 and a moving mechanism 320. The clamping unit 310 is configured to clamp the folding object. The moving mechanism 320 is configured to move the clamping unit 310. The spreading device 300 is connected to the computer 600 (described further below). The spreading device 300 and the computer 600 may be in communication via a wired or wireless connection. The computer 600 is configured to control the motion of the clamping unit 310 and that of the moving mechanism 320.

<Clamping Unit>

Figure 3:
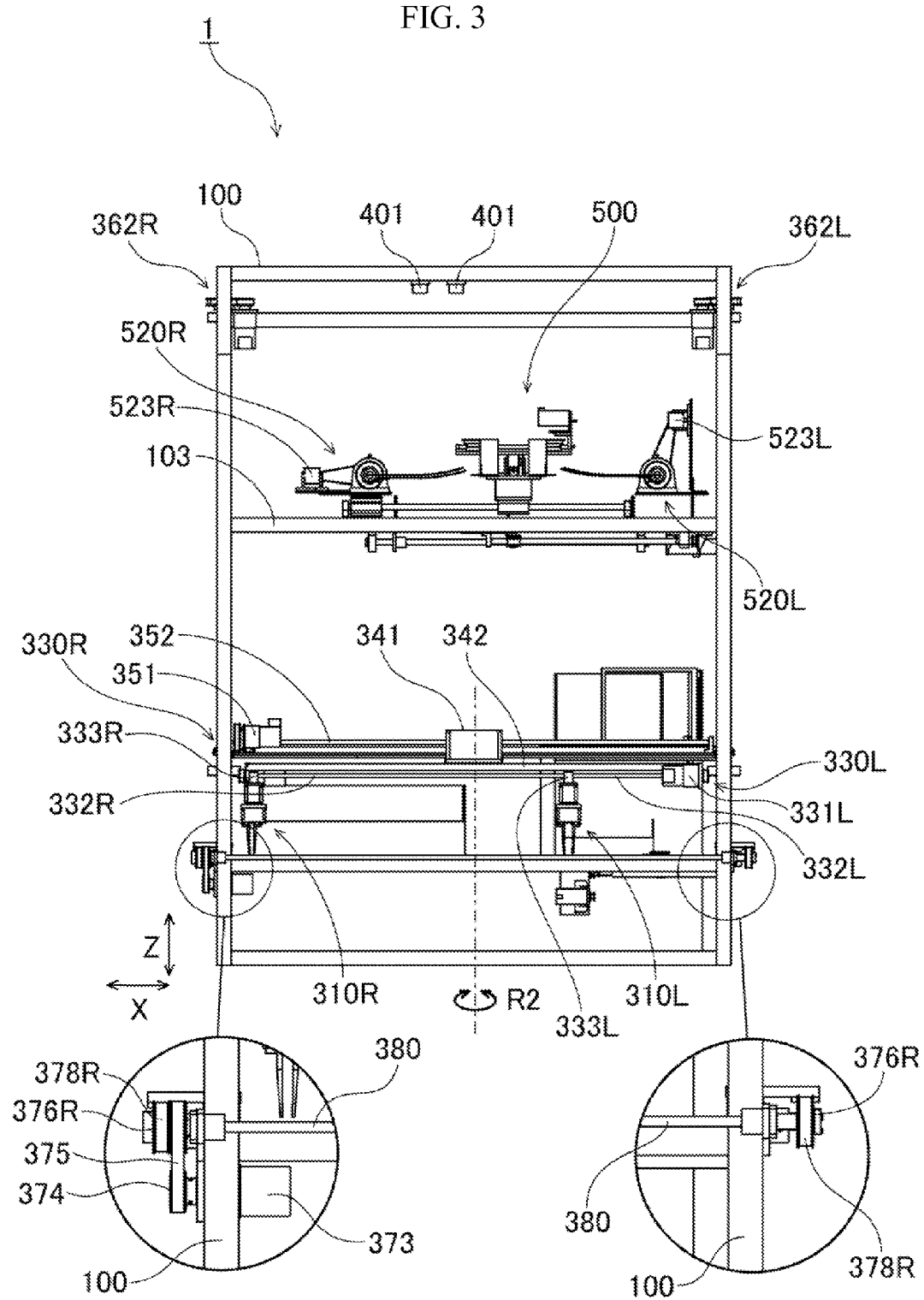
FIG. 3 is a front view of the folding object processing apparatus represented in FIG. 1, according to an embodiment.
Figure 4:
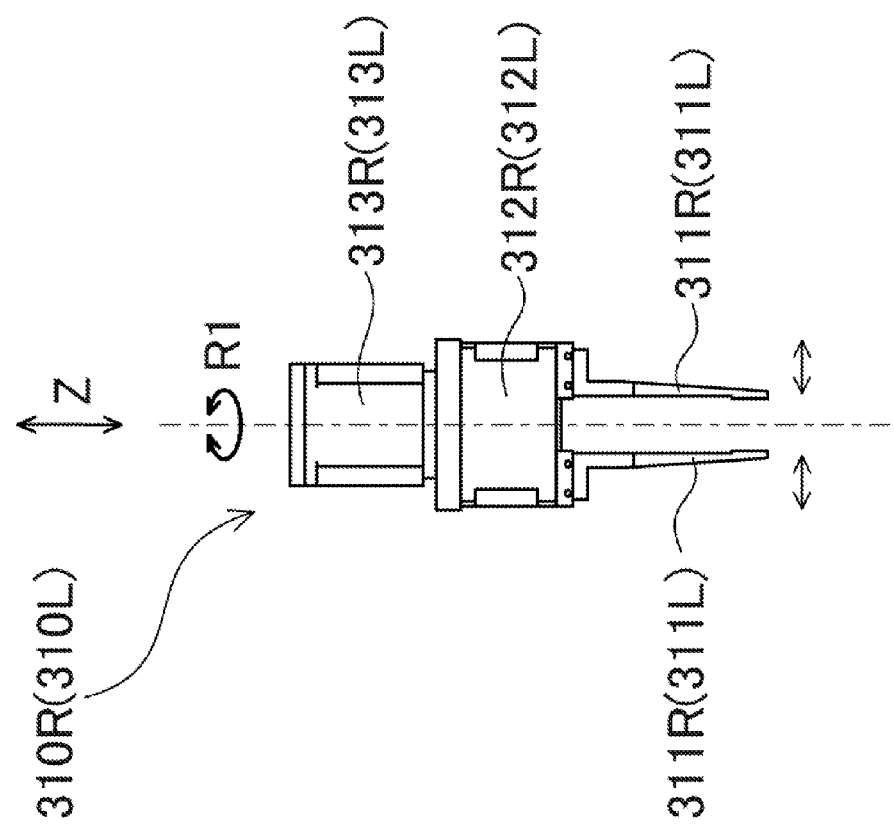
FIG. 4 is a front view of a chuck part of a spreading device of the folding object processing apparatus represented in FIG. 1, according to an embodiment.

As shown in FIGS. 2 and 3, the clamping unit 310 includes a right chuck part 310R and a left chuck part 310L. As shown in FIG. 4, the right chuck part 310R includes a pair of fingers 311R, a linear actuator 312R, and a rotary actuator 313R. The pair of fingers 311R plays a role of clamping a folding object. The linear actuator 312R is configured to increase or decrease the distance between the pair of fingers 311R. The rotary actuator 313R is configured to rotate the linear actuator 312R in the R1 direction about the vertical direction (Z direction) as a rotary axis. The structure of the left chuck part 310L is similar to that of the right chuck part 310R. Therefore, the explanation thereof will be hereinafter omitted using reference signs obtained by replacing "R" with "L" in the reference signs of the elements of the right chuck part 310R. In FIG. 4, reference signs in parentheses indicate respective elements of the left chuck part 310L corresponding to those of the right chuck part 310R.

<Moving Mechanism>

As shown in FIG. 1, the moving mechanism 320 includes a close/away mechanism 330, a rotary moving mechanism 340, a width directionally moving mechanism 350, an up-and-down directionally moving mechanism 360, and a back-and-forth directionally moving mechanism 370. The close/away mechanism 330 is configured to move the right chuck part 310R and the left chuck part 310L close to or away from each other. The rotary moving mechanism 340 is configured to rotate the close/away mechanism 330 about the vertical direction (Z direction) as a rotary axis. The width directionally moving mechanism 350 is configured to move the rotary moving mechanism 340 in a width direction (X direction). The up-and-down directionally moving mechanism 360 is configured to move the width directionally moving mechanism 350 in an up-and-down direction (Z direction). The back-and-forth directionally moving mechanism 370 is configured to move the up-and-down directionally moving mechanism 360 in a back-and-forth direction (Y direction).

<Close/Away Mechanism>

Figure 5:
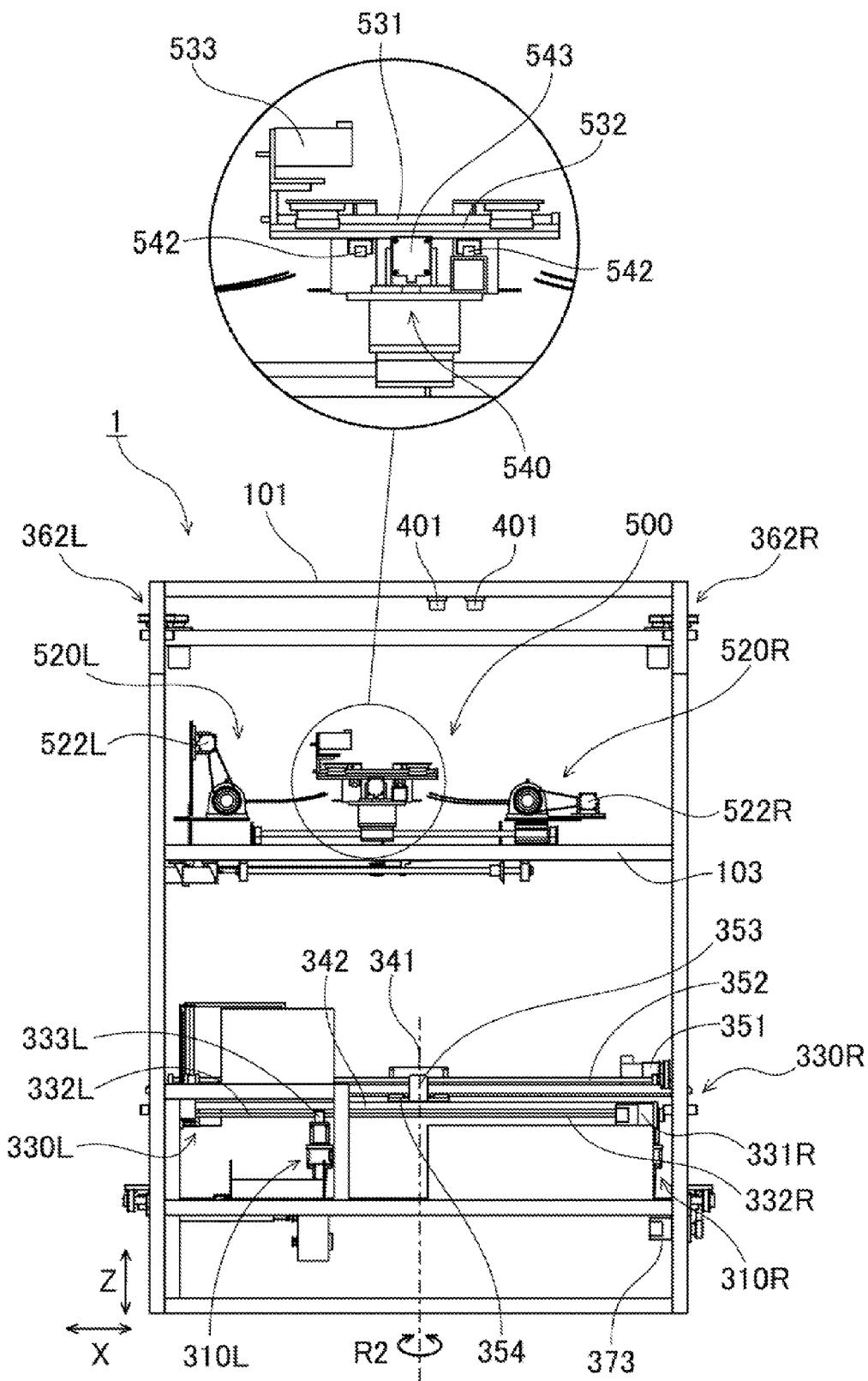
FIG. 5 is a rear view of the folding object processing apparatus represented in FIG. 1, according to an embodiment.

As shown in FIGS. 3 and 5, the close/away mechanism 330 includes a right chuck part moving mechanism 330R and a left chuck part moving mechanism 330L. The right chuck part moving mechanism 330R is configured to move the right chuck part 310R. The left chuck part moving mechanism 330L is configured to move the left chuck part 310L. Further, the right chuck part moving mechanism 330R includes a motor 331R as a driving source, a ball screw 332R, and a nut 333R. The motor 331R is a forwardly and reversely rotatable motor. The motor 331R and the ball screw 332R are attached to a rotary plate 342 of the rotary moving mechanism 340 (described further below). The ball screw 332R is configured to be rotated when a driving force is transmitted thereto from the motor 331R. Further, the ball screw 332R is disposed on the bottom surface of the aforementioned rotary plate 342 along the longitudinal direction (K direction, see FIG. 2) of the rotary plate 342. The nut 333R is screwed onto the ball screw 332R. Further, the right chuck part 310R is fixed to the nut 333R.

Moreover, when the motor 331R is driven, a driving pulley (not shown in the figures) attached to the driving shaft of the motor 331R and a driven pulley (not shown in the figures) are rotated and the ball screw 332R attached to the rotary shaft of the driven pulley is thereby rotated. Accordingly, the nut 333R screwed onto the ball screw 332R is moved along the rotary axis direction (K direction) of the ball screw 332R. As a result, the right chuck part 310R fixed to the nut 333R is moved along the rotary axis direction (K direction) of the ball screw 332R.

The structure of the left chuck part moving mechanism 330L is similar to that of the aforementioned right chuck part moving mechanism 330R. Therefore, the explanation thereof will be hereinafter omitted using reference signs obtained by replacing "R" by "L" in the reference signs of the elements of the right chuck part moving mechanism 330R.

Thus, the right chuck part 310R and the left chuck part 310L can be moved closer to or away from each other by causing the right chuck part moving mechanism 330R to move the right chuck part 310R in the rotary axis direction (K direction) of the ball screw 332R and by causing the left chuck part moving mechanism 330L to move the left chuck part 310L in the rotary axis direction (K direction) of a ball screw 332L.

<Rotary Moving Mechanism>

The rotary moving mechanism 340 is provided for rotating the aforementioned close/away mechanism 330 about the vertical direction (Z direction) as a rotary axis. As shown in FIGS. 2, 3, and 5, the rotary moving mechanism 340 includes a motor 341 as a driving source and the rotary plate 342. The motor 341 is a forwardly and reversely rotatable motor. The motor 341 is mounted on a slide plate 354 of the width directionally moving mechanism 350 (described further below). The rotary plate 342 is attached to the driving shaft of the motor 341. The close/away mechanism 330 (the motors 331R and 331L, the ball screws 332R and 332L) are attached to the rotary plate 342.

When the motor 341 is driven, the rotary plate 342 attached to the driving shaft of the motor 341 is configured to be rotated in an arrow R2 direction about the vertical direction (Z direction) as a rotary axis. As a result, the close/away mechanism 330 disposed on the rotary plate 342 is configured to be rotated in the arrow R2 direction.

<Width Directionally Moving Mechanism>

The width directionally moving mechanism 350 is provided for moving the rotary moving mechanism 340 in the width direction (X direction). As shown in FIGS. 2, 3, and 5, the width directionally moving mechanism 350 includes a motor 351 as a driving source, a ball screw 352, a nut 353, and the slide plate 354. The motor 351 is a forwardly and reversely rotatable motor. Further, the motor 351 is attached to an up-and-down moving plate 361 of the up-and-down directionally moving mechanism 360 (described further below). The ball screw 352 is configured to be rotated when driving force is transmitted thereto from the motor 351. Further, the ball screw 352 is disposed on the top surface of the aforementioned up-and-down moving plate 361 (see FIG. 2) along the longitudinal direction (X direction) of the up-and-down moving plate 361. The nut 353 is screwed onto the ball screw 352. The motor 341 of the rotary moving mechanism 340 is mounted on the slide plate 354. The slide plate 354 is fixed to the nut 353.

When the motor 351 is driven, a driving pulley (not shown in the figures) attached to the driving shaft of the motor 351 and a driven pulley (not shown in the figures) are configured to be rotated and the ball screw 352 attached to the rotary shaft of the driven pulley is thereby configured to be rotated. Accordingly, the nut 353 screwed onto the ball screw 352 is configured to be moved along the rotary axis direction (X direction) of the ball screw 352. The slide plate 354 fixed to the nut 353 is configured to move along the rotary axis direction (X direction) of the ball screw 352. As a result, the rotary moving mechanism 340 disposed on the slide plate 354 is configured to be moved along the rotary axis direction (X direction) of the ball screw 352.

<Up-and-Down Directionally Moving Mechanism>

Figure 6:
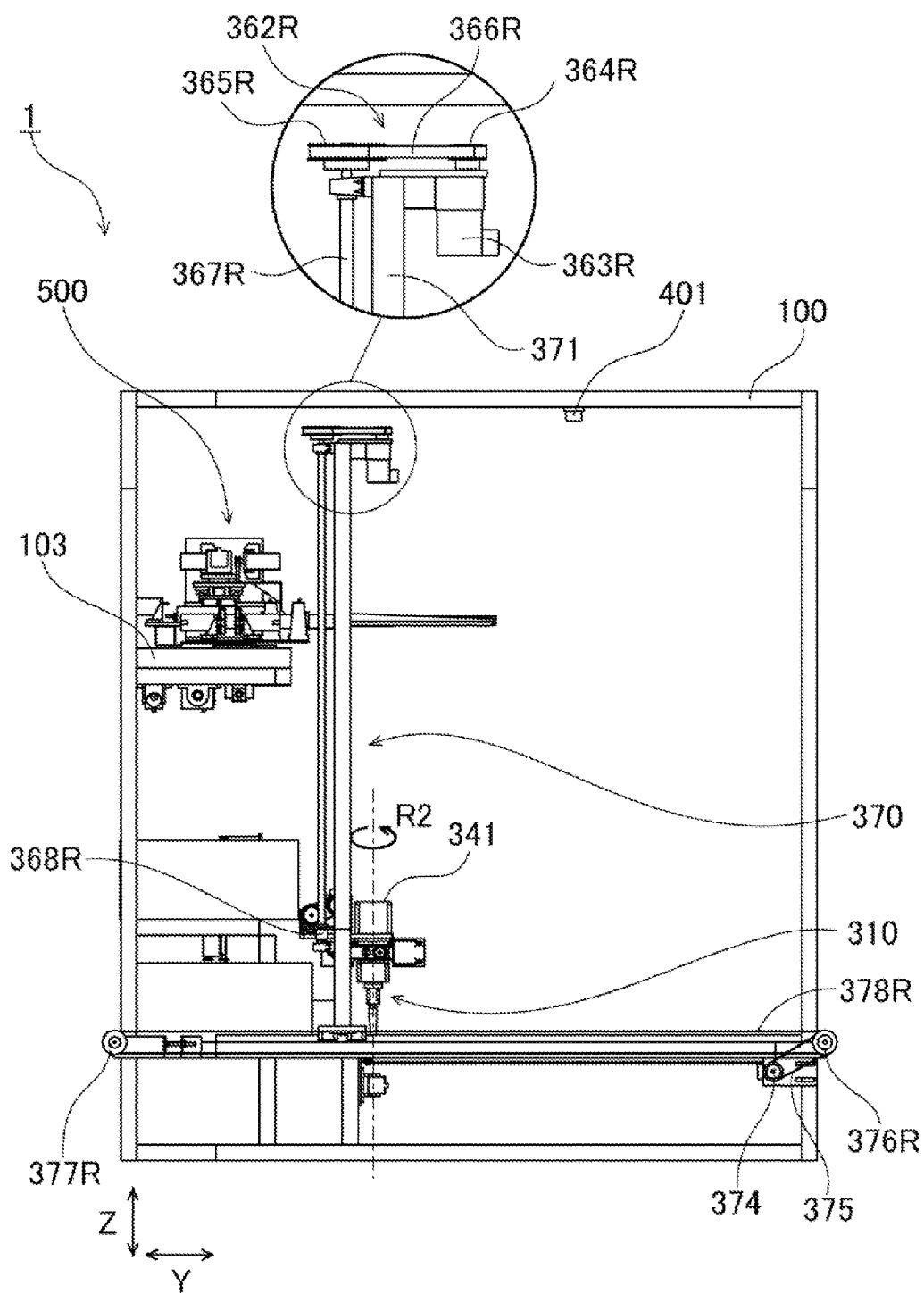
FIG. 6 is a side view of the folding object processing apparatus represented in FIG. 1, according to an embodiment.

The up-and-down directionally moving mechanism 360 is provided for moving the width directionally moving mechanism 350 in the up-and-down direction (Z direction). As shown in FIG. 2, the up-and-down directionally moving mechanism 360 includes the up-and-down moving plate 361, a right elevating unit 362R, and a left elevating unit 362L. The width directionally moving mechanism 350 is disposed on the up-and-down moving plate 361. The right elevating unit 362R is disposed on one end side (X1 directional side) part of the up-and-down moving plate 361. The left elevating unit 362L is disposed on the other end side (X2 directional side) part of the up-and-down moving plate 361. The right elevating unit 362R and the left elevating unit 362L are both fixed to a frame 371 of the back-and-forth directionally moving mechanism 370 (described further below). As shown in FIGS. 2 and 6, the right elevating unit 362R includes a motor 363R as a driving source, a driving pulley 364R, a driven pulley 365R, a belt 366R, a ball screw 367R, and a nut 368R (see FIG. 6). The motor 363R is a forwardly and reversely rotatable motor. The motor 363R is fixed to the upper part of the frame 371 of the back-and-forth directionally moving mechanism 370 (described further below). The driving pulley 364R is attached to the driving shaft of the motor 363R. The driven pulley 365R is disposed away from the driving pulley 364R at a predetermined distance. The belt 366R is stretched over the driving pulley 364R and the driven pulley 365R. The ball screw 367R is attached to the rotary shaft of the driven pulley 365R. Further, the ball screw 367R is disposed along the vertical direction (Z direction). The ball screw 367R is screwed into and through the nut 368 that is configured to be moved in the up-and-down direction (Z direction) in conjunction with rotation of the ball screw 367R. The nut 368R is screwed onto the ball screw 367R. The up-and-down moving plate 361 is fixed to the nut 368R.

The structure of the left elevating unit 362L is similar to that of the aforementioned right elevating unit 362R. Therefore, the explanation thereof will be hereinafter omitted using reference signs obtained by replacing "R" with "L" in the reference signs of the elements of the right elevating unit 362R.

Moreover, when the motors 363R and 363L are driven in synchronization, the driving pulleys 364R and 364L attached to the driving shafts of the motors 363R and 363L are rotated and the rotational forces are respectively transmitted to the driven pulleys 365R and 365L through the belts 366R and 366L. Accordingly, the driven pulleys 365R and 365L are rotated and the ball screws 367R and 367L attached to the rotary shafts of the driven pulleys 365R and 365L are rotated. The nuts 368R and the like, screwed onto the ball screws 367R and 367L (a nut of the left elevating unit 362L is not shown in the figures), are moved in the rotary axis direction (Z direction) of the ball screws 367R and 367L, and thereby, the up-and-down moving plate 361 attached to the nut 368R and the like are moved in the rotary axis direction (Z direction). As a result, the width directionally moving mechanism 350 mounted on the up-and-down moving plate 361 is moved along the up-and-down direction (Z direction).

<Back-and-Forth Directional Moving Mechanism>

Figure 7:
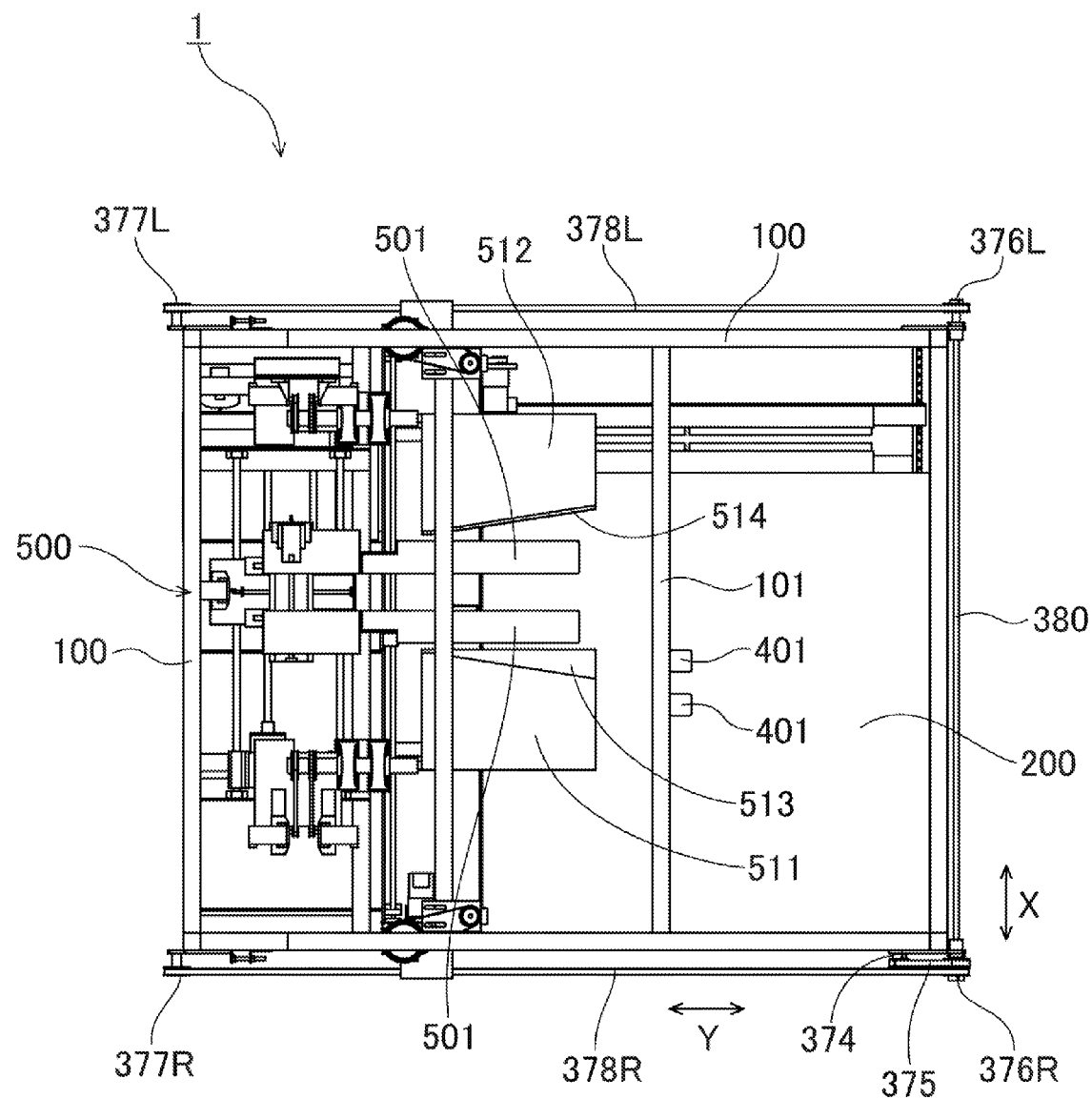
FIG. 7 is a plan view of the folding object processing apparatus represented in FIG. 1, according to an embodiment.

The back-and-forth directionally moving mechanism 370 is provided for moving the up-and-down directionally moving mechanism 360 in the back-and-forth direction (Y direction). As shown in FIGS. 2, 3, and 7, the back-and-forth directionally moving mechanism 370 includes the frame 371, a right back-and-forth unit 372R, a left back-and-forth unit 372L, a motor 373 (see FIG. 3), a driving pulley 374, and a belt 375. The up-and-down directionally moving mechanism 360 is disposed on the frame 371. The motor 373 is a forwardly and reversely rotatable motor, and is attached to the frame 100. Further, the motor 373 (see FIG. 3) serves as a driving source for the units 372R and 372L. The right back-and-forth unit 372R is disposed on one end side (X1 directional side) of the lower part of the frame 371. The left back-and-forth unit 372L is disposed on the other end side (X2 directional side) of the lower part of the frame 371. The driving pulley 374 is attached to the driving shaft of the motor 373. The belt 375 is stretched over the driving pulley 374 and a front-side driven pulley 376R of the right back-and-forth unit 372R (described further below).

Further, the right back-and-forth unit 372R includes the front-side driven pulley 376R, a rear-side driven pulley 377R, a belt 378R, and the LM guide member 379R. The front-side driven pulley 376R is disposed in the vicinity of the aforementioned driving pulley 374. The rear-side driven pulley 377R is disposed away from the front-side driven pulley 376R at a predetermined interval. The belt 378R is stretched over the front-side driven pulley 376R and the rear-side driven pulley 377R. The frame 371 is attached to the LM guide member 379R while being slidable in the back-and-forth direction (Y direction).

The structure of the left back-and-forth unit 372L is similar to that of the right back-and-forth unit 372R. Therefore, the explanation thereof will be hereinafter omitted using reference signs obtained by replacing "R" with "L" in the reference signs of the elements of the right back-and-forth unit 372R.

As shown in FIG. 7, the front-side driven pulley 376R of the right back-and-forth unit 372R and a front-side driven pulley 376L of the left back-and-forth unit 372L are respectively attached to one end and the other end of a rotary shaft 380 disposed along the width direction (X direction) and are configured to be simultaneously rotated.

When the motor 373 is driven, the driving pulley 374 attached to the driving shaft of the motor 373 is configured to be rotated and the rotational force thereof is transmitted to the front-side driven pulley 376R through the belt 375. The front-side driven pulley 376R is thereby configured to be rotated. Accordingly, the front-side driven pulley 376R and the front-side driven pulley 376L, attached to the rotary shaft 380, are configured to be synchronously rotated. In conjunction, the rotational force of the front-side driven pulleys 376R and 376L are transmitted to the rear-side driven pulleys 377R and 377L through the belts 378R and 378L, and the rear-side driven pulleys 377R and 377L are thereby configured to be rotated. Accordingly, the frame 371, attached to the belts 378R and 378L, is configured to be moved along the LM guide members 379R and 379L. As a result, the up-and-down directionally moving mechanism 360 mounted on the frame 371 is configured to be moved along the back-and-forth direction (Y direction).

<Digital Still Cameras>

The digital still cameras 401 are provided for detecting a first point (see FIG. 12(b)), a first endpoint P1 (see FIG. 13(e)), a second endpoint P2 (see FIG. 14(i)), a third endpoint P3 (see FIG. 16(m)), a fourth endpoint P4 (see FIG. 25(o)), a fifth endpoint P5 (see FIG. 26(r)), and a sixth endpoint P6 (see FIG. 27(u)) of a folding object. Specifically, the digital still cameras 401 are configured to capture images of a folding object put on the platen 200 in order to obtain a set of imaging data of the folding object. The digital still cameras 401 are also configured to send the obtained set of imaging data to the computer 600. The computer 600 is configured to execute an image processing based on the received set of imaging data and detect the first point P and the first to sixth endpoints P1 to P6 of the folding object.

The first point P of the folding object is the center position of the folding object untidily placed on the platen 200 (see FIG. 12(b)). The first endpoint P1 of the folding object is a position in the folding object clamped at its first position P and is farthest away from the first point P (see FIG. 13(e)). The second endpoint P2 of the folding object is a position in the folding object clamped at its first endpoint P1 and is farthest away from the first endpoint P1 (see FIG. 14(i)). The third endpoint P3 of the folding object is a position in the folding object clamped at both of its first endpoint P1 and its second endpoint P2 and is farthest away from a straight line L1 connecting endpoints (P1 and P2) related to clamping (see FIG. 16(m)). The fourth endpoint P4 of the folding object is a position in the folding object clamped at both of: either its first endpoint P1 or its second endpoint P2 and its third endpoint P3, and is farthest away from a straight line L2 connecting endpoints (either P1 or P2, and P3) related to clamping (see FIG. 25(o)). The fifth endpoint P5 of the folding object is a position in the folding object clamped at its fourth endpoint P4 and is farthest away from the fourth endpoint P4 (see FIG. 26(r)). The sixth endpoint P6 of the folding object is a position in the folding object clamped at both of its fourth endpoint P4 and its fifth endpoint P5, and is farthest away from a straight line L3 connecting endpoints (P4 and P5) related to clamping (see FIG. 27(u)).

The digital still cameras 401 are provided for detecting a characteristic portion (a first characteristic portion) of a folding object. Specifically, the digital still cameras 401 are configured to detect whether or not the outer shape of a folding object is roughly rectangular in order to detect whether or not the folding object is spread. The digital still cameras 401 are configured to capture an image of a folding object placed on the platen 200 in order to obtain a set of imaging data of the folding object. The digital still cameras 401 are configured to send the obtained set of imaging data to the computer 600. The computer 600 is configured to execute an image processing based on the received set of imaging data and is configured to detect whether or not the folding object is spread by detecting the rectangular outer shape of the folding object.

The digital still cameras 401 are provided for detecting a characteristic portion of the folding object (a second characteristic portion) that is different from the first characteristic portion. Specifically, the digital still cameras 401 are provided for detecting a collar portion as a characteristic portion of a T-shirt or a sleeveless shirt. The digital still cameras 401 are configured to capture an image of a folding object placed on the platen 200 to obtain a set of imaging data of the folding object. The digital still cameras 401 are configured to send the obtained set of imaging data to the computer 600. The computer 600 is configured to execute an image processing based on the received set of transmission imaging data and is configured to detect the collar portion of the folding object.

<Folding Device>

Figure 8:
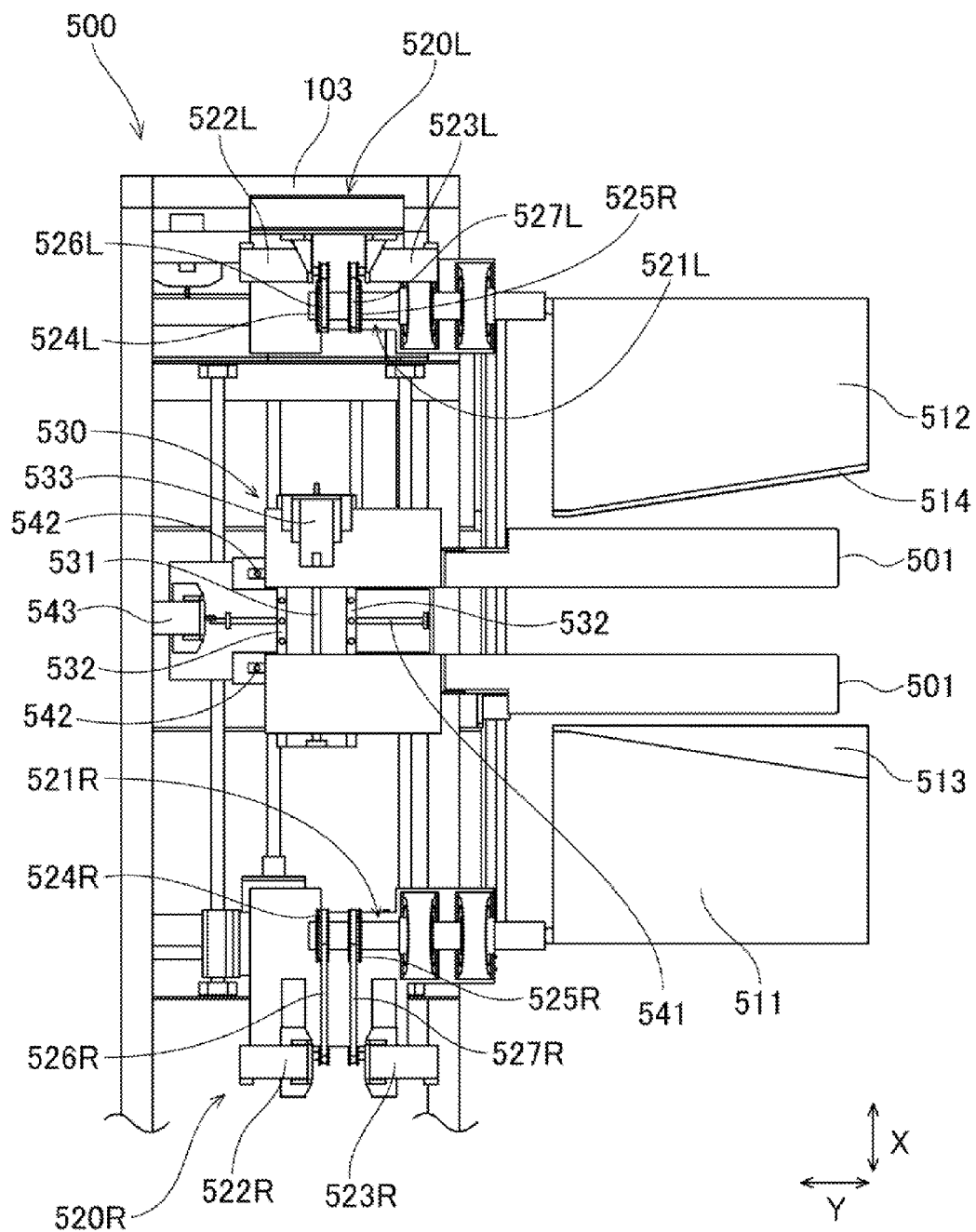
FIG. 8 is a plan view of a folding device of the folding object processing apparatus represented in FIG. 1, according to an embodiment.
Figure 9:
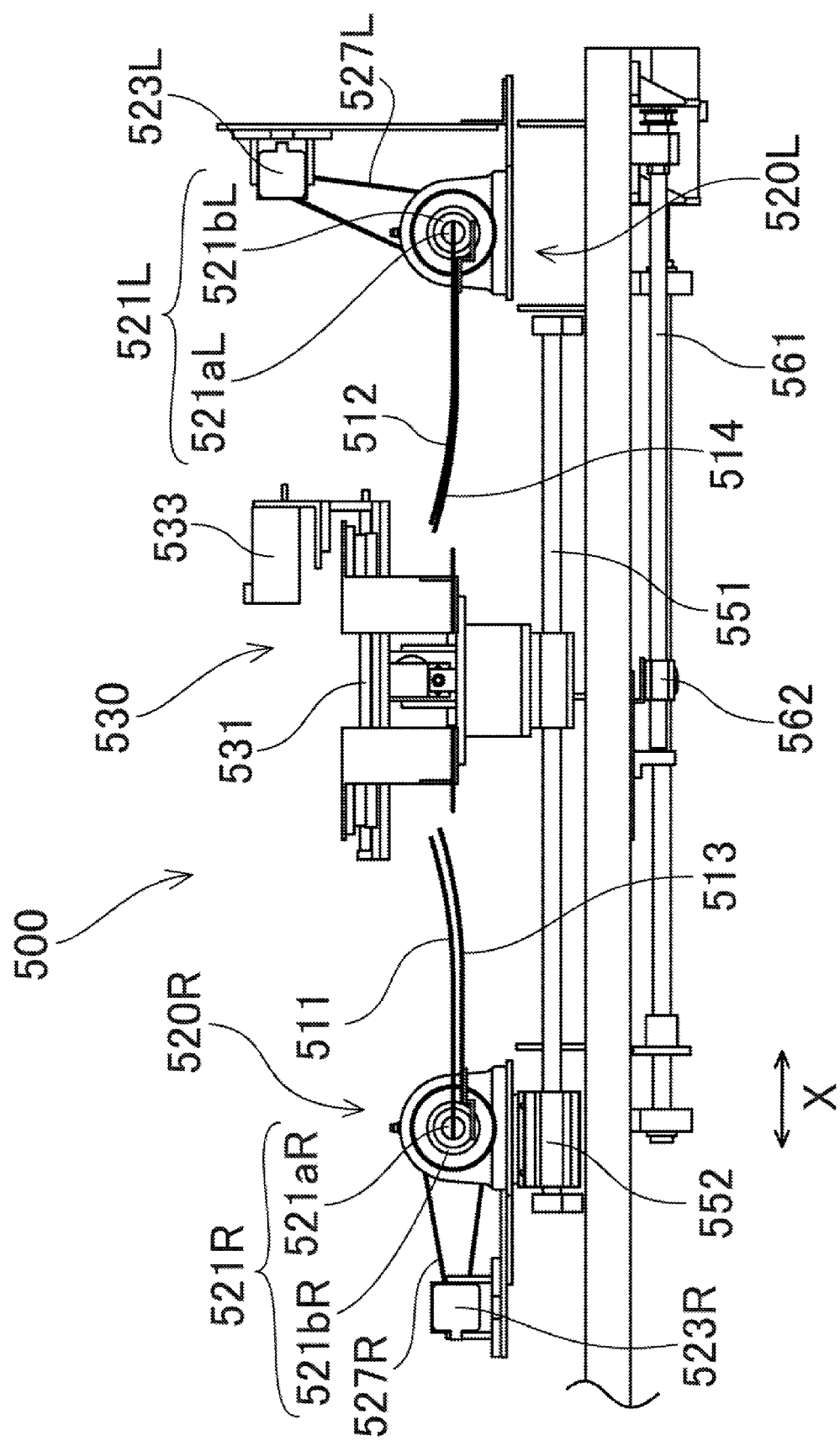
FIG. 9 is a front view of the folding device of the folding object processing apparatus represented in FIG. 1, according to an embodiment.

The folding device 500 is fixed to the folding device fixing frame 103 of the frame 100. As shown in FIGS. 1, 8, and 9, the folding device 500 mainly includes a pair of platen plates 501, four folding plates 511 to 514, a dual nested shaft rotary mechanism 520, inter-platen-plate distance adjusting mechanism 530, a platen plate back-and-forth adjusting mechanism 540, a folding plate sliding mechanism 550, and a platen plate sliding mechanism 560. In the following explanation, on an as-needed basis, the folding plate assigned with the reference sign 511 will be referred to as "a first folding plate," the folding plate assigned with the reference sign 512 will be referred to as "a second folding plate," the folding plate assigned with the reference sign 513 will be referred to as "a third folding plate," and the folding plate assigned with the reference sign 514 will be referred to as "a fourth folding plate." Detailed explanation for the respective elements of the folding device 500 follows.

<Platen Plate>

As shown in FIG. 8, the platen plates 501 are a pair of roughly rectangular plate-shaped members disposed away from each other at a predetermined interval in the width direction (X direction) and extend in the back-and-forth direction (Y direction). A folding object, spread by the spreading device 300 in the initial state, is placed on the platen plates 501.

The distance (width) between the pair of platen plates 501 is adjusted by the inter-platen-plate distance adjusting mechanism 530. It should be noted that the separated distance (width) between the platen plates 501 is adjusted depending on the size of a folding object. The back-and-forth directional (Y directional) positions of the platen plates 501 are adjusted by the platen plate back-and-forth adjusting mechanism 540.

<Folding Plate>

As shown in FIGS. 8 and 9, the folding plates 511 to 514 are members playing a role of consecutively folding a folding object placed on the platen plates 501 and are formed in a roughly rectangular shape. The folding plates 511 to 514 are disposed outside the platen plates 501 and are arranged perpendicularly to the mounting faces of the platen plates 501 in the initial state.

<Dual Nested Shaft Rotary Mechanism>

As shown in FIGS. 8 and 9, the dual nested shaft rotary mechanism 520 includes a right side rotary mechanism 520R and a left side rotary mechanism 520L. The right side rotary mechanism 520R is configured to rotate the first folding plate 511 and the third folding plate 513. The left side rotary mechanism 520L is configured to rotate the second folding plate 512 and the fourth folding plate 514. The right side rotary mechanism 520R and the left side rotary mechanism 520L are disposed in opposition to each other while interposing the platen plates 501 therebetween. The separated distance (width) between the right side rotary mechanism 520R and the left side rotary mechanism 520L is adjusted by the folding plate sliding mechanism 550.

The right side rotary mechanism 520R mainly includes a dual nested shaft 521R, an inside shaft rotary motor 522R, an outside shaft rotary motor 523R, an inside shaft pulley 524R, an outside shaft pulley 525R, a first pulley belt 526R, and a second pulley belt 527R.

As shown in FIG. 9, the dual nested shaft 521R is formed by an inside shaft 521aR and an outside shaft 521bR. The inside shaft 521aR is a columnar shaft and the first folding plate 511 is attached to the tip of this inside shaft 521aR. The outside shaft 521bR is a cylindrical shaft, and the third folding plate 513 is attached to the tip of this outside shaft 521bR. The inside shaft 521aR is rotatably inserted into the outside shaft 521bR while the base end part thereof is partially protruded from the outside shaft 521bR.

As shown in FIG. 8, the inside shaft pulley 524R is fitted onto the base end part of the inside shaft 521aR. The outside shaft pulley 525R is fitted onto the base end part of the outside shaft 521bR.

The first pulley belt 526R is stretched over the inside shaft pulley 524R and a pulley (not shown in the figures) attached to the driving shaft of the inside shaft rotary motor 522R. The first pulley belt 526R serves to rotate the inside shaft 521aR by transmitting the rotational force of the inside shaft rotary motor 522R to the inside shaft 521aR.

The second pulley belt 526R is stretched over the outside shaft pulley 525R and a pulley attached to the driving shaft of the outside shaft rotary motor 523R. The second pulley belt 526R serves to rotate the outside shaft 521bR by transmitting the rotational force of the outside shaft rotary motor 523R to the outside shaft 521bR. The inside shaft rotary motor 522R and the outside shaft rotary motor 523R are forwardly and reversely rotatable motors.

The structure of the left side rotary mechanism 520L is similar to that of the aforementioned right side rotary mechanism 520R. Therefore, the explanation thereof will be hereinafter omitted using reference signs obtained by replacing "R" by "L" in the reference signs of the elements of the right side rotary mechanism 520R. As shown in FIG. 9, the inside shaft rotary motor 522R and the outside shaft rotary motor 523R of the right side rotary mechanism 520R are disposed laterally to the dual nested shaft 521R, whereas the inside shaft rotary motor 522L and an outside shaft rotary motor 523L of the left side rotary mechanism 520L are disposed above a dual nested shaft 521L.

<Inter-Platen-Plate Distance Adjusting Mechanism>

As shown in FIGS. 8 and 9, the inter-platen-plate distance adjusting mechanism 530 mainly includes a ball screw 531, two nuts (not shown in the figures), LM guide members 532, and a ball screw driving motor 533. The ball screw driving motor 533 serves as a driving source for rotating the ball screw 531.

The ball screw 531 includes a right-handed ball screw part and a left-handed ball screw part. The right-handed ball screw part and the left-handed ball screw part are disposed coaxially to each other. The ball screw 531 is disposed and the rotary axis thereof is arranged in parallel to the LM guide members 532 (i.e., in the width direction (X direction)).

The two nuts are respectively screwed onto the right-handed ball screw part and the left-handed ball screw part of the ball screw 531. The two nuts are configured to be slid on the LM guide members 532 along the axial direction of the ball screw 531 by means of driving of the ball screw driving motor 533. The ball screw driving motor 533 is a forwardly and reversely rotatable motor. In an embodiment, the nuts are respectively screwed onto the right-handed ball screw part and the left-handed ball screw part of the ball screw 531 and are thereby configured to be slid in opposite directions. In other words, the nuts are configured to be slid either closer to each other or away from each other. The platen plates 501 are attached to the two nuts, respectively. As a result, the inter-platen-plate distance adjusting mechanism 530 can adjust the width of the pair of platen plates 501.

<Platen Plate Back-and-Forth Adjusting Mechanism>

As shown in FIG. 8, the platen plate back-and-forth adjusting mechanism 540 mainly includes a ball screw 541, a nut (not shown in the figures), LM guide members 542, and a ball screw driving motor 543. The ball screw driving motor 543 serves as a driving source for rotating the ball screw 541.

The ball screw 541 is disposed and the rotary axis thereof is arranged in parallel to the LM guide members 542. The nut is screwed onto the ball screw 541, and is configured to be slid on the LM guide members 542 along the axial direction (Y direction) of the ball screw 541 by means of driving of the ball screw driving motor 543. The ball screw driving motor 543 is a forwardly and reversely rotatable motor. The inter-platen-plate distance adjusting mechanism 530 is mounted on the nut. Accordingly, the platen plate back-and-forth adjusting mechanism 540 can adjust the positions of the platen plates 501 in the back-and-forth direction (Y direction).

<Folding Plate Sliding Mechanism>

The folding plate sliding mechanism 550 is configured to move the right side rotary mechanism 520R of the dual nested shaft rotary mechanism 520 in the width direction (X direction) in order to adjust the separated distance between the right side rotary mechanism 520R and the left side rotary mechanism 520L. As shown in FIG. 9, this folding plate sliding mechanism 550 mainly includes a ball screw 551, a nut 552, and a ball screw driving motor (not shown in the figures).

As shown in FIG. 9, the ball screw 551 is disposed and the rotary axis thereof is arranged along the width direction (X direction). The nut 552 is screwed onto the aforementioned ball screw 551. The right side rotary mechanism 520R is mounted on the nut 552. The ball screw driving motor is a forwardly and reversely rotatable motor. As a result, the folding plate sliding mechanism 550 can adjust the separated distance between the right side rotary mechanism 520R and the left side rotary mechanism 520L.

<Platen Plate Sliding Mechanism>

The platen plate sliding mechanism 560 is configured to move the platen plates 501, the inter-platen-plate distance adjusting mechanism 530, and the platen plate back-and-forth adjusting mechanism 540 (which are hereinafter collectively referred to as a "platen plate unit") in the width direction (X direction) in order to adjust the separated distance between the platen plates 501 and the left side rotary mechanism 520L. As shown in FIG. 9, this platen plate sliding mechanism 560 mainly includes a ball screw 561, a nut 562, and a ball screw driving motor (not shown in the figures).

As shown in FIG. 9, the ball screw 561 is disposed and the rotary axis thereof is arranged in the width direction (X direction). The nut 562 is screwed onto the aforementioned ball screw 561. Further, the aforementioned platen plate unit is mounted on the nut 562. The ball screw driving motor is a forwardly and reversely rotatable motor. Accordingly, the platen plate sliding mechanism 560 can adjust the separated distance between the platen plates 501 and the left side rotary mechanism 520L.

<Computer>

The computer 600 is entirely in charge of controlling the respective components of the folding object processing apparatus 1. The computer 600 mainly includes a ROM, a CPU, a RAM, and an input/output interface. The ROM stores an operating system, a control program for controlling the respective components of the folding object processing apparatus 1, and a set of data required for executing the control program. The CPU is provided for loading the control program stored in the ROM to the RAM and for directly executing the control program from the ROM. In other words, controlling of the folding object processing apparatus 1 is enabled when the CPU executes the control program. A set of data processed by the CPU is configured to be transmitted through the input/output interface to the respective components (the spreading device 300, the folding device 500, etc.) of the folding object processing apparatus 1. A set of data required for processing by the CPU is received through the input/output interface from the respective components (the digital still cameras 401) of the folding object processing apparatus 1.

Figure 10:
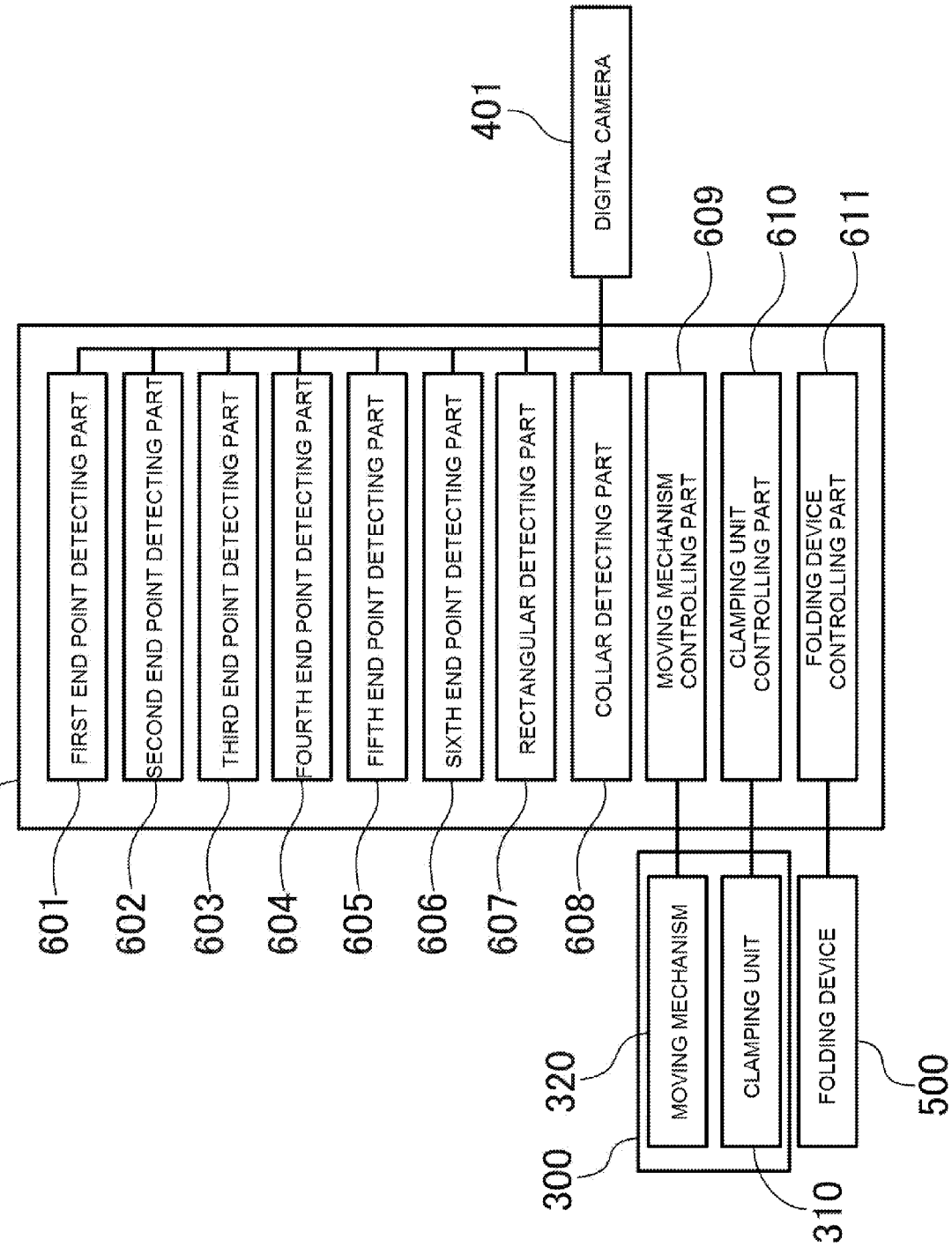
FIG. 10 is a functional block diagram of a control part of the folding object processing apparatus represented in FIG. 1, according to an embodiment.
Figure 11:
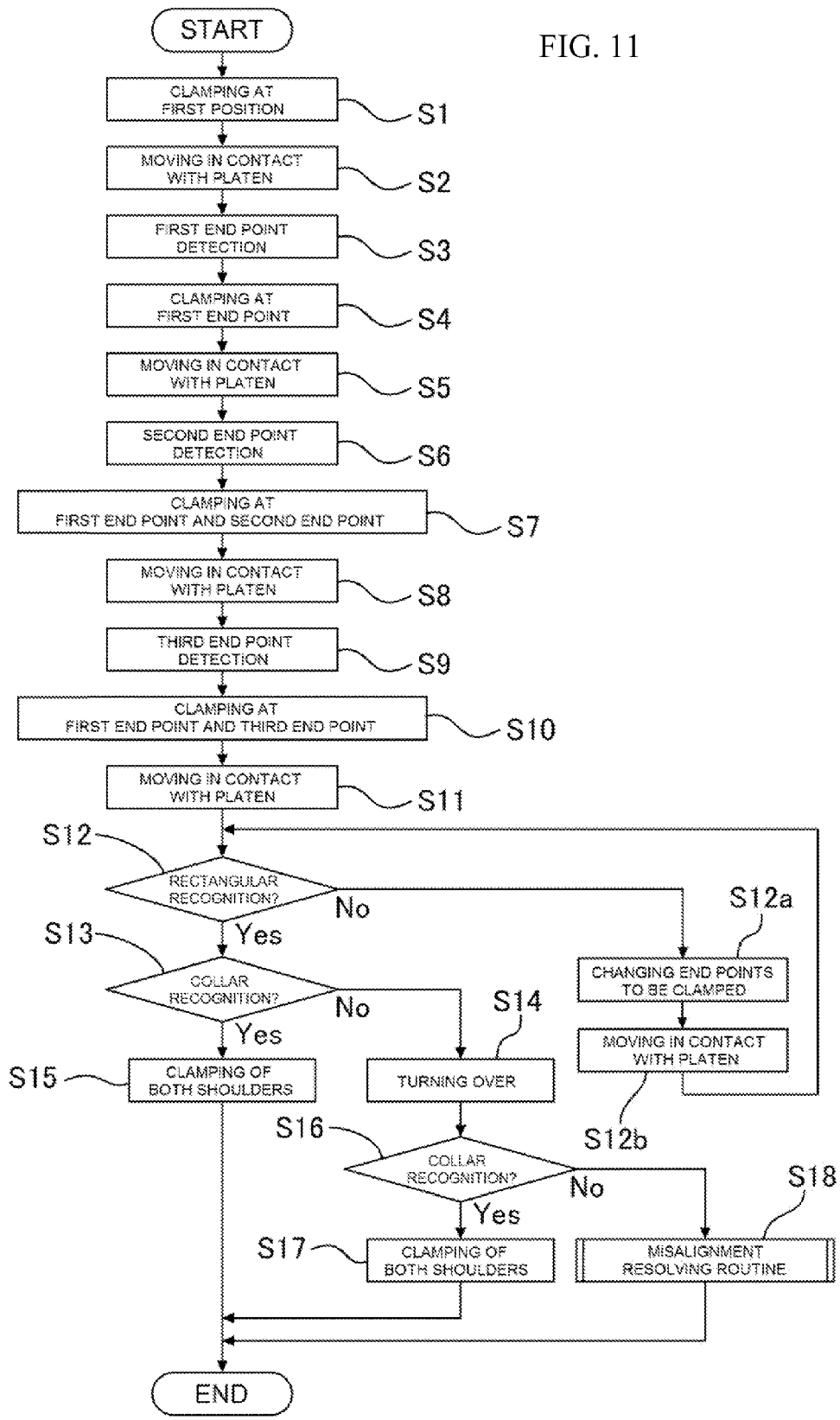
FIG. 11 is a flowchart representing a motion of spreading a T-shirt by the spreading device of the folding object processing apparatus represented in FIG. 1, according to an embodiment.

As shown in a functional block diagram of FIG. 10, the computer 600 includes a first endpoint detecting part 601, a second endpoint detecting part 602, a third endpoint detecting part 603, a fourth endpoint detecting part 604, a fifth endpoint detecting part 605, a sixth endpoint detecting part 606, a rectangular detecting part (a first characteristic portion detecting part) 607, a collar detecting part (a second characteristic portion detecting part) 608, a moving mechanism controlling part 609, a clamping unit controlling part 610, and a folding device controlling part 611.

<First Endpoint Detecting Part>

The first endpoint detecting part 601 is configured to detect the first endpoint P1, located farthest away from the first point P, of the folding object clamped at its first position P by the clamping unit 310. The first point P is the center position of the folding object to be put on the platen 200. Specifically, the first endpoint detecting part 601 is configured to form a plan image of the folding object clamped at its first point P based on the set of imaging data to be transmitted from the digital still cameras 401, and is configured to detect the first endpoint P1 located farthest away from the first point P based on the plan image (see FIG. 13(e)).

<Second Endpoint Detecting Part>

The second endpoint detecting part 602 is configured to detect the second endpoint P2, located farthest away from the first endpoint P1, of the folding object clamped at its first endpoint P1 by the clamping unit 310. Specifically, the second endpoint detecting part 602 is configured to form a plan image of the folding object clamped at its first endpoint P1 based on the set of imaging data to be transmitted from the digital still cameras 401, and is configured to detect the second endpoint P2 located farthest away from the first endpoint P1 based on the plan image (see FIG. 14(i)).

<Third Endpoint Detecting Part>

The third endpoint detecting part 603 is configured to detect the third endpoint P3, located farthest away from the straight line L1 connecting clamp-related endpoints, of the folding object clamped at both of its first endpoint P1 and its second endpoint P2 by the clamping unit 310. Specifically, the third endpoint detecting part 603 is configured to form a plan image of the folding object clamped at both of its first endpoint P1 and its second endpoint P2 based on the set of imaging data to be transmitted from the digital still cameras 401, and is configured to detect the third endpoint P3 located farthest away from the straight line L1 based on the plan image (see FIG. 16(m)).

<Fourth Endpoint Detecting Part>

The fourth endpoint detecting part 604 is configured to detect the fourth endpoint P4, located farthest away from the straight line L2 connecting clamp-related endpoints, of the folding object clamped at both of its third endpoint P3 and either its first endpoint P1 or its second endpoint P2 by the clamping unit 310. Specifically, the fourth endpoint detecting part 604 is configured to form a plan image of the folding object clamped at both of its third endpoint P3 and either its first endpoint P1 or its second endpoint P2 based on the set of imaging data to be transmitted from the digital still cameras 401, and is configured to detect the fourth endpoint P4 located farthest away from the straight line L2 based on the plan image (see FIG. 25(o)).

<Fifth Endpoint Detecting Part>

The fifth endpoint detecting part 605 is configured to detect the fifth endpoint P5, located farthest away from the fourth endpoint P4, of the folding object clamped at its fourth endpoint P4 by the clamping unit 310. Specifically, the fifth endpoint detecting part 605 is configured to form a plan image of the folding object clamped at its fourth endpoint P1 based on the set of imaging data to be transmitted from the digital still cameras 401, and is configured to detect the fifth endpoint P5 located farthest away from the fourth endpoint P4 based on the plan image (see FIG. 26(r)).

<Sixth Endpoint Detecting Part>

The sixth endpoint detecting part 606 is configured to detect the sixth endpoint P6, located farthest away from the straight line L3 connecting clamp-related endpoints, of the folding object clamped at both of its fourth endpoint P4 and its fifth endpoint P5 by the clamping unit 310. Specifically, the sixth endpoint detecting part 606 is configured to form a plan image of the folding object clamped at both of its fourth endpoint P4 and its fifth endpoint P5 based on the set of imaging data to be transmitted from the digital still cameras 401, and is configured to detect the sixth endpoint P6 located farthest away from the straight line L3 based on the plan image (see FIG. 27(u)).

The first to sixth endpoint detecting parts 601 to 606 are configured to extract a set of contour data of the folding object from the created plan image of the folding object, and are subsequently configured to detect the first to sixth endpoints P1 to P6 based on the set of contour data.

<Rectangular Detecting Part>

The rectangular detecting part 607 is configured to detect whether or not the contour of the folding object is rectangular. Specifically, the rectangular detecting part 607 is configured to determine whether or not approximate matching is found between the rectangular pattern stored in the storage part (not shown in the figures) of the computer 600 and the contour of the folding object extracted from the plan image formed based on the set of imaging data transmitted from the digital still cameras 401. Further, when determining that the rectangular pattern and the contour of the folding object are matched at a predetermined level or greater, the rectangular detecting part 607 is configured to determine that the folding object has been spread (see FIGS. 17(q) and 23(k)).

<Collar Detecting Part>

The collar detecting part 608 is configured to detect the collar portion of the folding object. The collar detecting part 608 according to the present embodiment is configured to detect the collar portion of the folding object by executing image recognition using HOG (Histogram of Oriented Gradients) characteristics. The method of image recognition using the HOG characteristics is a method in which a gradient (differential image) is calculated for the plan image based on the set of imaging data transmitted from the digital still cameras 401, and gradient orientations in localized regions divided from the gradient (differential image) are obtained in a histogram form as a characteristic amount.

<Moving Mechanism Controlling Part>

The moving mechanism controlling part 609 is configured to control the motion of the moving mechanism 320 of the spreading device 300. In other words, the moving mechanism controlling part 609 is configured to control the motions of the close/away mechanism 330, the rotary moving mechanism 340, the width directionally moving mechanism 350, the up-and-down directionally moving mechanism 360, and the back-and-forth directionally moving mechanism 370.

In conjunction with controlling the motion of the close/away mechanism 330 by the moving mechanism controlling part 609, the right chuck part 310R and the left chuck part 310L are configured to be respectively moved along the longitudinal direction (K direction) of the rotary plate 342. Accordingly, a distance can be adjusted between the right chuck part 310R and the left chuck part 310L.

In conjunction with controlling the motion of the rotary moving mechanism 340 by the moving mechanism controlling part 609, the right chuck part 310R and the left chuck part 310L are configured to respectively revolve about the driving shaft (the rotary axis direction: Z direction) of the motor 341.

In conjunction with controlling the motion of the width directionally moving mechanism 350 by the moving mechanism controlling part 609, the right chuck part 310R and the left chuck part 310L are configured to be simultaneously moved along the width direction (X direction).

In conjunction with controlling the motion of the up-and-down directionally moving mechanism 360 by the moving mechanism controlling part 609, the right chuck part 310R and the left chuck part 310L are configured to be simultaneously moved along the up-and-down direction (Z direction).

In conjunction with controlling the motion of the back-and-forth directionally moving mechanism 370 by the moving mechanism controlling part 609, the right chuck part 310R and the left chuck part 310L are configured to be simultaneously moved along the back-and-forth direction (Y direction).

<Clamping Unit Controlling Part>

The clamping unit controlling part 610 is configured to control the motions of the right and left chuck parts 310R and 310L of the clamping unit 310.

In conjunction with controlling the driving of the rotary actuators 313R and 313L (see FIG. 4) by the clamping unit controlling part 610 controls, the fingers 311R and 311L are configured to respectively rotate about the driving shafts (the rotational axis direction: Z direction) of the rotary actuators 313R and 313L.

In conjunction with controlling the driving of the linear actuators 312R and 312L by the clamping unit controlling part 610, the fingers 311R and 311L are configured to respectively clamp or unclamp the folding object.

<Controls by Moving Mechanism Controlling Part and Clamping Unit Controlling Part>

To spread the folding object that was untidily placed on the platen 200, the aforementioned clamping unit controlling part 610 and moving mechanism controlling part 609 are configured to control driving of the clamping unit 310 and that of the moving mechanism 320 so that first to eleventh controls to be explained below are executed. In other words, the clamping unit controlling part 610 and the moving mechanism controlling part 609 are configured to control the clamping unit 310 and the moving mechanism 320 so that the clamping unit 310 clamps the first point P of the folding object (a first control).

After the first control, the clamping unit controlling part 610 and the moving mechanism controlling part 609 are configured to control the clamping unit 310 and the moving mechanism 320 so that the clamping unit 310 clamps the first endpoint P1 of the folding object (a second control).

Following the second control, the clamping unit controlling part 610 and the moving mechanism controlling part 609 are configured to control the clamping unit 310 and the moving mechanism 320 so that the clamping unit 310 clamps both of the first endpoint P1 and the second endpoint P2 of the folding object (a third control).

After the third control, the clamping unit controlling part 610 and the moving mechanism controlling part 609 are configured to control the clamping unit 310 and the moving mechanism 320 so that the clamping unit 310 clamps both the third endpoint P3 and either the first endpoint P1 or the second endpoint P2 of the folding object at (a fourth control).

Following the fourth control, the clamping unit controlling part 610 and the moving mechanism controlling part 609 are configured to control the clamping unit 310 and the moving mechanism 320 so that the clamping unit 310 clamps both of: either the first endpoint P1 or the second endpoint P2, which has not been clamped in the fourth control, and the third endpoint P3 of the folding object (a fifth control).

The clamping unit controlling part 610 and the moving mechanism controlling part 609 are configured to control the clamping unit 310 and the moving mechanism 320 so that the clamping unit 310 clamps a position set based on the collar portion (the second characteristic portion) (a sixth control).

The clamping unit controlling part 610 and the moving mechanism control part 609 are configured to control the clamping unit 310 and the moving mechanism 320 so that the clamping unit 310 turns over the folding object (a seventh control).

The clamping unit controlling part 610 and the moving mechanism controlling part 609 are configured to control the clamping unit 310 and the moving mechanism 320 so that the folding object, clamped at both of its third endpoint P3 and either its first endpoint P1 or its second endpoint P2, makes contact at its bottom end with the platen 200 (an eighth control).

After the eighth control, the clamping unit controlling part 610 and the moving mechanism controlling part 609 are configured to control the clamping unit 310 and the moving mechanism 320 so that the clamping unit 310 clamps the fourth endpoint P4 of the folding object (a ninth control).

Following the ninth control, the clamping unit controlling part 610 and the moving mechanism controlling part 609 are configured to control the clamping unit 310 and the moving mechanism 320 so that the clamping unit 310 clamps both of the fourth endpoint P4 and the fifth endpoint P5 of the folding object (a tenth control).

Following the tenth control, the clamping unit controlling part 610 and the moving mechanism controlling part 609 are configured to control the clamping unit 310 and the moving mechanism 320 so that the clamping unit 310 clamps both of: either the fourth endpoint P4 or the fifth endpoint P5 and the sixth endpoint P6 of the folding object (an eleventh control).

<Folding Device Controlling Part>

The folding device controlling part 611 is configured to control the motion of the folding device 500. In other words, the folding device controlling part 611 is configured to control the motions of the dual nested shaft rotary mechanism 520, the inter-platen-plate distance adjusting mechanism 530, the platen plate back-and-forth adjusting mechanism 540, the folding plate sliding mechanism 550 and the platen plate sliding mechanism 560.

Specifically, the folding plates 511 to 514 are configured to be sequentially rotated in conjunction with controlling of the motion of the dual nested shaft rotary mechanism 520 (the right side rotary mechanism 520R, the left side rotary mechanism 520L) by the folding device controlling part 611.

A pair of the platen plates 501 is configured to be moved closer to or away from each other in conjunction with controlling of the motion of the inter-platen-plate distance adjusting mechanism 530 by the folding device controlling part 611.

A pair of the platen plates 501 of the pair is configured to be moved along the back-and-forth direction (Y direction) in conjunction with controlling of the motion of the platen plate back-and-forth adjusting mechanism 540 by the folding device controlling part 611.

The right side rotary mechanism 520R is configured to be moved along the width direction (X direction) in conjunction with controlling of the motion of the folding plate sliding mechanism 550 by the folding device controlling part 611.

The platen plate unit (the platen plates 501, the inter-platen-plate distance adjusting mechanism 530, and the platen plate back-and-forth adjusting mechanism 540) is configured to be moved along the width direction (X direction) in conjunction with controlling of the motion of the platen plate sliding mechanism 560 by the folding device controlling part 611.

<Spreading Motion by Spreading Device for T-Shirt>

Next, explanation will be made for a motion of spreading a T-shirt TS as an exemplary folding object by the spreading device 300 with reference to a flowchart of FIG. 11 and FIGS. 12 to 18.

First, as shown in FIG. 12(a), the washed and dried T-shirt TS is untidily placed on the platen 200. Then, as shown in FIG. 12(b), the first point P of the T-shirt TS is clamped by the right chuck part 310R (the first control, a first clamping step, Step S1). It should be noted that the first endpoint P1 of the T-shirt TS may be herein clamped by the left chuck part 310L. The first point P is the center position of the T-shirt TS, and the position is detected by the computer 600 based on a set of imaging data of the T-shirt TS from the digital still cameras 401. Then, as shown in FIG. 12(c), the T-shirt TS clamped at its first point P is elevated by elevating the right chuck part 310R.

Next, as shown in FIG. 13(d), the T-shirt TS clamped by the right chuck part 310R is moved to the outside of the platen 200 by causing the right chuck part 310R to temporarily retract in the horizontal direction. Subsequently, the right chuck part 310R is lowered for causing the T-shirt TS to make contact with the platen 200, and the right chuck part 310R is caused to proceed in the horizontal direction (in a direction from right to left from the observer's point of view in FIG. 13(d)). Accordingly, the T-shirt TS, clamped at its first point P by the right chuck part 310R, is moved in contact with the top surface of the platen 200 (Step S2). Further, as shown in FIG. 13(e), when the T-shirt TS is entirely disposed on the platen 200, horizontal moving of the right chuck part 310R is stopped and clamping of the T-shirt TS by the right chuck part 310R is released. Accordingly, the T-shirt TS is completely placed on the platen 200. At this time, an image of the T-shirt placed on the platen 200 is captured by the digital still cameras 401, and a set of imaging data of the T-shirt TS from the digital still cameras 401 is transmitted to the computer 600. The first endpoint P1 is therein detected by the first endpoint detecting part 601 (a first endpoint detecting step, Step S3). As shown in FIG. 13(f), the first endpoint P1 of the T-shirt TS placed on the platen 200 is clamped by the right chuck part 310R (the second control, a second clamping step, Step S4). The first endpoint P1 of the T-shirt TS may be herein clamped by the left chuck part 310L.

Next, as shown in FIG. 14(g), the T-shirt TS clamped at its first endpoint P1 is elevated by elevating the right chuck part 310R. As shown in FIG. 14(h), the T-shirt TS clamped by the right chuck part 310R is moved to the outside of the platen 200 by causing the right chuck part 310R to temporarily retract in the horizontal direction. Subsequently, the right chuck part 310R is lowered for causing the T-shirt TS to make contact with the platen 200, and the right chuck part 310R is caused to proceed in the horizontal direction (in a direction from right to left of from the observer's point of view in FIG. 14(h)). Accordingly, the T-shirt TS clamped at its first endpoint P1 by the right chuck part 310R is moved in contact with the top surface of the platen 200 (Step S5). As shown in FIG. 14(i), when the T-shirt TS is entirely disposed on the platen 200, horizontal moving of the right chuck part 310R is stopped and clamping of the T-shirt TS by the right chuck part 310R is released. Accordingly, the T-shirt TS is completely put on the platen 200. At this time, the T-shirt TS put on the platen 200 is imaged by the digital still cameras 401, and a set of imaging data of the T-shirt TS imaged by the digital still cameras 401 is transmitted to the computer 600. The second endpoint P2 is therein detected by the second endpoint detecting part 602 (a second endpoint detecting step, Step S6).

Next, as shown in FIG. 15(j), the first endpoint P1 and the second endpoint P2 of the T-shirt TS put on the platen 200 are respectively clamped by the right chuck part 310R and the left chuck part 310L (the third control, a third clamping step, Step S7). As shown in FIG. 15(k), the T-shirt TS clamped at its first endpoint P1 and its second endpoint P2 is elevated by elevating the right chuck part 310R and the left chuck part 310L. It should be noted that at this time, the right chuck part 310R and the left chuck part 310L are elevated so that a straight line connecting the first endpoint P1 and the second endpoint P2 is arranged completely or roughly in the horizontal direction. As shown in FIG. 15(l), the T-shirt TS clamped by the both chuck parts 310R and 310L is moved to the outside of the platen 200 by causing the right chuck part 310R and the left chuck part 310L to temporarily retract in the horizontal direction. Subsequently, both chuck parts 310R and 310L are lowered for causing the T-shirt TS to make contact with the platen 200, and both chuck parts 310R and 310L are caused to proceed in the horizontal direction (in a direction from right to left from the observer's point of view in FIG. 15(l)). Accordingly, the T-shirt clamped by the both chuck parts 310R and 310L is moved in contact with the top surface of the platen 200 (Step S8). It should be noted that before being caused to proceed in the horizontal direction, the right chuck part 310R and the left chuck part 310L are caused to revolve so that the both chuck parts 310R and 310L are disposed along a direction perpendicular to the direction of causing both chuck parts 310R and 310L to proceed (an arrow D1 direction).

Next, as shown in FIG. 16(m), when the T-shirt TS is entirely disposed on the platen 200, horizontal movement of the right chuck part 310R and that of the left chuck part 310L are stopped, and clamping of the T-shirt TS by the right chuck part 310R and the left chuck part 310L is released. Accordingly, the T-shirt TS is completely placed on the platen 200. At this time, an image of the T-shirt TS placed on the platen 200 is captured by the digital still cameras 401 and the corresponding set of imaging data of the T-shirt TS is transmitted to the computer 600. The third endpoint P3 is therein detected by the third endpoint detecting part 603 (a third endpoint detecting step, Step S9). As shown in FIG. 16(n), the T-shirt TS put on the platen 200 is clamped at its first endpoint P1 and its third endpoint P3 by the right chuck part 310R and the left chuck part 310L, respectively (the fourth control, a fourth clamping step, Step S10). The second endpoint P2 and the third endpoint P3 may be clamped by the right chuck part 310R and the left chuck part 310L, respectively. In the present exemplary embodiment, when the third endpoint P3 is clamped by the clamping unit 310 in Step S10, the left chuck part 310L, clamping the second endpoint P2 closer to the third endpoint P3, is moved for clamping the third endpoint P3 without moving the right chuck part 310R clamping the first endpoint P1 away from the third endpoint P3. As shown in FIG. 16(o), the T-shirt TS clamped at its first endpoint P1 and its third endpoint P3 is elevated by elevating the right chuck part 310R and the left chuck part 310L.

Next, as shown in FIG. 17(p), the T-shirt TS clamped by the both chuck parts 310R and 310L is moved to the outside of the platen 200 by causing the right chuck part 310R and the left chuck part 310L to temporarily retract in the horizontal direction. Subsequently, the T-shirt TS is caused to make contact with the platen 200 by lowering the both chuck parts 310R and 310L and the both chuck parts 310R and 310L are caused to proceed in the horizontal direction (in a direction from right to left from the observer's point of view in FIG. 17(p)). Accordingly, the T-shirt TS clamped by both chuck parts 310R and 310L is moved in contact with the top surface of the platen 200 (Step S11). Before the chuck parts 310R and 310L are caused to proceed in the horizontal direction, the right chuck part 310R and the left chuck part 310L are caused to revolve so that the right chuck part 310R and the left chuck part 310L are disposed along a direction perpendicular to the direction of causing the chuck parts 310R and 310L to proceed (D2 direction). As shown in FIG. 17(q), when the T-shirt TS is entirely disposed on the platen 200, horizontal movement of the right chuck part 310R and the left chuck part 310L are stopped, and clamping of the T-shirt TS by the right chuck part 310R and the left chuck part 310L is released. Accordingly, the T-shirt TS is completely placed on the platen 200. At this time, an image of the T-shirt TS placed on the platen 200 is captured by the digital still cameras 401, and the corresponding set of imaging data of the T-shirt TS captured by the digital still cameras 401 is transmitted to the computer 600. It is therein determined by the rectangular detecting part 607 whether or not the contour of the T-shirt TS is rectangular (Step S12). When it is determined that the contour of the T-shirt TS is rectangular (Step S12: Yes), the collar portion of the T-shirt TS is detected (Step S13). When the collar portion of the T-shirt TS put on the platen 200 is not detected (Step S13: No), the T-shirt TS is turned over as shown in FIG. 17(r) (the seventh control, Step S14). Specifically, the T-shirt TS is elevated by elevating the right chuck part 310R and the left chuck part 310L, while both corners C1 and C2 of the hem portion of the T-shirt TS are clamped by the right chuck part 310R and the left chuck part 310L, respectively. The T-shirt TS clamped at the both corners C1 and C2 of the hem portion thereof is turned over by moving the right chuck part 310R and the left chuck part 310L towards shoulder portions in the horizontal direction (D3 direction). Accordingly, the collar portion of the T-shirt TS can be exposed to the front side.

Conversely, when it is determined that the contour of the T-shirt TS is not rectangular in Step S12 (Step S12: No), in other words, when it is determined that the T-shirt TS is not spread, endpoints to be held are changed to the others (a fifth control, Step S12a). Specifically, in Step S12a, both of the third endpoint P3 and an endpoint having not been clamped in the previous step (the second endpoint P2 in the present embodiment) are clamped. The T-shirt TS clamped by the both chuck parts 310R and 310L is moved to the outside of the platen 200 by causing the right chuck part 310R and the left chuck part 310L to temporarily retract in the horizontal direction. Subsequently, the chuck parts 310R and 310L are lowered for causing the T-shirt TS to make contact with the platen 200, and the chuck parts 310R and 310L are caused to proceed in the horizontal direction (in a direction from right to left of the observer's point of view in FIG. 17(r)). Accordingly, the T-shirt TS clamped at its second endpoint P2 and its third endpoint P3 by the right chuck part 310R and the left chuck part 310L is moved in contact with the top surface of the platen 200 (Step S12b). The processing then returns to Step S12, and the rectangular detecting part 607 determines whether or not the contour of the T-shirt TS is rectangular (Step S12).

In Step S13, when the collar portion of the T-shirt TS on the platen 200 is detected (Step S13: Yes), the shoulder portions T1 and T2 of the T-shirt TS, which are portions set with reference to the collar portion, are respectively clamped by the right chuck part 310R and the left chuck part 310L as shown in FIG. 18(s) (a sixth control, Step S15).

Conversely, when the collar portion of the T-shirt TS is recognized as shown in FIG. 18(s) (Step S16: Yes) after the T-shirt TS is turned over (Step S14), the shoulder portions T1 and T2 of the T-shirt TS, which are portions set with reference to the collar portion, are respectively clamped by the right chuck part 310R and the left chuck part 310L as shown in FIG. 18(t) (Step S17). Spreading of the T-shirt TS is finished by elevating the right chuck part 310R and the left chuck part 310L under the condition.

The T-shirt TS spread as described above is put on the platen plates 501 of the folding device 500. Specifically, the T-shirt TS is put on the platen plates 501 so that the both shoulder portions T1 and T2 of the T-shirt TS clamped by the right chuck part 310R and the left chuck part 310L are disposed on the base end side of the platen plates 501 while the hem portion of the T-shirt TS is disposed on the tip end side of the platen plates 501. Accordingly, the lateral end portions of the T-shirt TS are hung over the right side rotary mechanism 520R side and the left side rotary mechanism 520L side of the platen plates 501, and the hem portion of the T-shirt TS is hung over the tip end side of the platen plates 501.

When the collar portion is not recognized (Step S16: No) even though the T-shirt TS has been turned over (Step S14), the processing proceeds to a misalignment resolving routine (Step S18). Detailed explanation will be made for the misalignment resolving routine (Step S18) in the explanation of a spreading motion of a sleeveless shirt RS (described further below).

<Spreading Motion by Spreading Device for Sleeveless Shirt>

Next, explanation will be made for a motion of the spreading device 300 for spreading the sleeveless shirt RS as an exemplary folding object with reference to flowcharts of FIGS. 11 and 19 and FIGS. 20 to 28. Chances are that detection of the collar portion of the sleeveless shirt RS failed because, unlike the T-shirt TS, the sleeveless shirt RS does not have sleeves. In such a case, the processing is configured to proceed to the misalignment resolving routine (Step S18 (see FIG. 11)).

First, as shown in FIG. 20(a), the washed and dried sleeveless shirt RS (hereinafter referred to as "shirt RS") is untidily placed on the platen 200. Then, as shown in FIG. 20(b), the first point P of the shirt RS of an untidy state is clamped by the right chuck part 310R (a first control, a first clamping step, Step S1 (see FIG. 11)). The first endpoint P1 of the T-shirt TS may be herein clamped by the left chuck part 310L. This first point P is the center position of the shirt RS of an untidy state, and the position is detected by the computer 600 based on a set of imaging data of the shirt RS captured by the digital still cameras 401. Then, the shirt RS clamped at its first point P is elevated by elevating the right chuck part 310R. As shown in FIG. 20(c), the shirt RS clamped by the right chuck part 310R is moved to the outside of the platen 200 by causing the right chuck part 310R to temporarily retract in the horizontal direction.

Subsequently, the right chuck part 310R is lowered for causing the shirt RS to make contact with the platen 200, and the right chuck part 310R is caused to proceed in the horizontal direction (in a direction from right to left from the observer's point of view in FIG. 20(*c*)). Accordingly, the shirt RS, clamped at its first point P by the right chuck part 310R, is moved in contact with the top surface of the platen 200 (Step S2).

As shown in FIG. 21(*d*), when the shirt RS is entirely disposed on the platen 200, horizontal movement of the right chuck part 310R is stopped and clamping of the shirt RS by the right chuck part 310R is released. Accordingly, the shirt RS is completely on the platen 200. At this time, an image of the shirt RS on the platen 200 is captured by the digital still cameras 401, and a set of imaging data of the shirt RS captured by the digital still cameras 401 is transmitted to the computer 600. The first endpoint P1 is therein detected by the first endpoint detecting part 601 (a first endpoint detecting step, Step S3). The first endpoint P1 of the shirt RS put on the platen 200 is clamped by the right chuck part 310R (a second control, a second clamping step, Step S4). The first endpoint P1 of the shirt RS may be herein clamped by the left chuck part 310L. Next, as shown in FIG. 21(*e*), the shirt RS clamped by the right chuck part 310R is moved to the outside of the platen 200 by causing the right chuck part 310R to temporarily retract in the horizontal direction. Subsequently, the right chuck part 310R is lowered for causing the shirt RS to make contact with the platen 200, and the right chuck part 310R is caused to proceed in the horizontal direction (in a direction from right to left from the observer's point of view in FIG. 21(*e*)). Accordingly, the shirt RS is moved in contact with the top surface of the platen 200 (Step S5). Further, as shown in FIG. 21(*f*), when the shirt RS is entirely disposed on the platen 200, horizontal movement of the right chuck part 310R is stopped and clamping of the shirt RS by the right chuck part 310R is released. Accordingly, the shirt RS is completely on the platen 200. At this time, an image of the shirt RS put on the platen 200 is captured by the digital still cameras 401, and a set of imaging data of the shirt RS captured by the digital still cameras 401 is transmitted to the computer 600. The second endpoint P2 is therein detected by the second endpoint detecting part 602 (a second endpoint detecting step, Step S6). The first endpoint P1 and the second endpoint P2 of the shirt RS put on the platen 200 are respectively clamped by the right chuck part 310R and the left chuck part 310L (a third control, a third clamping step, Step S7).

Next, as shown in FIG. 22(*g*), the shirt RS clamped by the both chuck parts 310R and 310L is moved to the outside of the platen 200 by causing the right chuck part 310R and the left chuck part 310L to temporarily retract in the horizontal direction. Subsequently, the chuck parts 310R and 310L are lowered for causing the shirt RS to make contact with the platen 200, and the chuck parts 310R and 310L are caused to proceed in the horizontal direction (in an oblique direction from upper right to lower left of the observer's point of view in FIG. 22(*g*)). Accordingly, the shirt RS clamped by the chuck parts 310R and 310L is moved in contact with the top surface of the platen 200 (Step S8). Before the both chuck parts 310R and 310L are caused to proceed in the horizontal direction, the right chuck part 310R and the left chuck part 310L are caused to revolve so that the right chuck part 310R and the left chuck part 310L are disposed along a direction perpendicular to the direction of causing the both chuck parts 310R and 310L to proceed (D4 direction). As shown in FIG. 22(*h*), when the shirt RS is entirely disposed on the platen 200, horizontal movement of the right chuck part 310R and the left chuck part 310L is stopped and clamping of the shirt RS by the right chuck part 310R and the left chuck part 310L is released. Accordingly, the shirt RS is completely on the platen 200. At this time, an image of the shirt RS on the platen 200 is captured by the digital still cameras 401, and a set of imaging data of the shirt RS captured by the digital still cameras 401 is transmitted to the computer 600. The third endpoint P3 is then detected by the third endpoint detecting part 603 (a third endpoint detecting step, Step S9). The first endpoint P1 and the third endpoint P3 of the shirt RS on the platen 200 are respectively clamped by the right chuck part 310R and the left chuck part 310L (a fourth control, a fourth clamping step, Step S10). As shown in FIG. 22(*j*), the shirt RS clamped at its first endpoint P1 and its third endpoint P3 is elevated by elevating the right chuck part 310R and the left chuck part 310L.

Next, as shown in FIG. 23(*j*), the shirt RS clamped by the chuck parts 310R and 310L is moved to the outside of the platen 200 by causing the right chuck part 310R and the left chuck part 310L to temporarily retract in the horizontal direction. Subsequently, the chuck parts 310R and 310L are lowered for causing the shirt RS to make contact with the platen 200, and the chuck parts 310R and 310L are caused to proceed in the horizontal direction (in an oblique direction from upper right to lower left of the observer's point of view in FIG. 23(*j*)). Accordingly, the shirt RS clamped by the both chuck parts 310R and 310L is moved in contact with the top surface of the platen 200 (Step S11). Before being caused to proceed in the horizontal direction, the right chuck part 310R and the left chuck part 310L are caused to revolve so that the both right chuck parts 310R and 310L are disposed along a direction perpendicular to the direction of causing the both chuck parts 310R and 310L to proceed (an arrow D5 direction). Further, as shown in FIG. 23(*k*), when the shirt RS is entirely disposed on the platen 200, horizontal movement of the right chuck part 310R and the left chuck part 310L is stopped, and clamping of the shirt RS by the right chuck part 310R and the left chuck part 310L is released. Accordingly, the shirt RS is completely on the platen 200. At this time, an image of the shirt RS on the platen 200 is captured by the digital still cameras 401, and a set of imaging data of the shirt RS captured by the digital still cameras 401 is transmitted to the computer 600. It is then determined whether or not the contour of the shirt RS is rectangular (Step S12). When it is then determined that the contour of the shirt RS is rectangular (Step S12: Yes), the collar portion of the shirt RS is detected (Step S13). When the collar portion of the shirt RS put on the platen 200 is not detected (Step S13: No), the shirt RS is turned over (Step S14). In the present embodiment, when the collar portion is not herein detected even though the shirt RS has been turned over (Step S16: No), the control of the misalignment resolving routine is executed (Step S18). Detailed explanation of the misalignment resolving routine follows with reference to FIG. 19.

The collar portion of the shirt RS may be undetectable even though the shirt RS has been turned over. In this case, as shown in FIG. 24(*l*), the shirt RS clamped at its first endpoint P1 and its third endpoint P3 is elevated by elevating the right chuck part 310R and the left chuck part 310L. As shown in FIG. 24(*m*), the right chuck part 310R and the left chuck part 310L are slightly lowered for causing the shirt RS, clamped at its first endpoint P1 and its third endpoint P3, to make contact at its bottom end with the platen 200 (an eighth control, Step S21). As shown in FIG. 24(*n*), the right chuck part 310R and the left chuck part 310L are moved in the horizontal direction (in an oblique direction from lower right to upper left of the observer's point of view in FIG. 24(*n*)), while the shirt RS is caused to make contact at its bottom end with the platen 200 (Step S22).

Further, as shown in FIG. 25(*o*), when the shirt RS is entirely disposed on the platen 200, horizontal movement of the right chuck part 310R and the left chuck part 310L is stopped, and clamping of the shirt RS by the right chuck part 310R and the left chuck part 310L is released. Accordingly, the shirt RS is completely put on the platen 200. At this time, an image of the shirt RS on the platen 200 is captured by the digital still cameras 401, and a set of imaging data of the shirt RS captured by the digital still cameras 401 is transmitted to the computer 600. The fourth endpoint P4 is then detected by the fourth endpoint detecting part 604 (a fourth endpoint detecting step, Step S23). The shirt RS put on the platen 200 is clamped at its fourth endpoint P4 by the right chuck part 310R (a ninth control, a fifth clamping step, Step S24). At this time, the fourth endpoint P4 of the shirt RS may be clamped by the left chuck part 310L. As shown in FIG. 25(*p*), the shirt RS clamped at its fourth endpoint P4 is elevated by elevating the right chuck part 310R. As shown in FIG. 25(*q*), the shirt RS clamped by the right chuck part 310R is moved to the outside of the platen 200 by causing the right chuck part 310R to temporarily retract in the horizontal direction. Subsequently, the shirt RS is caused to make contact with the platen 200 by lowering the right chuck part 310R, and the right chuck part 310R is caused to proceed in the horizontal direction (in an oblique direction from the upper right to the lower left of the observer's point of view in FIG. 25(*q*)). Accordingly, the shirt RS clamped at its first position P by the right chuck part 310R is moved in contact with the top surface of the platen 200 (Step S25).

Next, as shown in FIG. 26(*r*), when the shirt RS is entirely disposed on the platen 200, horizontal movement of the right chuck part 310R is stopped, and clamping of the shirt RS by the right chuck part 310R is released. Accordingly, the shirt RS is completely on the platen 200. At this time, an image of the shirt RS on the platen 200 is captured by the digital still cameras 401, and a set of imaging data of the shirt RS captured by the digital still cameras 401 is transmitted to the computer 600. The fifth endpoint P5 is then detected by the fifth endpoint detecting part 605 (a fifth endpoint detecting step, Step S26). The fourth endpoint P4 and the fifth endpoint P5 of the shirt RS on the platen 200 are respectively clamped by the right chuck part 310R and the left chuck part 310L (a tenth control, a sixth clamping step, Step S27). As shown in FIG. 26(*s*), the shirt RS clamped at its fourth endpoint P4 and its fifth endpoint P5 is elevated by elevating the right chuck part 310R and the left chuck part 310L. Further, as shown in FIG. 26(*t*), the shirt RS clamped by the chuck parts 310R and 310L is moved to the outside of the platen 200 by causing the right chuck part 310R and the left chuck part 310L to temporarily retract in the horizontal direction. Subsequently, the shirt RS is caused to make contact with the platen 200 by lowering the chuck parts 310R and 310L, and the chuck parts 310R and 310L are caused to proceed in the horizontal direction (in an oblique direction from the upper right to the lower left of the observer's point of view in FIG. 26(*t*)). Accordingly, the shirt RS, clamped at its fourth endpoint P4 and its fifth endpoint P5 by the right chuck part 310R and the left chuck part 310L, is moved in contact with the top surface of the platen 200 (Step S28). It should be noted that before the both chuck parts 310R and 310L are caused to proceed in the horizontal direction, the right chuck part 310R and the left chuck part 310L are caused to revolve so that the right chuck part 310R and the left chuck part 310L are disposed along a direction perpendicular to the direction of causing the chuck parts 310R and 310L to proceed (D6 direction).

Next, as shown in FIG. 27(*u*), when the shirt RS is entirely disposed on the platen 200, horizontal movement of the right chuck part 310R and the left chuck part 310L is stopped, and clamping of the shirt RS by the right chuck part 310R and the left chuck part 310L is released. Accordingly, the shirt RS is completely put on the platen 200. At this time, an image of the shirt RS on the platen 200 is captured by the digital still cameras 401, and a set of imaging data of the shirt RS captured by the digital still cameras 401 is transmitted to the computer 600. The sixth endpoint P6 is then detected by the sixth endpoint detecting part 606 (a sixth endpoint detecting step, Step S29). Further, the fourth endpoint P4 and the sixth endpoint P6 of the shirt RS put on the platen 200 are respectively clamped by the right chuck part 310R and the left chuck part 310L (an eleventh control, a seventh clamping step, Step S30). Further, as shown in FIG. 27(*v*), the shirt RS clamped at its fourth endpoint P4 and its sixth endpoint P6 is elevated by elevating the right chuck part 310R and the left chuck part 310L. Further, the shirt RS clamped by the chuck parts 310R and 310L is moved to the outside of the platen 200 by causing the right chuck part 310R and the left chuck part 310L to temporarily retract in the horizontal direction. Subsequently, the both chuck parts 310R and 310L are lowered for causing the shirt RS to make contact with the platen 200, and the chuck parts 310R and 310L are caused to proceed in the horizontal direction (in an oblique direction from the upper right to the lower left of the observer's point of view in FIG. 27(*w*)). Accordingly, the shirt RS, clamped at its fourth endpoint P4 and its sixth endpoint P6 by the right chuck part 310R and the left chuck part 310L, is moved in contact with the top surface of the platen 200 (Step S31). Before being caused to proceed in the horizontal direction, the right chuck part 310R and the left chuck part 310L are caused to revolve so that the chuck parts 310R and 310L are disposed along a direction perpendicular to the direction of causing the chuck parts 310R and 310L to proceed (D7 direction). Further, as shown in FIG. 27(*w*), when the shirt RS is entirely disposed on the platen 200, horizontal movement of the right chuck part 310R and the left chuck part 310L is stopped, and clamping of the shirt RS by the right chuck part 310R and the left chuck part 310L is released. Accordingly, the shirt RS is completely put on the platen 200. At this time, an image of the shirt RS on the platen 200 is captured by the digital still cameras 401, and a set of imaging data of the shirt RS captured by the digital still cameras 401 is transmitted to the computer 600. It is therein determined whether or not the contour of the shirt RS is rectangular (Step S32).

When the contour of the shirt RS is rectangular (Step S32: Yes), the collar portion of the shirt RS is detected (Step S33). When the collar portion of the shirt RS put on the platen 200 is not detected (Step S33: No), the shirt RS is turned over (a seventh control, Step S34). Specifically, the shirt RS is elevated by elevating the right chuck part 310R and the left chuck part 310L, while both corners C1 and C2 of the hem portion of the shirt RS are clamped by the right chuck part 310R and the left chuck part 310L, respectively. Further, as shown in FIG. 28(*x*), the shirt RS clamped at the corners C1 and C2 of the hem portion thereof is moved in contact with the platen 200 and is turned over by moving the right chuck part 310R and the left chuck part 310L to the shoulder portion side (in an arrow D8 direction) in the horizontal direction (Step S34). Accordingly, the collar portion of the shirt RS can be exposed to the front side. Further, as shown in FIG. 28(*y*), when the collar portion of the shirt RS is recognized (Step S36: Yes), the shoulder portions T1 and T2 of the shirt RS, which are portions set with respect to the collar portion, are respectively clamped by the right chuck part 310R and the left chuck part 310L (a sixth control, Step S37). Spreading of the shirt RS is finished by elevating the right chuck part 310R and the left chuck part 310L under the condition.

Similar to the aforementioned T-shirt TS, the spread shirt RS is then placed on the platen plates 501 of the folding device 500. Specifically, the shirt RS is placed on the platen plates 501 so that the shoulder portions T1 and T2 of the shirt RS clamped by the right chuck part 310R and the left chuck part 310L are disposed on the base end side of the platen plates 501 while the hem portion of the shirt RS is disposed on the tip end side of the platen plates 501. Accordingly, the lateral end portions of the shirt RS hang over the right side rotary mechanism 520R side and the left side rotary mechanism 520L side of the platen plates 501, and the hem portion of the shirt RS hangs over the tip end side of the platen plates 501.

Figure 19:
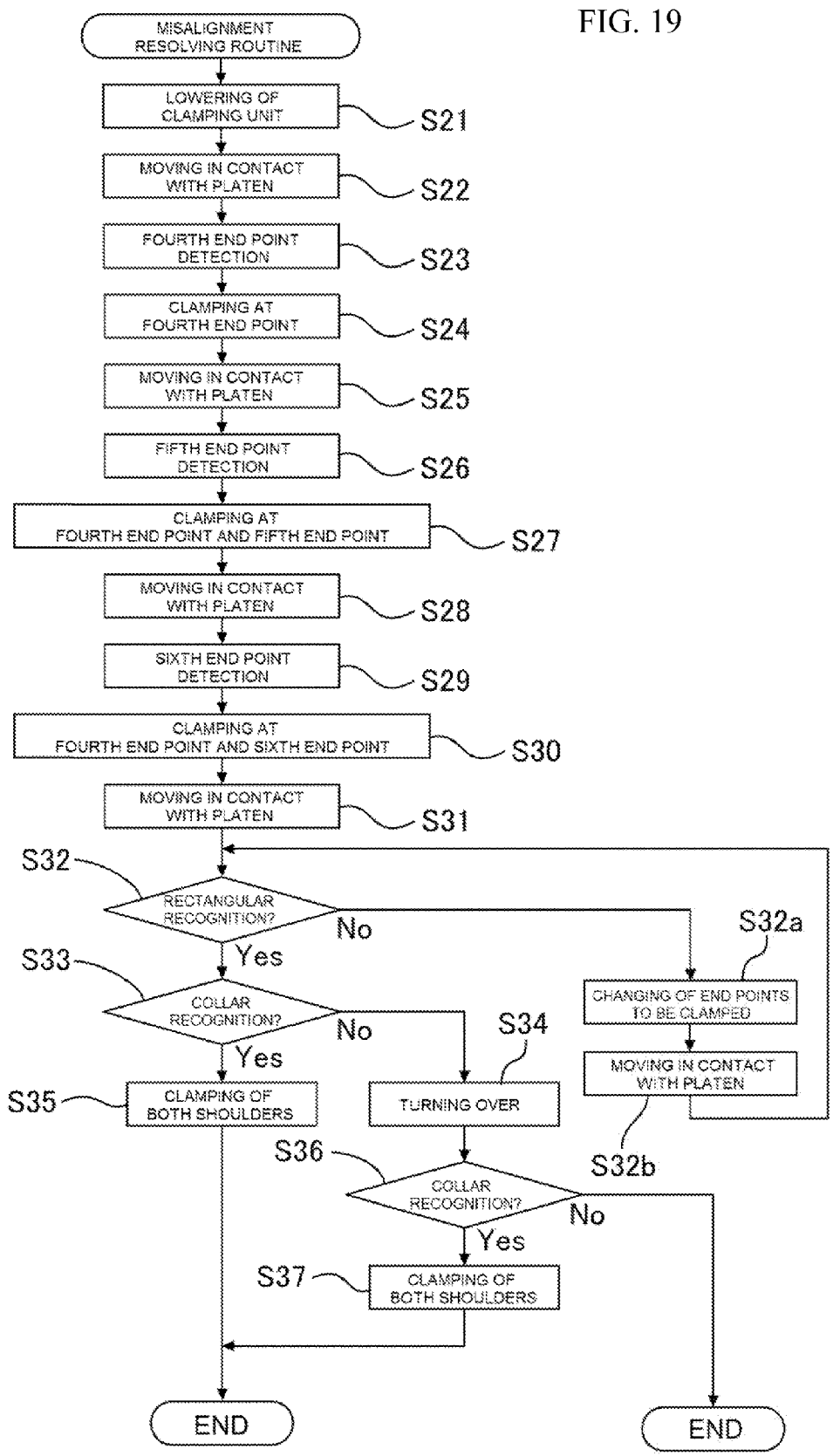
FIG. 19 is a flowchart (misalignment resolving subroutine) representing a motion of spreading a sleeveless shirt by the spreading device of the folding object processing apparatus represented in FIG. 1, according to an embodiment.
Figure 32:
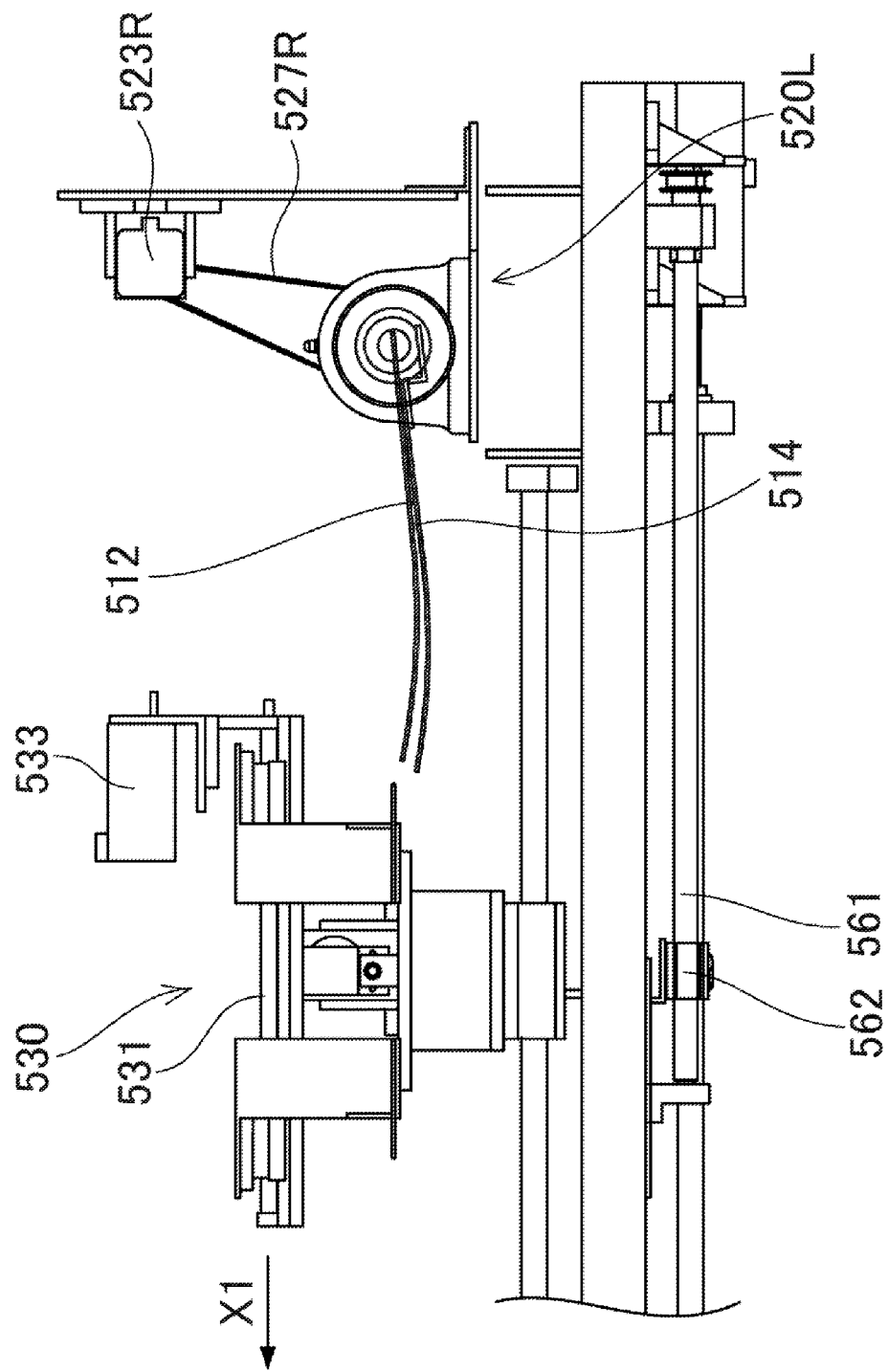
FIG. 32 is a diagram for explaining the motion of folding the folding object by the folding device of the folding object processing apparatus represented in FIG. 1, according to an embodiment.

Steps S35, S32a and S32b in FIG. 19 are respectively similar to the aforementioned Steps S15, S12a and S12b, and therefore, explanation thereof will be hereinafter omitted.

The action of the spreading device 300 is implemented through the control of the moving mechanism 320 and the clamping unit 310 by the computer 600 (the moving mechanism controlling part 609 and the clamping unit controlling part 610).

<Folding Motion by Folding Device for Folding Object>

Explanation follows for a motion of the folding device 500 for folding a folding object with reference to FIGS. 29 to 32.

First, the folding device 500 is set to be in a state shown in FIG. 29(a), i.e., a state that the folding plates 511 to 514 are downwardly hung in a roughly vertical direction when seen in a front view (an initial state). In the initial state, a folding object such as fabric is put on the platen plates 501. The width of the platen plates 501 is adjusted by the inter-platen-plate distance adjusting mechanism 530, and the tip end positions of the platen plates 501 are adjusted by the platen plate back-and-forth adjusting mechanism 540.

Next, as shown in FIG. 29(b), the second folding plate 512 is turned at an angle of roughly 90 degrees in a direction closer to the platen plates 501 (R11 direction, a clockwise direction) by the inside shaft rotary motor 522L (see FIG. 8) of the left side rotary mechanism 520L. Accordingly, the second folding plate 512 is set to be proximal to the vicinity of the bottom surfaces of the platen plates 501. A part of the folding object, hung over the left side rotary mechanism 520L side of the platen plates 501, is herein folded while being interposed between the second folding plate 512 and the platen plates 501.

Next, as shown in FIG. 30(c), the first folding plate 511 is turned at an angle of roughly 90 degrees in a direction closer to the platen plates 501 (R12 direction, a counterclockwise direction) by the inside shaft rotary motor 522R of the right side rotary mechanism 520R. Accordingly, the first folding plate 511 is set to be proximal to the vicinity of the bottom surface of the second folding plate 512. It should be noted that a part of the folding object, hung over the right side rotary mechanism 520R side of the platen plates 501, is herein folded while being interposed between the first folding plate 511 and the second folding plate 512.

Subsequently, as shown in FIG. 30(d), the fourth folding plate 514 is turned at an angle of roughly 90 degrees in a direction closer to the platen plates 501 (R11 direction, the clockwise direction) by the outside shaft rotary motor 523L of the left side rotary mechanism 520L. Accordingly, the fourth folding plate 514 is set to be proximal to the vicinity of the bottom surface of the first folding plate 511. It should be noted that a part of the folding object, hung over the left side rotary mechanism 520L side of the first folding plate 511, is herein folded while being interposed between the fourth folding plate 514 and the first folding plate 511.

Subsequently, as shown in FIG. 31(e), the third folding plate 513 is turned at an angle of roughly 90 degrees in a direction closer to the platen plates 501 (R12 direction, the counterclockwise direction) by the outside shaft rotary motor 523R of the right side rotary mechanism 520R. Accordingly, the third folding plate 513 is set to be proximal to the vicinity of the bottom surface of the fourth folding plate 514. It should be noted that a part of the folding object, hung over the right side rotary mechanism 520R side of the fourth folding plate 514, is herein folded while being interposed between the third folding plate 513 and the fourth folding plate 514.

Subsequently, a pull-out plate (not shown in the figures) is lifted up to a predetermined height by the aforementioned clamping unit 310 and moving mechanism 320 of the spreading device 300, and is moved to be proximal to the vicinity of the bottom surface of the third folding plate 513. It should be noted that a part of the folding object (the hem portion, in the case of a T-shirt or a sleeveless shirt), which hangs over the tip end side of the platen plates 501, is herein folded while being interposed between the pull-out plate (not shown in the figures) and the third folding plate 513.

Thereafter, as shown in FIG. 31(f), the right side rotary mechanism 520R is slid in a direction away from the left side rotary mechanism 520L (X1 direction) by the folding plate sliding mechanism 550 (see FIG. 1). Accordingly, the distance between the platen plates 501 and the folding plates 511 and 513 is relatively increased, and the folding plates 511 and 513 are removed from the folding object.

As shown in FIG. 32(g), the platen plates 501 are slid in a direction away from the left side rotary mechanism 520L (X1 direction) by the platen plate sliding mechanism 560 (see FIG. 1). Accordingly, the distance between the platen plates 501 and the folding plates 512 and 514 is relatively increased, and the folding plates 512 and 514 are removed from the folding object.

The action of the folding device 500 is implemented through the control of the folding device 500 (the pair of platen plates 501, the four pairs of folding plates 511 to 514, the dual nested shaft rotary mechanism 520, the inter-platen-plate distance adjusting mechanism 530, the platen plate back-and-forth adjusting mechanism 540, the folding plate sliding mechanism 550 and the platen plate sliding mechanism 560) by the computer 600 (the folding device controlling part 611).

<Features of Folding Device>

(1)

In the folding object processing apparatus 1 according to the present embodiment, detection of the third endpoint P3 is enabled when both of the first endpoint P1 and the second endpoint P2 of a folding object are clamped (see FIGS. 15(k) and 15(l)), and thereby, clamping of the third endpoint P3 is enabled (see FIG. 16(n)). As a result, detection of the third endpoint P3, and then, clamping of the third endpoint P3 are enabled without using devices such as a suction device for spreading the folding object. Therefore, the folding object can be spread with a simple structure.

(2)

In the folding object processing apparatus 1 according to the present embodiment, when spreading of a folding object is not completed even though the folding object is moved in contact with the platen 200 while the first endpoint P1 and the third endpoint P3 are clamped (Step S12: No, Step S32: No), the folding object is clamped at a combination of its endpoints different from the combination of its endpoints clamped by the clamping unit 310 in the previous step (Step S12a, Step S32a). In other words, the folding object can be spread by switching from the endpoints clamped by the clamping unit 310 in the previous step to endpoints different from them.

(3)

In the folding object processing apparatus 1 according to the present embodiment, a folding object can be clamped at a combination of its endpoints (P2 and P3) different from the combination of its endpoints (P1 and P3) clamped by the clamping unit 310 in the previous step through switching of endpoints to be clamped (Step S12a, Step S32a). In other words, the folding object can be prevented from being inevitably clamped at the same endpoints in a repetitive manner. As a result, increase in frequency of clamping by the clamping unit 310 can be delayed until spreading of the folding object is completed, and the spreading time of the folding object is reduced.

(4)

In the folding object processing apparatus 1 according to the present embodiment, in clamping the third endpoint P3, the left chuck part 310L, which clamps the second endpoint P2 closer to the third endpoint P3, is configured to move so as to clamp the third endpoint P3, whereas the right chuck part 310R, which clamps the first endpoint P1 away from the third endpoint P3, is configured not to move. In other words, it is possible to reduce the moving distance of the left chuck part 310L configured to move to clamp the third endpoint P3. Therefore, the spreading time for the folding object can be reduced.

(5)

In the folding object processing apparatus 1 according to the present embodiment, a folding object is moved in contact with the platen 200, and accordingly, frictional force is generated in the folding object in a direction opposite to the moving direction of the folding object. Therefore, twisting and tangling of the folding object can be resolved. As a result, it is possible to detect the rear end of the folding object in the moving direction of the clamping unit 310 as one of the endpoints (the first endpoint P1, the second endpoint P2, and the third endpoint P3) of the folding object.

(6)

The folding object processing apparatus 1 according to the present embodiment is provided with the platen 200. A folding object can be treated on the platen 200. Therefore, when the third endpoint P3 is clamped in the fourth control after the third control of clamping the first endpoint P1 and the second endpoint P2, the left chuck part 310L clamping the second endpoint P2 can be used as the clamping unit 310 clamping the third endpoint P3. In other words, the clamping unit 310 (the right chuck part 310R, the left chuck part 310L) is not required to simultaneously clamp three points, i.e., the first endpoint P1, the second endpoint P2, and the third endpoint P3, and is only required to be capable of simultaneously clamping two points. Therefore, increase in the number of chuck parts can be prevented. As a result, the clamping unit 310 can be simply structured.

(7)

In the folding object processing apparatus 1 according to the present embodiment, a folding object is clamped at a position set with reference to the collar portion, and this makes it possible to align plural folding objects in the position set with reference to the collar portions thereof. Accordingly, folding can be smoothly executed in the folding device 500.

(8)

In the folding object processing apparatus 1 according to the present embodiment, the first characteristic portion (the rectangular contour) and the second characteristic portion (the collar portion) of a folding object can be detected while the folding object is on the platen 200. Accordingly, a rate of recognizing the first characteristic portion and the second characteristic portion will be enhanced in comparison with a case that the first characteristic portion and the second characteristic portion of a folding object are detected while the folding object is hung downwards.

(9)

In the folding object processing apparatus 1 according to the present embodiment, when detection of the collar portion fails (Step S13: No), the collar portion can be exposed by turning over a folding object (Step S14). Therefore, it becomes possible to clamp the folding object at positions set with reference to the collar portion (i.e., the shoulder portions T1 and T2). Accordingly, plural folding objects are aligned in the positions set with reference to the collar portions.

(10)

When the collar portion of the sleeveless shirt RS cannot be detected even though the sleeveless shirt RS is turned over (Step S14), the folding object processing apparatus 1 according to the present embodiment is configured to execute the misalignment resolving routine (Step S18 (Steps S21 to S37)) in order to spread the sleeveless shirt RS. Specifically, when the collar portion of the sleeveless shirt RS cannot be detected (Step S16: No) even though the sleeveless running shirt RS is turned over (Step S14), the clamping unit 310 is lowered until the sleeveless shirt RS, clamped at both its third endpoint P3 and its first endpoint P1, makes contact at its bottom end with the platen 200 (Step S21). Accordingly, a portion of the sleeveless shirt RS, which less easily loses the shape thereof (e.g., a portion on which a seam exists, such as a shoulder tip of a sleeveless shirt), becomes detectable as the fourth endpoint P4 (Step S23). Then, the clamping unit 310 clamps the fourth endpoint P4 of the sleeveless running shirt RS (Step S24). The corner portion (a portion less easily losing the shape thereof) of the sleeveless shirt RS is thus configured to be clamped by the clamping unit 310. At this time, with clamping of the fourth endpoint P4 of the sleeveless shirt RS, it becomes possible to detect the fifth endpoint P5 of the sleeveless shirt RS, which is disposed farthest away from the fourth endpoint P4 (Step S26). Subsequently, the clamping unit 310 clamps both the fourth endpoint P4 and the fifth endpoint P5 of the sleeveless shirt RS (Step S27). In addition to the corner portion (the portion less easily losing its the shape) of the sleeveless shirt RS, another corner portion disposed diagonally to the corner portion is configured to be clamped by the clamping unit 310. At this time, with clamping of both the fourth endpoint P4 and the fifth endpoint P5 of the sleeveless shirt RS, it becomes possible to detect the sixth endpoint P6 disposed farthest away from the straight line L3 connecting the fourth endpoint P4 and the fifth endpoint P5 (Step S29). Subsequently, the clamping unit 310 clamps the fourth endpoint P4 and the sixth endpoint P6 of the sleeveless shirt RS (Step S30). Accordingly, two adjacent corner portions (the portions less easily losing their shape) of the sleeveless shirt RS are configured to be clamped by the clamping unit 310, and the untidily placed sleeveless shirt RS can be spread.

An embodiment of the present disclosure has been explained above with reference to the drawings. It should be understood that the specific configuration of the present disclosure is not limited to that of the previously described embodiment. The scope of the present disclosure is represented by claims as well as the above explanation and further covers all such variations as come within the scope of the appended claims and within the meaning and scope of equivalents to the appended claims.

<Modifications>

(A)

In the folding object processing apparatus 1 according to the above embodiment, the example was explained that the right chuck part 310R and the left chuck part 310L are provided as two chuck parts. However, the present disclosure is not limited to this, and three or more chuck parts may be provided. When three or more chuck parts are provided, it becomes possible to clamp the third endpoint P3 with both of the first endpoint P1 and the second endpoint P2 being clamped. In other words, a folding object can be handled in the air without being put on the platen 200. It is thereby possible to prevent damage of the folding object attributed to contact with the platen 200. In this case, the platen 200 is not required to be installed. Therefore, the folding object processing apparatus 1 can be compactly structured by the amount of the installation space of the platen 200.

In the previously described embodiment, the folding object cannot be handled in the air only by simply adding the third chuck part. To handle the folding object in the air, it is required, for example, to provide three units of six-axis robot arms with robot hands.

(B)

In the folding object processing apparatus 1 according to the above embodiment, the example has been explained that the moving mechanism 320 is implemented by a belt slider mechanism and a ball screw mechanism. However, the present disclosure is not limited to this, and the moving mechanism 320 may be implemented by a mechanism such as an air cylinder mechanism, a motor cylinder mechanism, an electronic slider mechanism, a linear slider mechanism, or a rack and pinion mechanism.

(C)

In the folding object processing apparatus 1 according to the aforementioned embodiment, the example has been explained that the right chuck part 310R and the left chuck part 310L, functioning as the clamping unit, are attached to the close/away mechanism 330 of the moving mechanism 320. However, the present disclosure is not limited to this, and the right chuck part 310R and the left chuck part 310L, functioning as the clamping unit, may be attached to two or more units of independent robot arms. By employing such a structure, it is possible to detect the second endpoint P2, the third endpoint P3, the fifth endpoint P5, and the sixth endpoint P6 without releasing clamping of the T-shirt TS or the shirt RS by the chuck parts 310R and 310L in Step S6 (the second endpoint detecting step), Step S9 (the third endpoint detecting step), Step S26 (the fifth endpoint detecting step), and Step S29 (the sixth endpoint detecting step).

(D)

In the folding object processing apparatus 1 according to the previously described embodiment, the example has been explained that the first point P and the first to sixth endpoints P1 to P6 are detected by the two digital still cameras 401. However, the present disclosure is not limited to this, and the first point P and the first to sixth endpoints P1 to P6 may be detected by a single digital still camera or three or more digital still cameras.

(E)

In the folding object processing apparatus 1 according to the aforementioned embodiment, the first position P and the first to sixth endpoints P1 to P6 are detected by forming an image of a folding object and then executing an image processing with respect to the image based on the imaging data captured by the digital still cameras 401. However, the present disclosure is not limited to this, and the first point P and the first to sixth endpoints P1 to P6 may be detected by detecting the rear end of the folding object in the moving direction (i.e., a place where the folding object is no longer detected) using a sensor such as a photo sensor. Specifically, a light emitter and a light receiver are disposed in the vicinity of the top surface of the platen 200, and the clamping unit 310 and the moving mechanism 320 are controlled so that a folding object clamped by the clamping unit 310 passes through a space between the light emitter and the light receiver. Then, positions in which blocking of light by the folding object is released are detected as the first to sixth endpoints P1 to P6.

(F)

In the folding object processing apparatus 1 according to the previously described embodiment, the example has been explained that the first characteristic portion (the rectangular contour) and the second characteristic portion (the collar portion) are detected by the two digital still cameras 401. However, the present disclosure is not limited to this, and the first characteristic portion and the second characteristic portion may be detected by a single digital still camera or three or more digital still cameras.

(G)

In the folding object processing apparatus 1 according to the aforementioned exemplary embodiment, the example has been explained that the second characteristic portion (the collar potion) is detected by the digital still cameras 401. However, the present disclosure is not limited to this, and the second characteristic portion (the collar portion) of a folding object may be detected by an infrared camera. Such infrared camera is configured to image a folding object put on the platen 200 in order to obtain a set of transmission imaging data of the folding object, and is configured to transmit the obtained set of transmission imaging data to the computer 600. The computer 600 is configured to: execute an image processing based on the received set of transmission imaging data, detect the collar portion of the folding object, and detect in which position the collar portion is located within the folding object put on the platen 200. In other words, with the use of an infrared camera, it is possible to specify the position of the second characteristic portion (the collar portion) with an infrared transmission amount less than that of the other portions. Accordingly, the folding object can be clamped at a position set with reference to the second characteristic portion without executing the control of turning over the folding object (Step S14 and Step S34) in order to expose the second characteristic portion of the folding object.

Alternatively, a natural light camera and an infrared camera may be utilized in combination. In this case, when the second characteristic portion (the collar portion) cannot be detected as a result of imaging of a folding object by the natural light camera, the folding object is imaged by the infrared camera and the position of the second characteristic portion (the collar portion) is specified. Accordingly, the folding object can be clamped at a position set with reference to the second characteristic portion (the collar portion) without executing the control of turning over the folding object (Step S14 and Step S34).

Alternatively, a CCD camera can be used instead of the aforementioned infrared camera. Specifically, the position of the second characteristic portion (the collar portion) of a folding object may be specified by irradiating the folding object with a beam from below the folding object and by detecting the amount of light having transmitted through the second characteristic portion (the collar portion) of the folding object by the CCD camera.

(H)

Figure 33:
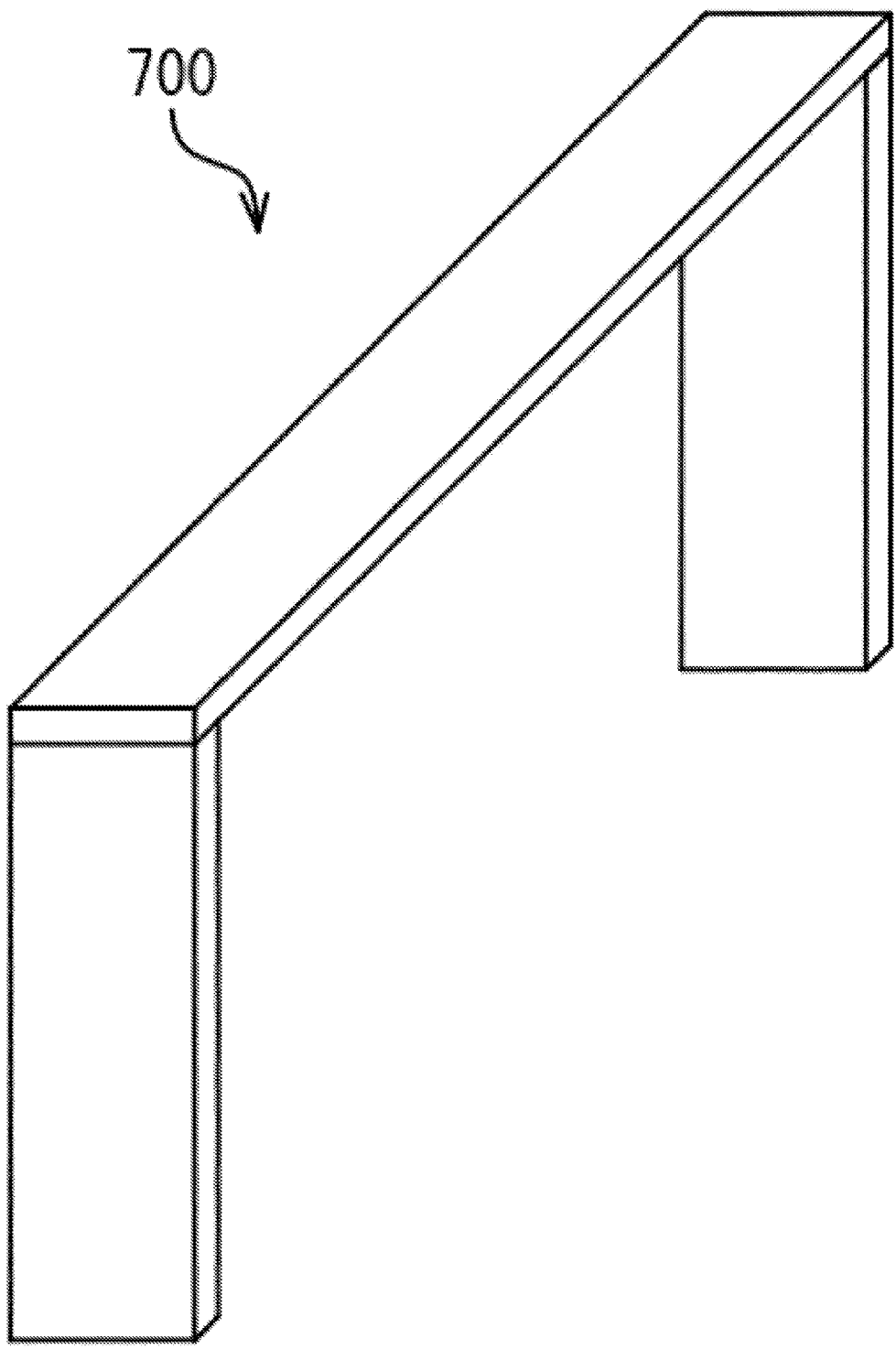
FIG. 33 is a diagram illustrating an example of a hanging member according to a modification (H), according to an embodiment.

In the folding object processing apparatus 1 according to the aforementioned embodiment, the example has been explained that the platen 200 with a surface extended on the X-Y plane is provided. However, the present disclosure is not limited to this, and a hanging member 700 may be provided as shown in FIG. 33. As shown in FIG. 33, the hanging member 700 has a strap-shaped member, a pole-like member or the like, which is horizontally supported at a predetermined height position (a Z-directional position). With use of such hanging member 700, endpoint detection can be executed for a folding object while the folding object is hung on the hanging member 700. In such a case, the digital still cameras 401 are horizontally directed to the hanging member 700.

Where a folding object is a relatively long or large one, an endpoint of the folding object may inevitably protrude out of an imaging region RP of the digital still cameras 401 in executing endpoint detection under the condition of the folding object hung on the hanging member 700 as described above. The drawback may be resolved by installing an elevating device (not shown in the figures) for raising and lowering an elevating bar 710 as shown in FIGS. 34 and 35.

As shown in FIGS. 34(*a*) and 34(*b*), an aspect of the above is that the elevating device is configured to lower the elevating bar 710 from above a folding object (e.g., the T-shirt TS or the sleeveless shirt RS) to a space between the clamping unit 310 and the hanging member 700 under the condition that the folding object is hung on the hanging member 700 while being clamped by the clamping unit 310. Alternatively, as shown in FIGS. 35(*a*) and 35(*b*), another exemplary aspect is that the elevating device is configured to lower the elevating bar 710 from above a folding object to a space between two hanging members 700 disposed completely or roughly parallel to each other and the folding object is placed over the two hanging members 700.

In any of the aforementioned aspects, the elevating device is preferably connected to the computer 600 for communication, and is preferably configured to elevate and lower the elevating bar 710 based on a command from the computer 600. It should be noted that exemplary timings when the computer 600 issues a command of causing the elevating device to lower the elevating bar 710 include, for example, a timing when it is detected that the folding object exists in either the space between the clamping unit 310 and the hanging member 700 or the space between the two hanging members 700 while no endpoint of the folding object is detected in the imaging region RP. It should be noted that to detect whether or not the folding object exists in either the space between the clamping unit 310 and the hanging member 700 or the space between the two hanging members 700, a sensor may be preliminarily disposed above or below either the space between the clamping unit 310 and the hanging member 700 or the space between the two hanging members 700 while being directed downwards or upwards. When an endpoint of the folding object is detected in the imaging region RP, the computer 600 may be configured to cause the elevating device to elevate the elevating bar 710.

Even when endpoint detection is executed for a folding object using the hanging member 700, the folding object can be moved in contact with the hanging member 700, similar to the case of executing endpoint detection for a folding object using the platen 200. Accordingly, twisting and tangling of the folding object can be resolved. As a result, it is possible to detect the rear end of the folding object in the moving direction of the clamping unit 310 as one of the endpoints (the first endpoint P1 to the sixth endpoint P6) of the folding object.

The installation space for installing the hanging member 700 is further reduced in comparison with the platen 200 extended in a planar manner. Therefore, the folding object processing apparatus 1 can be compactly formed.

In the aspect of thus utilizing the hanging member 700, for example, rectangular detection and collar detection can be simultaneously executed on the sides of a folding object by taking both-side images of the folding object using the digital still cameras 401 disposed on both sides of the hanging member 700, or alternatively, by taking both-side images of the folding object using the single digital still camera 401 where the digital still camera 401 is disposed on one side of the hanging member 700 while a mirror (or mirrors) is disposed on the other side of the hanging member 700. Thus, it is possible to omit a control for turning over a folding object (e.g., the T-shirt TS or the sleeveless shirt RS) unlike a case in which an endpoint of the folding object is detected using the platen 200. In taking both-side images of a folding object using the single digital still camera 401 where the digital still camera 401 is disposed on one side of the hanging member 700 while a mirror (or mirrors) is disposed on the other side of the hanging member 700, it is realistic to utilize a plurality of mirrors and multiple reflections thereof.

(I)

In the folding object processing apparatus 1 according to the aforementioned embodiment, the example was explained that the platen 200 is provided. On the other hand, in the folding object processing apparatus 1 according to the modification (H), the example has been explained that the pole is provided. However, in the present disclosure, a required region is the one for moving a folding object in contact therewith. Therefore, it is not required to provide the aforementioned platen 200, the pole, and so forth. Instead, a floor (a surface on which the folding object processing apparatus 1 is mounted) may be set as a mounting region. Accordingly, space can be saved by the amount of space for installing the platen 200 and the pole. Therefore, the folding object processing apparatus 1 can be compactly structured.

(J)

In the folding object processing apparatus 1 according to the aforementioned embodiment, the first endpoint detecting part 601 is configured to: form a plan image of a folding object clamped at its first point P based on the set of imaging data transmitted thereto from the digital still cameras 401, and detect the first endpoint P1 disposed farthest away from the first point P based on the plan image. However, the first endpoint detecting part 601 may be configured to detect the first endpoint P1 as follows.

(i) For example, the first endpoint detecting part 601 sets a clamping unit entrance-side edge of the platen 200 (hereinafter referred to as "a near-side edge") as a reference line, and detects a point disposed closest from the reference line as the first endpoint P1. The near-side edge of the platen 200 is required to be located within the imaging region of the digital still cameras 401. Incidentally, the reference line is not limited to the near-side edge of the platen 200. For example, the reference line may be a physical line provided in the vicinity of the near-side edge of the platen 200, or alternatively, a line provided as a set of image data on the near-side edge of or its vicinity of the platen 200 within the imaging region of the digital still cameras 401. Further, the reference line is preferably arranged perpendicular to the proceeding/retracting direction of the clamping unit 310, i.e., the proceeding/retracting direction of the close/away mechanism 330.

(ii) For example, the first endpoint detecting part 601 sets an edge disposed on a side opposite to the clamping unit entrance side of the platen 200 (hereinafter referred to as "an away-side edge") as a reference line, and detects a point disposed farthest away from the reference line as the first endpoint P1. The away-side edge of the platen 200 is required to be located within the imaging region of the digital still cameras 401. Incidentally, the reference line is not limited to the away-side edge of the platen 200. For example, the reference line may be a physical line disposed in the vicinity of the away-side edge of the platen 200, or alternatively, a line provided as a set of image data on either the away-side edge of or its vicinity of the platen 200 within the imaging region of the digital still cameras 401. The reference line is preferably arranged perpendicular to the proceeding/retracting direction of the clamping unit 310, i.e., the proceeding/retracting direction of the close/away mechanism 330.

(K)

In the folding object processing apparatus 1 according to the previously described embodiment, the second endpoint detecting part 602 is configured to: form a plan image of a folding object clamped at its first endpoint P1 based on the set of imaging data transmitted thereto from the digital still cameras 401, and detect the second endpoint P2 disposed farthest away from the first endpoint P1 based on the plan image. However, the second endpoint detecting part 602 may be configured to detect the second endpoint P2 as described in the aforementioned configurations (i) and (ii) of the modification (J).

(L)

In the folding object processing apparatus 1 according to the aforementioned embodiment, the third endpoint detecting part 603 is configured to: form a plan image of a folding object clamped at both of its first endpoint P1 and its second endpoint P2 based on the set of imaging data transmitted thereto from the digital still cameras 401, and detect the third endpoint P3 disposed farthest away from the straight line L1 based on the plan image. However, the third endpoint detecting part 603 may be configured to detect the third endpoint P3 as described in the aforementioned configurations (i) and (ii) of the modification (J).

(M)

In the folding object processing apparatus 1 according to the above embodiment, the fourth endpoint detecting part 604 is configured to: form a plan image of a folding object clamped at both of its third endpoint P3 and either its first endpoint P1 or its second endpoint P2 based on the set of imaging data transmitted thereto from the digital still cameras 401, and detect the fourth endpoint P4 disposed farthest away from the straight line L2 based on the plan image. However, the fourth endpoint detecting part 604 may be configured to detect the fourth endpoint P4 as described in the aforementioned configurations (i) and (ii) of the modification (J).

(N)

In the folding object processing apparatus 1 according to the previously described embodiment, the fifth endpoint detecting part 605 is configured to: form a plan image of a folding object clamped at its fourth endpoint P1 based on the set of imaging data transmitted thereto from the digital still cameras 401, and detect the fifth endpoint P5 disposed farthest away from the fourth endpoint P4 based on the plan image. However, the fifth endpoint detecting part 605 may be configured to detect the fifth endpoint P5 as described in the aforementioned configurations (i) and (ii) of the modification (J).

(O)

In the folding object processing apparatus 1 according to the aforementioned embodiment, the sixth endpoint detecting part 606 is configured to: form a plan image of a folding object clamped at both of its fourth endpoint P4 and its fifth endpoint P5 based on the set of imaging data transmitted thereto from the digital still cameras 401, and detect the sixth endpoint P6 disposed farthest away from the straight line L3 based on the plan image. However, the sixth endpoint detecting part 606 may be configured to detect the sixth endpoint P6 as described in the aforementioned configurations (i) and (ii) of the modification (J).

The invention claimed is:

1. A deformable thin object spreading device for spreading a deformable thin object, comprising:
   first and second clamping units configured to clamp the deformable thin object;
   a moving mechanism configured to move the first and second clamping units;
   an endpoint detecting part configured to detect an endpoint of the deformable thin object, which is disposed farthest away from either a first reference line or a first reference point;
   a hanging member being a plate-shaped member which is supported at a predetermined height position; and
   a control part configured to execute:
     a first control of the first clamping unit and the moving mechanism configured to cause the first clamping unit to clamp a first point of the deformable thin object and configured to cause the moving mechanism to move the first clamping unit such that the deformable thin object is hung on the hanging member;
     a second control of the endpoint detecting part configured to detect a first endpoint while the deformable thin object is clamped by the first clamping unit and hung on the hanging member after the first control;
     a third control of the first clamping unit and the moving mechanism configured to cause the clamping unit to clamp the first endpoint of the deformable thin object after the second control, and configured to cause the moving mechanism to move the first clamping unit such that the deformable thin object is hung on the hanging member;
     a fourth control of the endpoint detecting part configured to detect a second endpoint while the deformable thin object is clamped by the first clamping unit and hung on the hanging member after the third control;
     a fifth control of the first and second clamping units and the moving mechanism configured to cause the first and second clamping units to clamp both of the first endpoint and the second endpoint of the deformable thin object after the fourth control;
a sixth control of the endpoint detecting part configured to detect a third endpoint after the fifth control; and
a seventh control of the first and second clamping units and the moving mechanism configured to cause the first and second clamping units to clamp both of the first endpoint or the second endpoint and the third endpoint of the deformable thin object after the sixth control.

2. The deformable thin object spreading device according to claim 1, wherein the control part is further configured to execute an eighth control of the moving mechanism so that a straight line connecting the first endpoint and the second endpoint is arranged in a roughly horizontal direction, the eighth control configured to be executed after the fifth control and before the sixth control.

3. The deformable thin object spreading device according to claim 2,
wherein the control part is configured to:
cause the endpoint detecting part to detect the first endpoint disposed farthest away from the first point in the second control;
cause the endpoint detecting part to detect the second endpoint disposed farthest away from the first endpoint in the fourth control; and
cause the endpoint detecting part to detect the third endpoint disposed farthest away from the straight line connecting the first endpoint and the second endpoint in the sixth control.

4. The deformable thin object spreading device according to claim 1,
wherein the first reference line is fixed, and
the control part is configured to:
cause the endpoint detecting part to detect the first endpoint disposed farthest away from the first reference line in the second control;
cause the endpoint detecting part to detect the second endpoint disposed farthest away from the first reference line in the fourth control; and
cause the endpoint detecting part to detect the third endpoint disposed farthest away from the first reference line in the sixth control.

5. The deformable thin object spreading device according to claim 1,
wherein a second reference line is fixed, and
the control part is configured to:
cause the endpoint detecting part to detect the first endpoint disposed closest to the second reference line in the second control;
cause the endpoint detecting part to detect the second endpoint disposed closest to the second reference line in the fourth control; and
cause the endpoint detecting part to detect the third endpoint disposed closest to the second reference line in the sixth control.

6. The deformable thin object spreading device according to claim 1, wherein the control part is further configured and arranged to execute a ninth control of controlling the first and second clamping units and the moving mechanism to cause the first and second clamping units to clamp both of one of the first endpoint and the second endpoint, which has not been clamped in the seventh control, and the third endpoint of the deformable thin object, the ninth control configured to be executed after the seventh control.

7. The deformable thin object spreading device according to claim 1, wherein the control part is configured to control the first and second clamping units and the moving mechanism to cause the first and second clamping units to clamp both of one of the first endpoint and the second endpoint, which is disposed farther away from the third endpoint, and the third endpoint of the deformable thin object in the seventh control.

8. The deformable thin object spreading device according to claim 1, further comprising:
a first characteristic portion detecting part configured to detect a first characteristic portion of the deformable thin object; and
a second characteristic portion detecting part configured to detect a second characteristic portion of the deformable thin object,
wherein the control part is further configured to execute a tenth control of controlling the clamping unit and the moving mechanism to cause the clamping unit to clamp a position of the deformable thin object set with reference to the second characteristic portion, the tenth control configured to be executed after the seventh control when the first characteristic portion of the deformable thin object is detected by the first characteristic portion detecting part while the second characteristic portion of the deformable thin object is detected by the second characteristic portion detecting part.

9. The deformable thin object spreading device according to claim 8, wherein the control part is further configured to execute an eleventh control of controlling the clamping unit and the moving mechanism to turn over the deformable thin object, the eleventh control configured to be executed after the seventh control when the first characteristic portion of the deformable thin object is detected by the first characteristic portion detecting part while the second characteristic portion of the deformable thin object is not detected by the second characteristic portion detecting part.

10. The deformable thin object spreading device according to claim 9, wherein the control part is further configured to execute:
a twelfth control of controlling the clamping unit and the moving mechanism to cause the deformable thin object clamped at both of the first endpoint or the second endpoint thereof and the third endpoint thereof by the clamping unit to make contact at a bottom end thereof with the mounting region, the twelfth control configured to be executed after the eleventh control when the second characteristic portion is not detected by the second characteristic portion detecting part;
a thirteenth control of causing the endpoint detecting part to detect an endpoint, the thirteenth control configured to be executed after the twelfth control;
a fourteenth control of controlling the clamping unit and the moving mechanism to cause the clamping unit to clamp the endpoint detected in the thirteenth control (hereinafter referred to as "a fourth endpoint"), the fourteenth control configured to be executed after the thirteenth control;
a fifteenth control of causing the endpoint detecting part to detect an endpoint, the fifteenth control configured to be executed after the fourteenth control;
a sixteenth control of controlling the clamping unit and the moving mechanism to cause the clamping unit to clamp both of the fourth endpoint and the endpoint detected in the fifteenth control (hereinafter referred to as "a fifth endpoint") of the deformable thin object, the sixteenth control configured to be executed after the fifteenth control;

a seventeenth control of causing an endpoint detecting part to detect an endpoint, the seventeenth control configured to be executed after the sixteenth control; and an eighteenth control of controlling the clamping unit and the moving mechanism to cause the clamping unit to clamp both of the fourth endpoint or the fifth endpoint and the endpoint detected in the seventeenth control of the deformable thin object, the eighteenth control configured to be executed after the seventeenth control.

11. The deformable thin object spreading device according to claim 10, further comprising:
a first characteristic portion detecting part configured to detect a first characteristic portion of the deformable thin object; and
a second characteristic portion detecting part configured to detect a second characteristic portion of the deformable thin object,
wherein the control part is further configured to execute a nineteenth control of controlling the clamping unit and the moving mechanism to cause the clamping unit to clamp a position of the deformable thin object set with reference to the second characteristic portion, the nineteenth control configured to be executed after the seventh control when the first characteristic portion of the deformable thin object is detected by the first characteristic portion detecting part while the second characteristic portion of the deformable thin object is detected by the second characteristic portion detecting part.

12. The deformable thin object spreading device according to claim 8, wherein the second characteristic portion detecting part includes an infrared camera capable of specifying a position of the second characteristic portion of the deformable thin object.

13. The deformable thin object spreading device according to claim 1, further comprising:
a first member; and
a lowering mechanism configured to lower the first member,
wherein the control part is configured to cause the lowering mechanism to lower the first member from above the deformable thin object to a space produced between the clamping unit and the hanging member under a condition that the deformable thin object is hung on the hanging member while being clamped by the clamping unit.

14. The deformable thin object spreading device according to claim 13,
wherein the hanging member has a first hanging part and a second hanging part disposed away from the first hanging part,
the deformable thin object spreading device further comprises a lowering device including: a first member; and a lowering mechanism configured to lower the first member from above the first hanging part and the second hanging part to a space produced between the first hanging part and the second hanging part.

15. A method of spreading a deformable thin object, comprising:
a first clamping step of clamping the deformable thin object at a first point by a first clamping unit;
a first moving step of moving the deformable thin object such that the deformable thin object is hung on a hanging member, wherein the hanging member is a plate-shaped member which is supported at a predetermined height position;
a first endpoint detecting step of detecting a first endpoint of the deformable thin object, which is disposed farthest away from either a first reference line or a first reference point, while the deformable thin object is clamped by the first clamping unit and hung on the hanging member after the first moving step;
a second clamping step of clamping the deformable thin object at the first endpoint by the first clamping unit after the first endpoint detecting step;
a second moving step of moving the deformable thin object such that the deformable thin object is hung on a hanging member;
a second endpoint detecting step of detecting a second endpoint of the deformable thin object, which is disposed farthest away from a second reference line, while the deformable thin object is clamped by the first clamping unit and hung on the hanging member after the second moving step;
a third clamping step of clamping the deformable thin object at both the first endpoint and the second endpoint by the first clamping unit and a second clamping unit after the second endpoint detecting step;
a third endpoint detecting step of detecting a third endpoint of the deformable thin object, which is disposed farthest away from a third reference line or a third reference point after the third clamping step; and
a fourth clamping step of clamping the deformable thin object at both of the first endpoint or the second endpoint and the third endpoint by the first and second clamping units after the third endpoint detecting step.

* * * * *

UNITED STATES PATENT AND TRADEMARK OFFICE
CERTIFICATE OF CORRECTION

PATENT NO. : 9,969,041 B2
APPLICATION NO. : 13/991066
DATED : May 15, 2018
INVENTOR(S) : Yoshimasa Endo, Hiroshi Kitagawa and Hiroshi Kimura It is certified that error appears in the above-identified patent and that said Letters Patent is hereby corrected as shown below:

On the Title Page

Item (73), after Assignee: "Seven Dreamers Laboratories, Inc., Tokyo (JP); Panasonic Corporation, Osaka (JP)" insert: --DAIWA HOUSE INDUSTRY CO., LTD., Osaka (JP)--

Signed and Sealed this
Tenth Day of September, 2019

Andrei Iancu
*Director of the United States Patent and Trademark Office*